US007529828B2

(12) United States Patent
Seki et al.

(10) Patent No.: US 7,529,828 B2
(45) Date of Patent: May 5, 2009

(54) METHOD AND APPARATUS FOR ANALYZING ONGOING SERVICE PROCESS BASED ON CALL DEPENDENCY BETWEEN MESSAGES

(75) Inventors: Yukiko Seki, Kawasaki (JP); Nobuhiro Yugami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 559 days.

(21) Appl. No.: 11/214,200

(22) Filed: Aug. 28, 2005

(65) Prior Publication Data
US 2006/0265416 A1 Nov. 23, 2006

(30) Foreign Application Priority Data
May 17, 2005 (JP) .............................. 2005-143873

(51) Int. Cl.
G06F 15/173 (2006.01)
(52) U.S. Cl. ........................ 709/224; 709/203; 709/223
(58) Field of Classification Search ................ 709/224, 709/223, 203, 217; 379/133, 134
See application file for complete search history.

(56) References Cited

U.S. PATENT DOCUMENTS 6,286,046 B1 *  9/2001  Bryant ....................... 709/224
7,290,056 B1 * 10/2007  McLaughlin, Jr. ........... 709/230
7,310,777 B2 * 12/2007  Cirne .......................... 715/763
2004/0122942 A1 *  6/2004  Green et al. ................. 709/224
2004/0139194 A1 *  7/2004  Naganathan ................. 709/224
2005/0166081 A1 *  7/2005  Etoh et al. ...................... 714/4
2006/0242292 A1 * 10/2006  Carter ......................... 709/224

FOREIGN PATENT DOCUMENTS

JP      2004-220453     8/2004
JP      2004-302525    10/2004
JP      2006-011683     1/2006

* cited by examiner

Primary Examiner—Lashonda T Jacobs
(74) Attorney, Agent, or Firm—Fujitsu Patent Center

(57) ABSTRACT

A service process analyzing program, stored in a computer-readable medium, for identifying service transactions taking place between servers, particularly capable of discriminating between different transaction classes, including infrequent classes. A definite transaction finder identifies definite transactions by extracting a combination of messages having unique and definite call dependency between them. A transaction candidate builder extracts a plurality of combinations of messages including an unsettled message, thereby producing one or more transaction candidates. A candidate evaluator evaluates the likelihood of each transaction candidate, based on how many transactions of the same class have been identified as definite transactions or estimated transactions. A transaction estimator produces another estimated transaction by selecting one of the transaction candidates based on their respective likelihood scores.

7 Claims, 63 Drawing Sheets

FIRST CALL DEPENDENCY CRITERION

SECOND CALL DEPENDENCY CRITERION

THIRD CALL DEPENDENCY CRITERION

FIG. 18
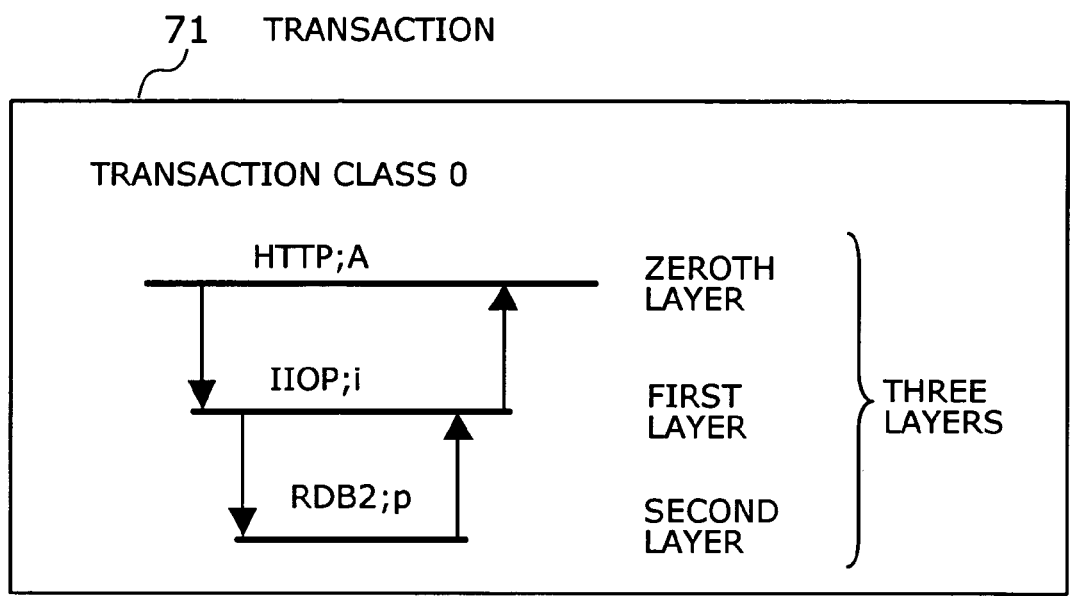
71 TRANSACTION
TRANSACTION CLASS 0
HTTP;A — ZEROTH LAYER
IIOP;i — FIRST LAYER
RDB2;p — SECOND LAYER
} THREE LAYERS
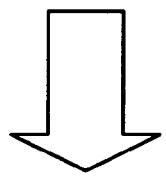
72 STRUCTURE DESCRIPTION
0;HTTP;A,0-0;IIOP;i,0-0-0;RDB2;p FIG. 19
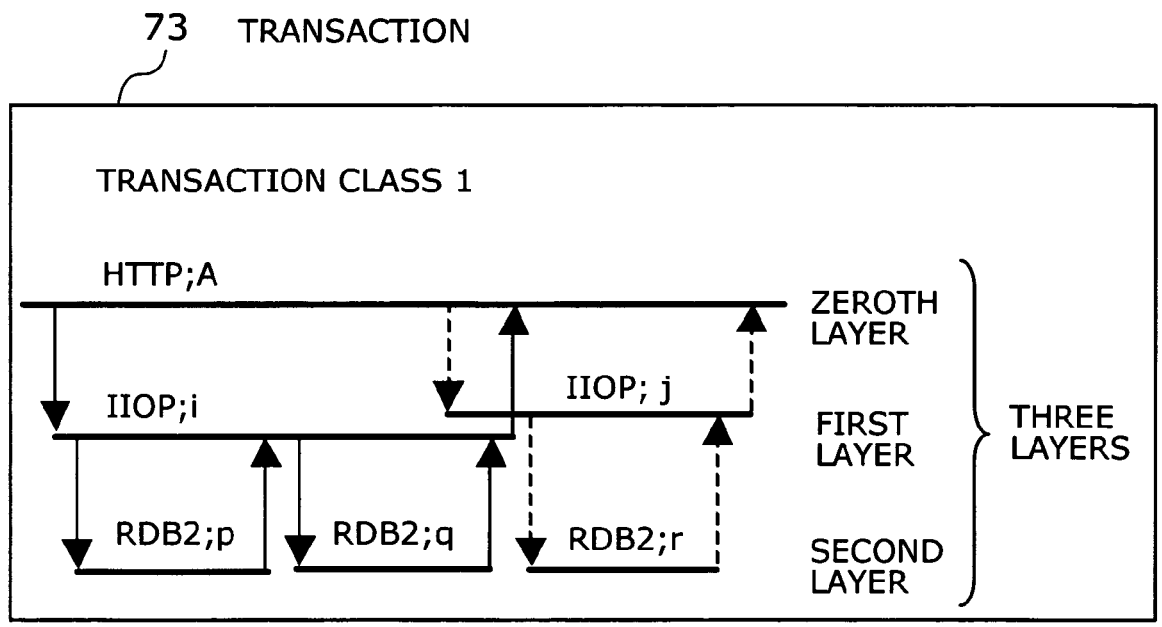
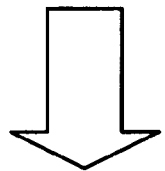
74 STRUCTURE DESCRIPTION
1;HTTP;A,
1-0;IIOP;i,1-0-0;RDB2;p,1-0-1;RDB2;q,
1-1;IIOP;j,1-1-0;RDB2;r

112 MESSAGE LOG

```
0,0.002292,0.002446,HTTP,A,210.98.76.54,12.34.56.78
1,0.002296,0.002434,RDB2,p,12.34.56.78,12.34.56.82
2,0.002350,0.002665,HTTP,A,210.98.76.54,12.34.56.78
3,0.002358,0.002450,RDB2,p,12.34.56.78,12.34.56.82
4,0.002568,0.002698,HTTP,A,210.98.76.54,12.34.56.78
5,0.002577,0.002642,RDB2,q,12.34.56.78,12.34.56.82
6,0.002620,0.002665,RDB2,p,12.34.56.78,12.34.56.82
7,0.002623,0.003079,HTTP,A,210.98.76.54,12.34.56.78
8,0.002643,0.003052,RDB2,p,12.34.56.78,12.34.56.82
9,0.003451,0.004035,HTTP,A,210.98.76.54,12.34.56.78
10,0.003455,0.003684,RDB2,p,12.34.56.78,12.34.56.82
11,0.003754,0.004018,RDB2,q,12.34.56.78,12.34.56.82
12,0.004969,0.005904,HTTP,A,210.98.76.54,12.34.56.78
13,0.004997,0.005678,RDB2,p,12.34.56.78,12.34.56.82
14,0.005244,0.005765,HTTP,A,210.98.76.54,12.34.56.78
15,0.005266,0.005735,RDB2,p,12.34.56.78,12.34.56.82
16,0.007448,0.008304,HTTP,A,210.98.76.54,12.34.56.78
17,0.007449,0.007478,RDB2,p,12.34.56.78,12.34.56.82
18,0.007501,0.008301,RDB2,q,12.34.56.78,12.34.56.82
19,0.007742,0.008021,HTTP,A,210.98.76.54,12.34.56.78
20,0.007754,0.007988,RDB2,p,12.34.56.78,12.34.56.82
21,0.008826,0.009042,HTTP,A,210.98.76.54,12.34.56.78
22,0.008830,0.008984,RDB2,p,12.34.56.78,12.34.56.82
23,0.009429,0.009755,HTTP,A,210.98.76.54,12.34.56.78
24,0.009439,0.009716,RDB2,p,12.34.56.78,12.34.56.82
25,0.010641,0.011270,HTTP,A,210.98.76.54,12.34.56.78
26,0.010648,0.010913,RDB2,p,12.34.56.78,12.34.56.82
27,0.010992,0.011067,RDB2,q,12.34.56.78,12.34.56.82
28,0.012439,0.012575,HTTP,A,210.98.76.54,12.34.56.78
29,0.012467,0.012521,RDB2,p,12.34.56.78,12.34.56.82
30,0.012806,0.014062,HTTP,A,210.98.76.54,12.34.56.78
31,0.012836,0.013405,RDB2,p,12.34.56.78,12.34.56.82
32,0.012907,0.013193,HTTP,A,210.98.76.54,12.34.56.78
33,0.012942,0.012945,RDB2,p,12.34.56.78,12.34.56.82
34,0.012955,0.013170,RDB2,q,12.34.56.78,12.34.56.82
35,0.013044,0.013268,HTTP,A,210.98.76.54,12.34.56.78
36,0.013066,0.013241,RDB2,p,12.34.56.78,12.34.56.82
37,0.013409,0.013774,RDB2,q,12.34.56.78,12.34.56.82
38,0.014355,0.014872,HTTP,A,210.98.76.54,12.34.56.78
39,0.014372,0.014587,RDB2,p,12.34.56.78,12.34.56.82
40,0.014503,0.014998,RDB2,p,12.34.56.78,12.34.56.82
```

FIG. 20

A  START MESSAGE SET

```
0,0.002292,0.002446,HTTP,A,{1},{ },{ },U
            :
7,0.002623,0.003079,HTTP,A,{8},{ },{ },U
            :
9,0.003451,0.004035,HTTP,A,{10,11},{ },{ },U
            :
21,0.008826,0.009042,HTTP,A,{22},{ },{ },U
            :
23,0.009429,0.009755,HTTP,A,{24},{ },{ },U
            :
25,0.010641,0.011270,HTTP,A,{26,27},{ },{ },U
            :
28,0.012439,0.012575,HTTP,A,{29},{ },{ },U
            :
38,0.014355,0.014872,HTTP,A,{39},{ },{ },U
            :
```

FIG. 23

B DESCENDANT MESSAGE SET 1,0.002296,0.002434,RDB2,p,{0},D
⋮
8,0.002643,0.003052,RDB2,p,{7},D
⋮
10,0.003455,0.003684,RDB2,p,{9},D
11,0.003754,0.004018,RDB2,q,{9},D
⋮
22,0.008830,0.008984,RDB2,p,{21},D
⋮
24,0.009439,0.009716,RDB2,p,{23},D
⋮
26,0.010648,0.010913,RDB2,p,{25},D
27,0.010992,0.011067,RDB2,q,{25},D
⋮
29,0.012467,0.012521,RDB2,p,{28},D
⋮
39,0.014372,0.014587,RDB2,p,{38},D

FIG. 24

```
0,0.002292,HTTP,req,0,0,A,210.98.76.54,12.34.56.78
0,0.002296,RDB2,req,1,0-0,p,12.34.56.78,12.34.56.82,D
0,0.002434,RDB2,res,1,0-0
0,0.002446,HTTP,res,0,0
```
— 71

```
1,0.002623,HTTP,req,7,0,A,210.98.76.54,12.34.56.78
1,0.002643,RDB2,req,8,0-0,p,12.34.56.78,12.34.56.82,D
1,0.003052,RDB2,res,8,0-0
1,0.003079,HTTP,res,7,0
```
— 72

```
2,0.003451,HTTP,req,9,1,A,210.98.76.54,12.34.56.78
2,0.003455,RDB2,req,10,1-0,p,12.34.56.78,12.34.56.82,D
2,0.003684,RDB2,res,10,1-0
2,0.003754,RDB2,req,11,1-1,q,12.34.56.78,12.34.56.82,D
2,0.004018,RDB2,res,11,1-1
2,0.004035,HTTP,res,9,1
```
— 73

```
3,0.008826,HTTP,req,21,0,A,210.98.76.54,12.34.56.78
3,0.008830,RDB2,req,22,0-0,p,12.34.56.78,12.34.56.82,D
3,0.008984,RDB2,res,22,0-0
3,0.009042,HTTP,res,21,0
```
— 74

```
4,0.009429,HTTP,req,23,0,A,210.98.76.54,12.34.56.78
4,0.009439,RDB2,req,24,0-0,p,12.34.56.78,12.34.56.82,D
4,0.009716,RDB2,res,24,0-0
4,0.009755,HTTP,res,23,0
```
— 75

```
5,0.010641,HTTP,req,25,1,A,210.98.76.54,12.34.56.78
5,0.010648,RDB2,req,26,1-0,p,12.34.56.78,12.34.56.82,D
5,0.010913,RDB2,res,26,1-0
5,0.010992,RDB2,req,27,1-1,q,12.34.56.78,12.34.56.82,D
5,0.011067,RDB2,res,27,1-1
5,0.011270,HTTP,res,25,1
```
— 76

```
6,0.012439,HTTP,req,28,0,A,210.98.76.54,12.34.56.78
6,0.012467,RDB2,req,29,0-0,p,12.34.56.78,12.34.56.82,D
6,0.012521,RDB2,res,29,0-0
6,0.012575,HTTP,res,28,0
```
— 77

```
7,0.014355,HTTP,req,38,0,A,210.98.76.54,12.34.56.78
7,0.014372,RDB2,req,39,0-0,p,12.34.56.78,12.34.56.82,D
7,0.014587,RDB2,res,39,0-0
7,0.014872,HTTP,res,38,0
```
— 78

FIG. 25

A START MESSAGE SET changed from U to S

```
2,0.002350,0.002665,HTTP,A,{3},{ },{5},S
4,0.002568,0.002698,HTTP,A,{6},{ },{5},U
12,0.004969,0.005904,HTTP,A,{13},{ },{15},U
14,0.005244,0.005765,HTTP,A,{ },{ },{15},U
16,0.007448,0.008304,HTTP,A,{17,18},{ },{20},U
19,0.007742,0.008021,HTTP,A,{ },{ },{20},U
30,0.012806,0.014062,HTTP,A,{31,37},{ },{33,34,36},U
32,0.012907,0.013193,HTTP,A,{ },{ },{33,34},U
35,0.013044,0.013268,HTTP,A,{ },{ },{36},U
```

FIG. 28 changed from U to E

B DESCENDANT MESSAGE SET

```
3,0.002358,0.002450,RDB2,p,{2},D
5,0.002577,0.002642,RDB2,q,{2,4},U
6,0.002620,0.002665,RDB2,p,{4},D
13,0.004997,0.005678,RDB2,p,{12},D
15,0.005266,0.005735,RDB2,p,{12,14},E
17,0.007449,0.007478,RDB2,p,{16},D
18,0.007501,0.008301,RDB2,q,{16},D
20,0.007754,0.007988,RDB2,p,{16,19},U
31,0.012836,0.013405,RDB2,p,{30},D
33,0.012942,0.012945,RDB2,p,{30,32},U
34,0.012955,0.013170,RDB2,q,{30,32},U
36,0.013066,0.013241,RDB2,p,{30,35},U
37,0.013409,0.013774,RDB2,q,{30},D
```

FIG. 29

A  START MESSAGE SET

"15" moved
"15" deleted 2,0.002350,0.002665,HTTP,A,{3},{ },{5},S
4,0.002568,0.002698,HTTP,A,{6},{ },{5},U
12,0.004969,0.005904,HTTP,A,{13},{ },{15},U
14,0.005244,0.005765,HTTP,A,{ },{15},{15},U
16,0.007448,0.008304,HTTP,A,{17,18},{ },{20},U
19,0.007742,0.008021,HTTP,A,{ },{ },{20},U
30,0.012806,0.014062,HTTP,A,{31,37},{ },{33,34,36},U
32,0.012907,0.013193,HTTP,A,{ },{ },{33,34},U
35,0.013044,0.013268,HTTP,A,{ },{ },{36},U

FIG. 30

```
8,0.002350,HTTP,req,2,0,A,210.98.76.54,12.34.56.78
8,0.002358,RDB2,req,3,0-0,p,12.34.56.78,12.34.56.82,D
8,0.002450,RDB2,res,3,0-0
8,0.002665,HTTP,res,2,0
```
— 81

```
9,0.002568,HTTP,req,4,0,A,210.98.76.54,12.34.56.78
9,0.002620,RDB2,req,6,0-0,p,12.34.56.78,12.34.56.82,D
9,0.002665,RDB2,res,6,0-0
9,0.002698,HTTP,res,4,0
```
— 82

```
10,0.004969,HTTP,req,12,0,A,210.98.76.54,12.34.56.78
10,0.004997,RDB2,req,13,0-0,p,12.34.56.78,12.34.56.82,D
10,0.005678,RDB2,res,13,0-0
10,0.005904,HTTP,res,12,0
```
— 83

```
11,0.005244,HTTP,req,14,0,A,210.98.76.54,12.34.56.78
11,0.005266,RDB2,req,15,0-0,p,12.34.56.78,12.34.56.82,E
11,0.005735,RDB2,res,15,0-0
11,0.005765,HTTP,res,14,0
```
— 84

```
12,0.007448,HTTP,req,16,1,A,210.98.76.54,12.34.56.78
12,0.007449,RDB2,req,17,1-0,p,12.34.56.78,12.34.56.82,D
12,0.007478,RDB2,res,17,1-0
12,0.007501,RDB2,req,18,1-1,q,12.34.56.78,12.34.56.82,D
12,0.008301,RDB2,res,18,1-1
12,0.008304,HTTP,res,16,1
```
— 85

```
13,0.007742,HTTP,req,19,0,A,210.98.76.54,12.34.56.78
13,0.007754,RDB2,req,20,0-0,p,12.34.56.78,12.34.56.82,E
13,0.007988,RDB2,res,20,0-0
13,0.008021,HTTP,res,19,0
```
— 86

```
14,0.012806,HTTP,req,30,1,A,210.98.76.54,12.34.56.78
14,0.012836,RDB2,req,31,1-0,p,12.34.56.78,12.34.56.82,D
14,0.013405,RDB2,res,31,1-0
14,0.013409,RDB2,req,37,1-1,q,12.34.56.78,12.34.56.82,D
14,0.013774,RDB2,res,37,1-1
14,0.014062,HTTP,res,30,1
```
— 87

```
15,0.012907,HTTP,req,32,1,A,210.98.76.54,12.34.56.78
15,0.012942,RDB2,req,33,1-0,p,12.34.56.78,12.34.56.82,E
15,0.012945,RDB2,res,33,1-0
15,0.012955,RDB2,req,34,1-1,q,12.34.56.78,12.34.56.82,E
15,0.013170,RDB2,res,34,1-1
15,0.013193,HTTP,res,32,1
```
— 88

```
16,0.013044,HTTP,req,35,0,A,210.98.76.54,12.34.56.78
16,0.013066,RDB2,req,36,0-0,p,12.34.56.78,12.34.56.82,E
16,0.013241,RDB2,res,36,0-0
16,0.013268,HTTP,res,35,0
```
— 89

FIG. 31

A   START MESSAGE SET

```
2,0.002350,0.002665,HTTP,A,{3},{ },{5},S
4,0.002568,0.002698,HTTP,A,{6},{ },{5},S
12,0.004969,0.005904,HTTP,A,{13},{ },{ },S
14,0.005244,0.005765,HTTP,A,{ },{15},{ },S
16,0.007448,0.008304,HTTP,A,{17,18},{ },{ },S
19,0.007742,0.008021,HTTP,A,{ },{20},{ },S
30,0.012806,0.014062,HTTP,A,{31,37},{ },{},S
32,0.012907,0.013193,HTTP,A,{ },{33,34},{ },S
35,0.013044,0.013268,HTTP,A,{ },{36},{},S
```

FIG. 32

B DESCENDANT MESSAGE SET changed form U to R

```
3,0.002358,0.002450,RDB2,p,{2},D
5,0.002577,0.002642,RDB2,q,{2,4},R
6,0.002620,0.002665,RDB2,p,{4},D
13,0.004997,0.005678,RDB2,p,{12},D
15,0.005266,0.005735,RDB2,p,{12,14},E
17,0.007449,0.007478,RDB2,p,{16},D
18,0.007501,0.008301,RDB2,q,{16},D
20,0.007754,0.007988,RDB2,p,{16,19},E
31,0.012836,0.013405,RDB2,p,{30},D
33,0.012942,0.012945,RDB2,p,{30,32},E
34,0.012955,0.013170,RDB2,q,{30,32},E
36,0.013066,0.013241,RDB2,p,{30,35},E
37,0.013409,0.013774,RDB2,q,{30},D
```

FIG. 34

A  START MESSAGE SET          "5" moved
                              "5" deleted 2,0.002350,0.002665,HTTP,A,{3},{5},{5},S
4,0.002568,0.002698,HTTP,A,{6},{ },{5},S
12,0.004969,0.005904,HTTP,A,{13},{ },{ },S
14,0.005244,0.005765,HTTP,A,{ },{15},{ },S
16,0.007448,0.008304,HTTP,A,{17,18},{ },{ },S
19,0.007742,0.008021,HTTP,A,{ },{20},{ },S
30,0.012806,0.014062,HTTP,A,{31,37},{ },{ },S
32,0.012907,0.013193,HTTP,A,{ },{33,34},{ },S
35,0.013044,0.013268,HTTP,A,{ },{36},{ },S

FIG. 36

90 TRANSACTION IDENTIFICATION RESULT

```
0,0.002292,HTTP,req,0,0,A,210.98.76.54,12.34.56.78
0,0.002296,RDB2,req,1,0-0,p,12.34.56.78,12.34.56.82,D
0,0.002434,RDB2,res,1,0-0
0,0.002446,HTTP,res,0,0
1,0.002623,HTTP,req,7,0,A,210.98.76.54,12.34.56.78
1,0.002643,RDB2,req,8,0-0,p,12.34.56.78,12.34.56.82,D
1,0.003052,RDB2,res,8,0-0
1,0.003079,HTTP,res,7,0
2,0.003451,HTTP,req,9,1,A,210.98.76.54,12.34.56.78
2,0.003455,RDB2,req,10,1-0,p,12.34.56.78,12.34.56.82,D
2,0.003684,RDB2,res,10,1-0
2,0.003754,RDB2,req,11,1-1,q,12.34.56.78,12.34.56.82,D
2,0.004018,RDB2,res,11,1-1
2,0.004035,HTTP,res,9,1
3,0.008826,HTTP,req,21,0,A,210.98.76.54,12.34.56.78
3,0.008830,RDB2,req,22,0-0,p,12.34.56.78,12.34.56.82,D
3,0.008984,RDB2,res,22,0-0
3,0.009042,HTTP,res,21,0
4,0.009429,HTTP,req,23,0,A,210.98.76.54,12.34.56.78
4,0.009439,RDB2,req,24,0-0,p,12.34.56.78,12.34.56.82,D
4,0.009716,RDB2,res,24,0-0
4,0.009755,HTTP,res,23,0
5,0.010641,HTTP,req,25,1,A,210.98.76.54,12.34.56.78
5,0.010648,RDB2,req,26,1-0,p,12.34.56.78,12.34.56.82,D
5,0.010913,RDB2,res,26,1-0
5,0.010992,RDB2,req,27,1-1,q,12.34.56.78,12.34.56.82,D
5,0.011067,RDB2,res,27,1-1
5,0.011270,HTTP,res,25,1
6,0.012439,HTTP,req,28,0,A,210.98.76.54,12.34.56.78
6,0.012467,RDB2,req,29,0-0,p,12.34.56.78,12.34.56.82,D
6,0.012521,RDB2,res,29,0-0
6,0.012575,HTTP,res,28,0
7,0.014355,HTTP,req,38,0,A,210.98.76.54,12.34.56.78
7,0.014372,RDB2,req,39,0-0,p,12.34.56.78,12.34.56.82,D
7,0.014587,RDB2,res,39,0-0
7,0.014872,HTTP,res,38,0
8,0.002350,HTTP,req,2,1,A,210.98.76.54,12.34.56.78
8,0.002358,RDB2,req,3,1-0,p,12.34.56.78,12.34.56.82,D
8,0.002450,RDB2,res,3,1-0
8,0.002617,RDB2,req,5,1-1,q,12.34.56.78,12.34.56.82,R
8,0.002640,RDB2,res,5,1-1
8,0.002665,HTTP,res,2,1
                  .
                  .
                  .
```

FIG. 37

90 TRANSACTION IDENTIFICATION RESULT

```
.
.
.
9,0.002568,HTTP,req,4,0,A,210.98.76.54,12.34.56.78
9,0.002620,RDB2,req,6,0-0,p,12.34.56.78,12.34.56.82,D
9,0.002665,RDB2,res,6,0-0
9,0.002698,HTTP,res,4,0
10,0.004969,HTTP,req,12,0,A,210.98.76.54,12.34.56.78
10,0.004997,RDB2,req,13,0-0,p,12.34.56.78,12.34.56.82,D
10,0.005678,RDB2,res,13,0-0
10,0.005904,HTTP,res,12,0
11,0.005244,HTTP,req,14,0,A,210.98.76.54,12.34.56.78
11,0.005266,RDB2,req,15,0-0,p,12.34.56.78,12.34.56.82,E
11,0.005735,RDB2,res,15,0-0
11,0.005765,HTTP,res,14,0
12,0.007448,HTTP,req,16,1,A,210.98.76.54,12.34.56.78
12,0.007449,RDB2,req,17,1-0,p,12.34.56.78,12.34.56.82,D
12,0.007478,RDB2,res,17,1-0
12,0.007501,RDB2,req,18,1-1,q,12.34.56.78,12.34.56.82,D
12,0.008301,RDB2,res,18,1-1
12,0.008304,HTTP,res,16,1
13,0.007742,HTTP,req,19,0,A,210.98.76.54,12.34.56.78
13,0.007754,RDB2,req,20,0-0,p,12.34.56.78,12.34.56.82,E
13,0.007988,RDB2,res,20,0-0
13,0.008021,HTTP,res,19,0
14,0.012806,HTTP,req,30,1,A,210.98.76.54,12.34.56.78
14,0.012836,RDB2,req,31,1-0,p,12.34.56.78,12.34.56.82,D
14,0.013405,RDB2,res,31,1-0
14,0.013409,RDB2,req,37,1-1,q,12.34.56.78,12.34.56.82,D
14,0.013774,RDB2,res,37,1-1
14,0.014062,HTTP,res,30,1
15,0.012907,HTTP,req,32,1,A,210.98.76.54,12.34.56.78
15,0.012942,RDB2,req,33,1-0,p,12.34.56.78,12.34.56.82,E
15,0.012945,RDB2,res,33,1-0
15,0.012955,RDB2,req,34,1-1,q,12.34.56.78,12.34.56.82,E
15,0.013170,RDB2,res,34,1-1
15,0.013193,HTTP,res,32,1
16,0.013044,HTTP,req,35,0,A,210.98.76.54,12.34.56.78
16,0.013066,RDB2,req,36,0-0,p,12.34.56.78,12.34.56.82,E
16,0.013241,RDB2,res,36,0-0
16,0.013268,HTTP,res,35,0
```

FIG. 38

91 TRANSACTION IDENTIFICATION RESULT

```
0;HTTP;A, 0-0;RDB2;p [11/6/5/7.0]
1;HTTP;A, 1-0;RDB2;p, 1-1;RDB2;q [6/2/4/2.8]
```

FIG. 39

112 MESSAGE LOG

```
0,0.002292,0.002446,HTTP,A,OK,210.98.76.54,12.34.56.78
1,0.002296,0.002434,RDB2,p,ok,12.34.56.78,12.34.56.82
2,0.002350,0.002665,HTTP,A,OK,210.98.76.54,12.34.56.78
3,0.002358,0.002450,RDB2,p,ok,12.34.56.78,12.34.56.82
4,0.002568,0.002698,HTTP,A,FAIL,210.98.76.54,12.34.56.78
5,0.002577,0.002642,RDB2,q,ok,12.34.56.78,12.34.56.82
6,0.002620,0.002665,RDB2,p,ok,12.34.56.78,12.34.56.82
7,0.002623,0.003079,HTTP,A,OK,210.98.76.54,12.34.56.78
8,0.002643,0.003052,RDB2,p,ok,12.34.56.78,12.34.56.82
9,0.003451,0.004035,HTTP,A,FAIL,210.98.76.54,12.34.56.78
10,0.003455,0.003684,RDB2,p,ok,12.34.56.78,12.34.56.82
11,0.003754,0.004018,RDB2,q,ok,12.34.56.78,12.34.56.82
12,0.004969,0.005904,HTTP,A,OK,210.98.76.54,12.34.56.78
13,0.004997,0.005678,RDB2,p,ok,12.34.56.78,12.34.56.82
14,0.005244,0.005765,HTTP,A,OK,210.98.76.54,12.34.56.78
15,0.005266,0.005735,RDB2,p,ok,12.34.56.78,12.34.56.82
16,0.007448,0.008304,HTTP,A,OK,210.98.76.54,12.34.56.78
17,0.007449,0.007478,RDB2,p,ok,12.34.56.78,12.34.56.82
18,0.007501,0.008301,RDB2,q,ok,12.34.56.78,12.34.56.82
19,0.007742,0.008021,HTTP,A,OK,210.98.76.54,12.34.56.78
20,0.007754,0.007988,RDB2,p,ok,12.34.56.78,12.34.56.82
21,0.008826,0.009042,HTTP,A,FAIL,210.98.76.54,12.34.56.78
22,0.008830,0.008984,RDB2,p,ok,12.34.56.78,12.34.56.82
23,0.009429,0.009755,HTTP,A,OK,210.98.76.54,12.34.56.78
24,0.009439,0.009716,RDB2,p,ok,12.34.56.78,12.34.56.82
25,0.010641,0.011270,HTTP,A,OK,210.98.76.54,12.34.56.78
26,0.010648,0.010913,RDB2,p,ok,12.34.56.78,12.34.56.82
27,0.010992,0.011067,RDB2,q,ok,12.34.56.78,12.34.56.82
28,0.012439,0.012575,HTTP,A,OK,210.98.76.54,12.34.56.78
29,0.012467,0.012521,RDB2,p,ok,12.34.56.78,12.34.56.82
30,0.012806,0.014062,HTTP,A,OK,210.98.76.54,12.34.56.78
31,0.012836,0.013405,RDB2,p,ok,12.34.56.78,12.34.56.82
32,0.012907,0.013193,HTTP,A,FAIL,210.98.76.54,12.34.56.78
33,0.012942,0.012945,RDB2,p,ok,12.34.56.78,12.34.56.82
34,0.012955,0.013170,RDB2,q,ok,12.34.56.78,12.34.56.82
35,0.013044,0.013268,HTTP,A,OK,210.98.76.54,12.34.56.78
36,0.013066,0.013241,RDB2,p,ok,12.34.56.78,12.34.56.82
37,0.013409,0.013774,RDB2,q,ok,12.34.56.78,12.34.56.82
38,0.014355,0.014872,HTTP,A,OK,210.98.76.54,12.34.56.78
39,0.014372,0.014587,RDB2,p,ok,12.34.56.78,12.34.56.82
40,0.014503,0.014998,RDB2,p,ok,12.34.56.78,12.34.56.82
```

FIG. 42

```
0,0.002292,HTTP,req,0,0,A,210.98.76.54,12.34.56.78
0,0.002296,RDB2,req,1,0-0,p,12.34.56.78,12.34.56.82,D
0,0.002434,RDB2,res,1,0-0,ok
0,0.002446,HTTP,res,0,0,OK
```
— 211

```
1,0.002623,HTTP,req,7,0,A,210.98.76.54,12.34.56.78
1,0.002643,RDB2,req,8,0-0,p,12.34.56.78,12.34.56.82,D
1,0.003052,RDB2,res,8,0-0,ok
1,0.003079,HTTP,res,7,0,OK
```
— 212

```
2,0.003451,HTTP,req,9,3,A,210.98.76.54,12.34.56.78
2,0.003455,RDB2,req,10,3-0,p,12.34.56.78,12.34.56.82,D
2,0.003684,RDB2,res,10,3-0,ok
2,0.003754,RDB2,req,11,3-1,q,12.34.56.78,12.34.56.82,D
2,0.004018,RDB2,res,11,3-1,ok
2,0.004035,HTTP,res,9,3,FAIL
```
— 213

```
3,0.008826,HTTP,req,21,2,A,210.98.76.54,12.34.56.78
3,0.008830,RDB2,req,22,2-0,p,12.34.56.78,12.34.56.82,D
3,0.008984,RDB2,res,22,2-0,ok
3,0.009042,HTTP,res,21,2,FAIL
```
— 214

```
4,0.009429,HTTP,req,23,0,A,210.98.76.54,12.34.56.78
4,0.009439,RDB2,req,24,0-0,p,12.34.56.78,12.34.56.82,D
4,0.009716,RDB2,res,24,0-0,ok
4,0.009755,HTTP,res,23,0,OK
```
— 215

```
5,0.010641,HTTP,req,25,1,A,210.98.76.54,12.34.56.78
5,0.010648,RDB2,req,26,1-0,p,12.34.56.78,12.34.56.82,D
5,0.010913,RDB2,res,26,1-0,ok
5,0.010992,RDB2,req,27,1-1,q,12.34.56.78,12.34.56.82,D
5,0.011067,RDB2,res,27,1-1,ok
5,0.011270,HTTP,res,25,1,OK
```
— 216

```
6,0.012439,HTTP,req,28,0,A,210.98.76.54,12.34.56.78
6,0.012467,RDB2,req,29,0-0,p,12.34.56.78,12.34.56.82,D
6,0.012521,RDB2,res,29,0-0,ok
6,0.012575,HTTP,res,28,0,OK
```
— 217

```
7,0.014355,HTTP,req,38,0,A,210.98.76.54,12.34.56.78
7,0.014372,RDB2,req,39,0-0,p,12.34.56.78,12.34.56.82,D
7,0.014587,RDB2,res,39,0-0,ok
7,0.014872,HTTP,res,38,0,OK
```
— 218

FIG. 43

A  START MESSAGE SET 2,0.002350,0.002665,HTTP,A,OK,{3},{},{5},U
4,0.002568,0.002698,HTTP,A,FAIL,{6},{},{5},U
12,0.004969,0.005904,HTTP,A,OK,{13},{},{15},U
14,0.005244,0.005765,HTTP,A,OK,{},{},{15},U
16,0.007448,0.008304,HTTP,A,OK,{17,18},{},{20},U
19,0.007742,0.008021,HTTP,A,OK,{},{},{20},U
30,0.012806,0.014062,HTTP,A,OK,{31,37},{},{33,34,36},U
32,0.012907,0.013193,HTTP,A,FAIL,{},{},{33,34},U
35,0.013044,0.013268,HTTP,A,OK,{},{},{36},U

FIG. 44

B DESCENDANT MESSAGE SET

```
3,0.002358,0.002450,RDB2,p,ok,{2},D
5,0.002577,0.002642,RDB2,q,ok,{2,4},U
6,0.002620,0.002665,RDB2,p,ok,{4},D
13,0.004997,0.005678,RDB2,p,ok,{12},D
15,0.005266,0.005735,RDB2,p,ok,{12,14},U
17,0.007449,0.007478,RDB2,p,ok,{16},D
18,0.007501,0.008301,RDB2,q,ok,{16},D
20,0.007754,0.007988,RDB2,p,ok,{16,19},U
31,0.012836,0.013405,RDB2,p,ok,{30},D
33,0.012942,0.012945,RDB2,p,ok,{30,32},U
34,0.012955,0.013170,RDB2,q,ok,{30,32},U
36,0.013066,0.013241,RDB2,p,ok,{30,35},U
37,0.013409,0.013774,RDB2,q,ok,{30},D
```

FIG. 45

A  START MESSAGE SET

```
2,0.002350,0.002665,HTTP,A,OK,{3},{},{5},S
4,0.002568,0.002698,HTTP,A,FAIL,{6},{},{5},U
12,0.004969,0.005904,HTTP,A,OK,{13},{},{},S
14,0.005244,0.005765,HTTP,A,OK,{},{15},{},S
16,0.007448,0.008304,HTTP,A,OK,{17,18},{},{},U
19,0.007742,0.008021,HTTP,A,OK,{},{20},{},S
30,0.012806,0.014062,HTTP,A,OK,{31,37},{},{33,34},U
32,0.012907,0.013193,HTTP,A,FAIL,{},{},{33,34},U
35,0.013044,0.013268,HTTP,A,OK,{},{36},{},S
```

FIG. 46

B DESCENDANT MESSAGE SET 3,0.002358,0.002450,RDB2,p,ok,{2},D
5,0.002577,0.002642,RDB2,q,ok,{2,4},U
6,0.002620,0.002665,RDB2,p,ok,{4},D
13,0.004997,0.005678,RDB2,p,ok,{12},D
15,0.005266,0.005735,RDB2,p,ok,{12,14},E
17,0.007449,0.007478,RDB2,p,ok,{16},D
18,0.007501,0.008301,RDB2,q,ok,{16},D
20,0.007754,0.007988,RDB2,p,ok,{16,19},E
31,0.012836,0.013405,RDB2,p,ok,{30},D
33,0.012942,0.012945,RDB2,p,ok,{30,32},U
34,0.012955,0.013170,RDB2,q,ok,{30,32},U
36,0.013066,0.013241,RDB2,p,ok,{30,35},E
37,0.013409,0.013774,RDB2,q,ok,{30},D

FIG. 47

```
8,0.002350,HTTP,req,2,0,A,210.98.76.54,12.34.56.78          221
8,0.002358,RDB2,req,3,0-0,p,12.34.56.78,12.34.56.82,D
8,0.002450,RDB2,res,3,0-0,ok
8,0.002665,HTTP,res,2,0,OK
                                                            222
9,0.004969,HTTP,req,12,0,A,210.98.76.54,12.34.56.78
9,0.004997,RDB2,req,13,0-0,p,12.34.56.78,12.34.56.82,D
9,0.005678,RDB2,res,13,0-0,ok
9,0.005904,HTTP,res,12,0,OK
                                                            223
10,0.005244,HTTP,req,14,0,A,210.98.76.54,12.34.56.78
10,0.005266,RDB2,req,15,0-0,p,12.34.56.78,12.34.56.82,E
10,0.005735,RDB2,res,15,0-0,ok
10,0.005765,HTTP,res,14,0,OK
                                                            224
11,0.007742,HTTP,req,19,0,A,210.98.76.54,12.34.56.78
11,0.007754,RDB2,req,20,0-0,p,12.34.56.78,12.34.56.82,E
11,0.007988,RDB2,res,20,0-0,ok
11,0.008021,HTTP,res,19,0,OK
                                                            225
12,0.013044,HTTP,req,35,0,A,210.98.76.54,12.34.56.78
12,0.013066,RDB2,req,36,0-0,p,12.34.56.78,12.34.56.82,E
12,0.013241,RDB2,res,36,0-0,ok
12,0.013268,HTTP,res,35,0,OK
                                                            226
13,0.007448,HTTP,req,16,1,A,210.98.76.54,12.34.56.78
13,0.007449,RDB2,req,17,1-0,p,12.34.56.78,12.34.56.82,D
13,0.007478,RDB2,res,17,1-0,ok
13,0.007501,RDB2,req,18,1-1,q,12.34.56.78,12.34.56.82,D
13,0.008301,RDB2,res,18,1-1,ok
13,0.008304,HTTP,res,16,1,OK
```

FIG. 48

```
14,0.012907,HTTP,req,32,2,A,210.98.76.54,12.34.56.78
14,0.012942,RDB2,req,33,2-0,p,12.34.56.78,12.34.56.82,R
14,0.012945,RDB2,res,33,2-0,ok
14,0.013193,HTTP,res,32,2,FAIL
```
227

FIG. 50

```
15,0.002568,HTTP,req,4,2,A,210.98.76.54,12.34.56.78
15,0.002620,RDB2,req,6,2-1,p,12.34.56.78,12.34.56.82,D
15,0.002665,RDB2,res,6,2-1,ok
15,0.002698,HTTP,res,4,2,FAIL
```
228

FIG. 52

```
16,0.012806,HTTP,req,30,1,A,210.98.76.54,12.34.56.78
16,0.012836,RDB2,req,31,1-0,p,12.34.56.78,12.34.56.82,D
16,0.013405,RDB2,res,31,1-0,ok
16,0.013409,RDB2,req,37,1-1,q,12.34.56.78,12.34.56.82,D
16,0.013774,RDB2,res,37,1-1,ok
16,0.014062,HTTP,res,30,1,OK
```
— 229

FIG. 53

240 TRANSACTION IDENTIFICATION RESULT

```
0,0.002292,HTTP,req,0,0,A,210.98.76.54,12.34.56.78
0,0.002296,RDB2,req,1,0-0,p,12.34.56.78,12.34.56.82,D
0,0.002434,RDB2,res,1,0-0,ok
0,0.002446,HTTP,res,0,0,OK
1,0.002623,HTTP,req,7,0,A,210.98.76.54,12.34.56.78
1,0.002643,RDB2,req,8,0-0,p,12.34.56.78,12.34.56.82,D
1,0.003052,RDB2,res,8,0-0,ok
1,0.003079,HTTP,res,7,0,OK
2,0.003451,HTTP,req,9,3,A,210.98.76.54,12.34.56.78
2,0.003455,RDB2,req,10,3-0,p,12.34.56.78,12.34.56.82,D
2,0.003684,RDB2,res,10,3-0,ok
2,0.003754,RDB2,req,11,3-1,q,12.34.56.78,12.34.56.82,D
2,0.004018,RDB2,res,11,3-1,ok
2,0.004035,HTTP,res,9,3,FAIL
3,0.008826,HTTP,req,21,2,A,210.98.76.54,12.34.56.78
3,0.008830,RDB2,req,22,2-0,p,12.34.56.78,12.34.56.82,D
3,0.008984,RDB2,res,22,2-0,ok
3,0.009042,HTTP,res,21,2,FAIL
4,0.009429,HTTP,req,23,0,A,210.98.76.54,12.34.56.78
4,0.009439,RDB2,req,24,0-0,p,12.34.56.78,12.34.56.82,D
4,0.009716,RDB2,res,24,0-0,ok
4,0.009755,HTTP,res,23,0,OK
5,0.010641,HTTP,req,25,1,A,210.98.76.54,12.34.56.78
5,0.010648,RDB2,req,26,1-0,p,12.34.56.78,12.34.56.82,D
5,0.010913,RDB2,res,26,1-0,ok
5,0.010992,RDB2,req,27,1-1,q,12.34.56.78,12.34.56.82,D
5,0.011067,RDB2,res,27,1-1,ok
5,0.011270,HTTP,res,25,1,OK
6,0.012439,HTTP,req,28,0,A,210.98.76.54,12.34.56.78
6,0.012467,RDB2,req,29,0-0,p,12.34.56.78,12.34.56.82,D
6,0.012521,RDB2,res,29,0-0,ok
6,0.012575,HTTP,res,28,0,OK
7,0.014355,HTTP,req,38,0,A,210.98.76.54,12.34.56.78
7,0.014372,RDB2,req,39,0-0,p,12.34.56.78,12.34.56.82,D
7,0.014587,RDB2,res,39,0-0,ok
7,0.014872,HTTP,res,38,0,OK
8,0.002350,HTTP,req,2,1,A,210.98.76.54,12.34.56.78
8,0.002358,RDB2,req,3,1-0,p,12.34.56.78,12.34.56.82,D
8,0.002450,RDB2,res,3,1-0,ok
8,0.002617,RDB2,req,5,1-1,q,12.34.56.78,12.34.56.82,R
8,0.002640,RDB2,res,5,1-1,ok
8,0.002665,HTTP,res,2,1,OK
                    .
                    .
                    .
```

FIG. 54

240 TRANSACTION IDENTIFICATION RESULT

```
.
.
.
9,0.004969,HTTP,req,12,0,A,210.98.76.54,12.34.56.78
9,0.004997,RDB2,req,13,0-0,p,12.34.56.78,12.34.56.82,D
9,0.005678,RDB2,res,13,0-0,ok
9,0.005904,HTTP,res,12,0,OK
10,0.005244,HTTP,req,14,0,A,210.98.76.54,12.34.56.78
10,0.005266,RDB2,req,15,0-0,p,12.34.56.78,12.34.56.82,E
10,0.005735,RDB2,res,15,0-0,ok
10,0.005765,HTTP,res,14,0,OK
11,0.007742,HTTP,req,19,0,A,210.98.76.54,12.34.56.78
11,0.007754,RDB2,req,20,0-0,p,12.34.56.78,12.34.56.82,E
11,0.007988,RDB2,res,20,0-0,ok
11,0.008021,HTTP,res,19,0,OK
12,0.013044,HTTP,req,35,0,A,210.98.76.54,12.34.56.78
12,0.013066,RDB2,req,36,0-0,p,12.34.56.78,12.34.56.82,E
12,0.013241,RDB2,res,36,0-0,ok
12,0.013268,HTTP,res,35,0,OK
13,0.007448,HTTP,req,16,1,A,210.98.76.54,12.34.56.78
13,0.007449,RDB2,req,17,1-0,p,12.34.56.78,12.34.56.82,D
13,0.007478,RDB2,res,17,1-0,ok
13,0.007501,RDB2,req,18,1-1,q,12.34.56.78,12.34.56.82,D
13,0.008301,RDB2,res,18,1-1,ok
13,0.008304,HTTP,res,16,1,OK
14,0.012907,HTTP,req,32,3,A,210.98.76.54,12.34.56.78
14,0.012942,RDB2,req,33,3-0,p,12.34.56.78,12.34.56.82,R
14,0.012945,RDB2,res,33,3-0,ok
14,0.012955,RDB2,req,34,3-1,q,12.34.56.78,12.34.56.82,R
14,0.013170,RDB2,res,34,3-1,ok
14,0.013193,HTTP,res,32,3,FAIL
15,0.002568,HTTP,req,4,2,A,210.98.76.54,12.34.56.78
15,0.002620,RDB2,req,6,2-1,p,12.34.56.78,12.34.56.82,D
15,0.002665,RDB2,res,6,2-1,ok
15,0.002698,HTTP,res,4,2,FAIL
16,0.012806,HTTP,req,30,1,A,210.98.76.54,12.34.56.78
16,0.012836,RDB2,req,31,1-0,p,12.34.56.78,12.34.56.82,D
16,0.013405,RDB2,res,31,1-0,ok
16,0.013409,RDB2,req,37,1-1,q,12.34.56.78,12.34.56.82,D
16,0.013774,RDB2,res,37,1-1,ok
16,0.014062,HTTP,res,30,1,OK
```

FIG. 55

241　TRANSACTION IDENTIFICATION RESULT

```
0;HTTP;A;OK, 0-0;RDB2;p;ok [9/5/4/5.8]
1;HTTP;A;OK, 1-0;RDB2;p;ok, 1-1;RDB2;q;ok [4/1/3/1.6]
2;HTTP;A;FAIL, 2-0;RDB2;p;ok [2/1/1/1.2]
3;HTTP;A;FAIL, 3-0;RDB2;p;ok, 3-1;RDB2;q;ok [2/1/1/1.2]
```

FIG. 56

251 ANALYSIS RESULT                                     "OK"

```
352;HTTP;"/path1/program.cgi?x=*&y=*";"Code:200",
352-0;IIOP;"/path2/methodA";"Code:200",
352-0-0;RDB2;"UpdateDB_A";"Code:200",
352-1;IIOP;"/path2/methodB";"Code:200",
352-1-0;RDB2;"UpdateDB_B";"Code:200"
[31;30;1](m=0.579,σ=1.66)
m±σ(0.348,0.963),m±2σ(0.209,1.60),as LogNormal
```

FIG. 62

METHOD AND APPARATUS FOR ANALYZING ONGOING SERVICE PROCESS BASED ON CALL DEPENDENCY BETWEEN MESSAGES

CROSS-REFERENCE TO RELATED APPLICATIONS

This application is based upon and claims the benefits of priority from the prior Japanese Patent Application No. 2005-143873, filed on May 17, 2005, the entire contents of which are incorporated herein by reference.

BACKGROUND OF THE INVENTION

1. Field of the Invention

The present invention relates to a method, apparatus, and computer program in a storage medium for analyzing ongoing service processes executed by a plurality of servers in a network system. More particularly, the present invention relates to a service process analyzing method, apparatus, and program for analyzing message traffic to identify service transactions taking place on a network system.

2. Description of the Related Art

Many of the systems providing Internet banking and other services are so large and complicated that it is extremely difficult to keep track of their processing activities or to locate the cause of failure or performance degradation. Those service processing systems are often organized as a network of multiple servers. A typical method to supervise the operating status of such a system is to collect operation log records at each server and analyze the collected records individually. Another method is to evaluate the service processing times measured by sending a request from a client and receiving a response from the destination server.

However, the former approach may overlook problems in such a case where the individual servers appear to be operating properly even though they do have a difficulty in server-to-server communications. The latter method also has a shortcoming in that it only watches client interface, ignoring interaction between servers.

Yet another method is proposed to analyze the behavior of a network system, including communication between servers. See, for example, "IBM Tivoli Monitoring for Transaction Performance helps maximize performance of your applications," International Business Machines Corporation, 2003. The proposed method analyzes messages exchanged between servers, based on the knowledge about massages used in actual transactions. This technique, however, cannot work in the cases where unknown applications are running on a server, or where the transactions have unknown layer structures.

Still another method is to discover every pair of server request and response by analyzing collected packets. See, for example, "LonManager Protocol Analyzer User's Guide Revision 1.0," Echelon Corporation, 1994. The proposed method analyzes the number of acknowledgment messages, response times, and the like for each individual processing request. However, this approach offers no solutions for analyzing a transaction as a series of processes invoked by a single service request.

Japanese Patent Application No. 2004-185909 proposes a solution for the above-described shortcomings of conventional methods. According to this patent application, a transaction model is built from message log records, based on the certainty of call dependency between messages. Even with this improved method, however, it is still difficult to build a correct model for infrequent transactions. Suppose, for example, that a message log contains the following records:

980 transactions of "HTTP;A-RDB2;p"
  20 transactions of "HTTP;A-RDB2;p-RDB2;q"

where "HTTP;A-RDB2;p" means a combination of a message of HTTP process "A" and a message of RDB2 process "p," and "HTTP;A-RDB2;p-RDB2;q" means a combination of a message of HTTP process "A" and two messages of RDB2 processes "p" and "q." Here the message "HTTP;A" is a calling message that initiates some server processes, causing more messages in the course of processing. In the present example, the method described in the Japanese Patent Application No. 2004-185909 will give a certainty of 98% to the former group of transactions "HTTP;A-RDB2;p" and 2% to the latter group of transactions "HTTP;A-RDB2;p-RDB2;q" with respect to the calling message "HTTP;A." With a certainty threshold greater than 2%, the method would neglect the minority transactions "HTTP;A-RDB2;p-RDB2;q." This could be a pitfall in analyzing recent web service systems which tend to produce a very wide variety of transactions from a single calling message.

SUMMARY OF THE INVENTION

In view of the foregoing, it is an object of the present invention to provide a service process analyzing method, apparatus, and program for observing and identifying transactions taking place between servers, particularly capable of discriminating between different transaction classes, including infrequent classes.

To accomplish the above object, the present invention provides a computer-readable storage medium storing a service process analysis program for analyzing service process status in a network system including a plurality of servers. The service process analysis program causing a computer to function as an apparatus comprising the following elements: (a) message collector, (b) message parser, (c) message record memory, (d) definite transaction finder, (e) transaction candidate builder, (f) candidate evaluator, (g) transaction estimator, and (h) result output unit.

The message collector collects messages exchanged in the network system, and the message parser parsing the collected messages. Records of the parsed messages are stored in the message record memory. The definite transaction finder identifies definite transactions by extracting, from the records stored in the message record memory, a combination of messages having unique and definite call dependency therebetween, besides satisfying a predetermined requirement concerning the call dependency. The transaction candidate builder selects each unsettled message included in neither the definite transactions nor previously estimated transactions, extracts a plurality of combinations of messages including the unsettled message selected, as well as satisfying the predetermined requirement, and produces one or more transaction candidates from the plurality of combinations of messages. The candidate evaluator evaluates likelihood of each of the transaction candidates, based on how many transactions of the same class have been identified as the definite transactions or estimated transactions. The transaction estimator produces another estimated transaction by selecting one of the transaction candidates based on the likelihood thereof. The result output unit that outputs the definite transactions and estimated transactions as an analysis result.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 18 shows a first example of a structure description of transactions.

FIG. 19 shows a second example of a structure description of transactions.

FIG. 20 shows a first example of a message log.

FIG. 23 gives an example of start messages whose unsettled descendant message list is empty.

FIG. 24 shows an example of descendant messages associated with start messages having an empty unsettled descendant message list.

FIG. 25 shows definite transactions that are identified.

FIG. 28 shows a start message set after updating of transaction identification status.

FIG. 29 shows a descendant message set after updating of start message identification status.

FIG. 30 shows a start message set after estimation of descendant messages.

FIG. 31 shows transactions selected as most likely transactions.

FIG. 32 shows a start message set after selection of most likely transactions.

FIG. 34 shows a descendant message set after replacement of estimated transactions.

FIG. 36 shows a start message set after the replacement of an estimated transaction.

FIGS. 37 and 38 show the first and second halves of a transaction identification result.

FIG. 39 shows a transaction identification result summarizing identified transactions by transaction class.

FIG. 42 shows a second example of a message log, whose records include response codes.

FIG. 43 shows definite transactions that are identified.

FIG. 44 shows a start message set after deletion of messages belonging to definite transactions.

FIG. 45 shows a descendant message set after deletion of messages belonging to definite transactions.

FIG. 46 shows a start message set after each message is subjected to a single cycle of a transaction estimation process.

FIG. 47 shows a descendant message set after each message is subjected to a single cycle of a transaction estimation process.

FIG. 48 shows estimated transactions produced as a result of the transaction estimation process.

FIG. 50 shows a transaction newly produced by an estimated transaction replacement process.

FIG. 52 shows a transaction newly produced by a transaction estimation process.

FIG. 53 shows another transaction newly produced by a transaction estimation process.

FIGS. 54 and 55 show the first and second halves of a transaction identification result.

FIG. 56 shows a transaction identification result summarizing identified transactions by transaction class.

FIG. 62 shows a result of transaction analysis.

DESCRIPTION OF THE PREFERRED EMBODIMENTS

Figure 1:
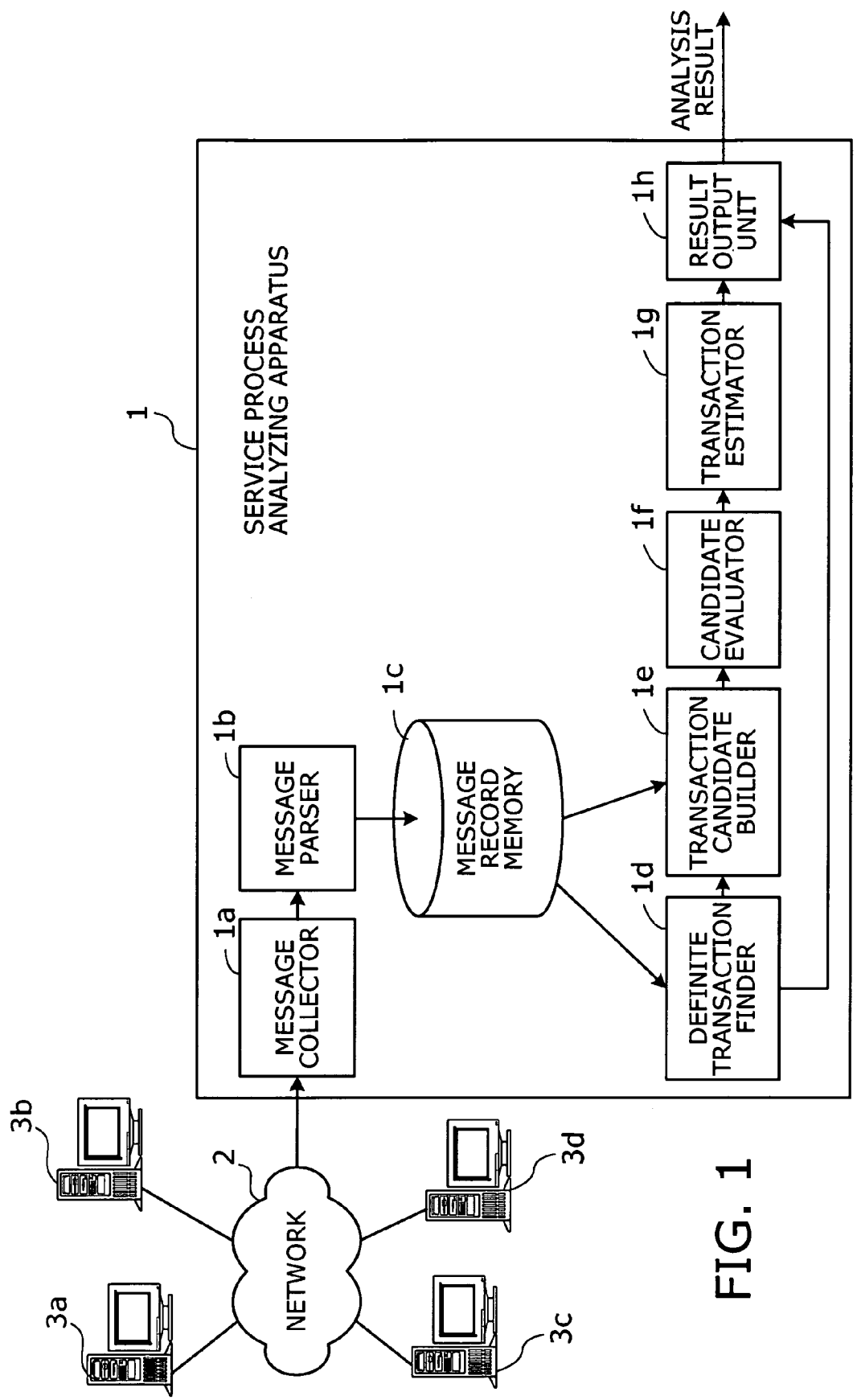
FIG. 1 provides an overview of an embodiment of the present invention.

Preferred embodiments of the present invention will be described below with reference to the accompanying drawings, wherein like reference numerals refer to like elements throughout.

FIG. 1 provides an overview of an embodiment of the present invention. Specifically, FIG. 1 shows a service process analyzing apparatus 1 connected to a plurality of servers 3a, 3b, 3c, and 3d via a network 2. This service process analyzing apparatus 1 includes, among others, the following elements: a message collector 1a, a message parser 1b, a message record memory 1c, a definite transaction finder 1d, a transaction candidate builder 1e, a candidate evaluator 1f, a transaction estimator 1g, and a result output unit 1h.

The message collector 1a collects messages exchanged over the network 2. The message parser 1b parses collected messages, and their records are stored into the message record memory 1c. More specifically, the message parser 1b examines each given message as to whether it is a request message requesting a specific service process or a response messages responding to such requests. Other message elements to be stored in the message record memory 1c are: occurrence time, source, and destination.

From the message records stored in the message record memory 1c, the definite transaction finder 1d extracts a combination of messages having unique and definite call dependency therebetween, besides satisfying a predetermined requirement concerning the call dependency. The resulting combination of extracted messages forms a definite transaction.

A transaction is defined herein as a set of messages bound by their call dependency (i.e., a relationship such that the source invokes the target operation). Each transaction is therefore attached a piece of information describing its hierarchical structure based on the call dependency between messages. Transactions are each formed from one initiating message (or calling message, i.e., the original message causing the destination server to execute a specified process, which may generate other messages) and optional derived messages (or called messages, i.e., messages sent by a server in response to a received message). In the following description, the term "start message" will be used to refer to a message sent from a client to a server to initiate a transaction. Also the term "descendant messages" will be used to refer to other messages derived directly or indirectly from a start message.

The transaction candidate builder 1e selects each unsettled message included in neither the definite transactions nor previously estimated transactions. The transaction candidate builder 1e extracts multiple combinations of messages, including the selected unsettled message, that satisfy the predetermined requirements related to call dependency. From those extracted message combinations, the transaction candidate builder 1e produces one or more transaction candidates. The requirements for transaction candidates may include time-related conditions, such as the occurrence time and duration of a message, in addition to message type and IP address information.

The candidate evaluator 1f evaluates the likelihood of each transaction candidate produced above, based on how many transactions of the same class have been identified as definite transactions or estimated transactions. The transaction estimator 1g selects one of the transaction candidates based on their respective likelihood scores. The selected transaction is referred to as an "estimated transaction." More specifically, the transaction estimator 1g chooses the most likely candidate as an estimated transaction. In this case, the transaction estimator 1g may qualify such a most likely candidate as an estimated transaction only when its likelihood score equals or exceeds a predetermined threshold. The result output unit 1h outputs the resulting definite transactions and estimated transactions as an analysis result.

Figure 2:
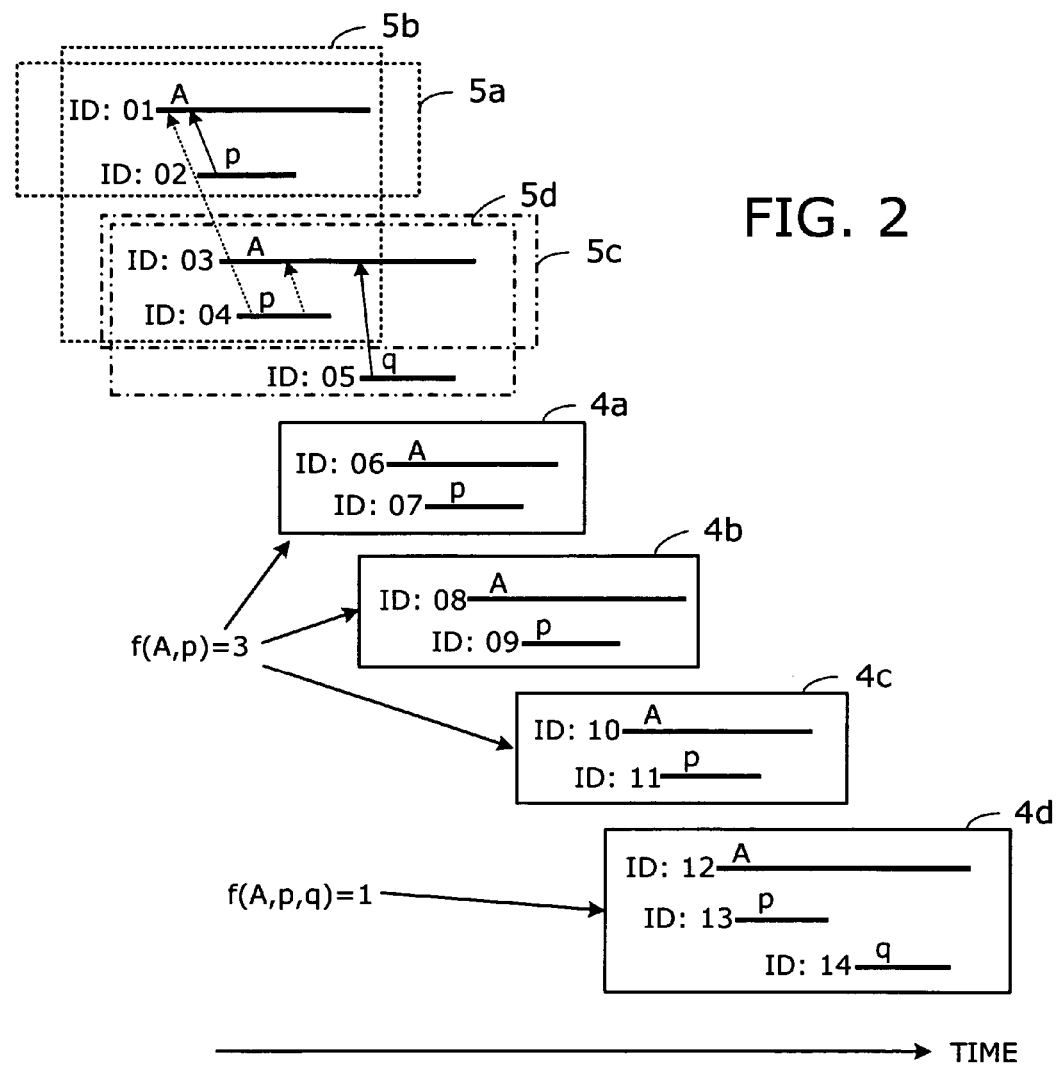
FIG. 2 shows an example of collected messages.

In operation, the message collector 1a in the above-described service process analyzing apparatus monitors message traffic over the network 2 to collect messages that are addressed to the servers 3a, 3b, 3c, and 3d. The collected messages are decomposed by the message parser 1b, and every message element necessary for analysis is stored into the message record memory 1c. FIG. 2 shows an example of collected messages. The horizontal axis represents the time, and each bold line segment represents the duration from start to end of a message. Every message has its own ID (e.g., "01," "02"), and the symbols "A," "p," and "q" placed on each message line indicate particular processes invoked by that message.

The definite transaction finder 1d receives those message records from the message record memory 1c and finds definite transaction that satisfies specific requirements for call dependency. For example, the following criteria will qualify messages as members of a definite transaction:

A message invoking process "A" plays a role of start message in a transaction.

Descendant messages are called from a start message, directly or indirectly.

A called message finishes in the duration of the calling message.

With the above criteria, the definite transaction finder 1d analyzes messages shown in FIG. 2, thus identifying four definite transactions 4a, 4b, 4c, and 4d. None of the descendant messages contained in each definite transaction 4a, 4b, 4c, and 4d can be called from messages other than their respective start messages, meaning that they have a definite and unique call dependency on their root parent message.

Although message "01" (i.e., a message with an ID of "01") and message "03" both invoke process "A" (i.e., they are start messages), they cannot constitute definite transactions because it is uncertain which of the two messages "01" and "03" has derived message "04." In this particular case shown in FIG. 2, message "02" is definitely derived from message "01," and similarly, message "05" is undoubtedly derived from message "03." Message "04," on the other hand, is contained in the duration of both messages "01" and "03." But there is no definite answer as to which is the parent message of this message "04."

The transaction candidate builder 1e produces transaction candidates in such uncertain cases. It is assumed, in the present example, that the transaction candidate builder 1e is designed to build a set of exclusive transaction candidates with each possible start message. Specifically, the transaction candidate builder 1e produces two transaction candidates 5a and 5b for a presumed start message "01." The former transaction candidate 5a is formed from two messages "01" and "02," while the latter transaction candidate 5b is formed from three messages "01," "02," and "04." Note that these transactions cannot occur simultaneously, hence "exclusive."

The two transaction candidates 5a and 5b are then passed to the candidate evaluator 1f to determine which is more likely. The yardstick for measuring the likelihood is the number of transactions of the same class that have been identified as definite transactions or estimated transactions. Note here that two transactions are of the same class when their messages have the same process names and the same call dependency structure.

In the example of FIG. 2, the messages constituting the transaction candidate 5a invoke process "p" from process "A." This type of transactions have already been identified as definite transactions 4a, 4b, and 4c. That is, there exist three instances of a definite transaction involving processes "A" and "p." The candidate evaluator 1f uses the number of existing definite transactions of the same class to evaluate the likelihood of a transaction candidate. Specifically, the "definite transaction count" of transactions (A, p) is represented by a function f(A, p), which has a value of 3 in the present case. The candidate evaluator 1f thus determines that the transaction candidate 5a has a likelihood score of 3.

Similarly to the above, the candidate evaluator 1f evaluates the other transaction candidate 5b. In this transaction candidate 5b, two "process p" messages are derived from one "process A" message. Since none of the existing definite transactions has such a call dependency structure, the candidate evaluator 1f scores a zero likelihood for the transaction candidate 5b. Accordingly, the transaction estimator 1g chooses the first transaction candidate 5a as an estimated transaction.

The transaction candidate builder 1e subsequently produces another two transaction candidates 5c and 5d containing a presumed start message "03." The former transaction candidate 5c is formed from two messages "03" and "04," while the latter transaction candidate 5d is formed from three messages "03," "04," and "05." These transaction candidates 5c and 5d are subjected to the candidate evaluator 1f for evaluation of their likelihood.

In the example of FIG. 2, the messages constituting the transaction candidate 5c invoke process "p" from "process A." This kind of transactions have already been identified as three definite transactions 4a, 4b, and 4c and one estimated transaction based on the transaction candidate 5a. To evaluate the likelihood of the transaction candidate 5c, the candidate evaluator 1f calculates a weighted sum of the definite transaction count f(A, p) and the estimated transaction count g(A, p). That is, the likelihood score in question is expressed as f(A, p)+α×g(A, p), where the weighting coefficient α is a predetermined positive real number. Let α be 0.2, for example. Then the likelihood score of the transaction candidate 5c will be 3+0.2×1=3.2.

The likelihood score of the transaction candidate 5d can be determined in the same way. This transaction candidate 5d includes two processes "p" and "q" derived from the source process "A," just as in the definite transaction 4d. The candidate evaluator 1f thus scores one point for the transaction candidate 5d, or f(A, p, q)=1. This evaluation result permits the transaction estimator 1g to choose the transaction candidate 5c with a higher score as an estimated transaction.

Now that message "05" is left unsettled, the transaction candidate builder 1e revives the transaction candidate 5d containing this message "05," with a likelihood score of f(A, p, q)=1. Since no other candidates are created at this time, the transaction estimator 1g chooses the revived transaction candidate 5d as an estimated transaction, while removing the former estimated transaction 5c.

The analysis functions described above enable infrequent transactions like the transaction candidate 5d to be identified correctly. Note that the above example involves quite similar transactions (A, p) and (A, p, q), the latter occurring at a much lower frequency than the former. In such a case, the conventional method proposed in Japanese Patent Application No. 2004-185909 would only be able to identify frequent transactions (A, p), ignoring infrequent transactions (A, p, q). The method according to the present embodiment may also take (A, p, q) for (A, p) initially, leaving out the descendant message of process "q." The present embodiment, however, has a mechanism to reevaluate likelihood of other possible combinations of messages, thus enabling the isolated descendant message "q" to be incorporated into an estimated transaction (A, p, q).

The present embodiment uses the definite transaction count f(S) and estimated transaction count g(S) as a yardstick to measure the likelihood of a class of transactions S. More specifically, the likelihood is a weighted function of definite transaction count f(S) and estimated transaction count g(S). The analyst may adjust weighting coefficients for this calculation, based on the past results of analysis.

Figure 3A:
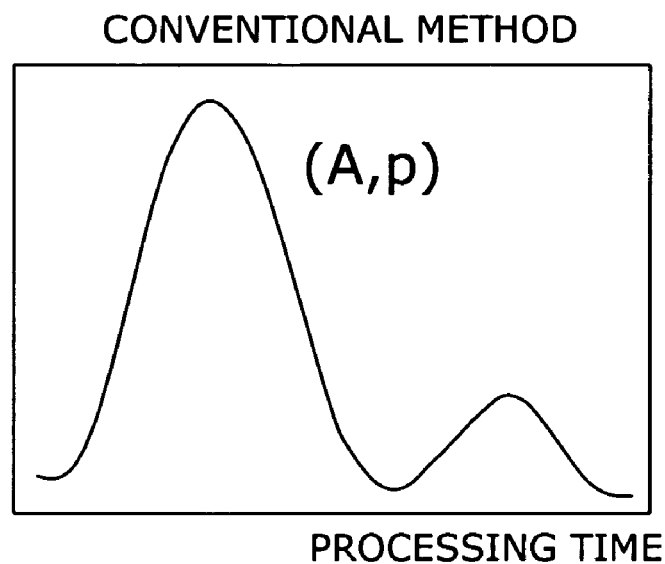
FIG. 3A shows a result of transaction analysis according to a conventional method.
Figure 3B:
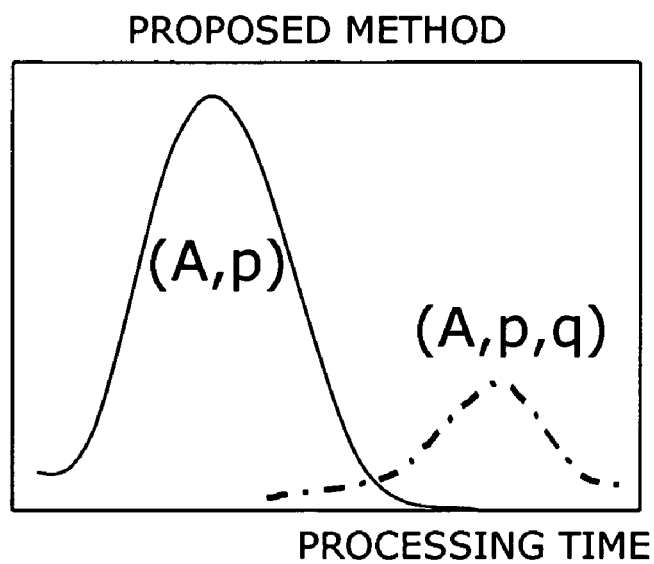
FIG. 3B shows a result of transaction analysis according to the present embodiment in the same context as FIG. 3A.

Referring now to the graphs of FIGS. 3A and 3B, the transaction identification result of the present embodiment will be compared with that of a conventional method (Japanese Patent Application No. 2004-185909). FIG. 3A shows a result of transaction analysis according to a conventional method, while FIG. 3B shows a result of transaction analysis according to the present embodiment. In both FIGS. 3A and 3B, the horizontal axis represents the processing time of each transaction, and the vertical axis represent the number of transactions in each particular range of processing time. Both graphs give a distribution of one hundred transactions in total, which include 90 instances of transaction (A, p) and 10 instances of transaction (A, p, q).

The conventional method views a transaction as a combination of a calling process and called processes. The conventional method calculates the probability of such transactions, based on a combination of each source ID and possible destination IDs. If a certain combination exhibits a greater probability exceeding a specified threshold, the method chooses it as a transaction model. Conversely, infrequent transactions would not be selected as transaction models because of their low probabilities below the threshold. As a result of this limitation of the conventional method, all the one hundred transactions are recognized as (A, p) in spite of the fact that there exist ten transactions of (A, p, q). This means that, in such cases, the conventional method cannot provide an accurate analysis of processing time distribution.

In contrast to the conventional method, the present embodiment of the invention can discriminate between transactions (A, p) and transactions (A, p, q), thus identifying two different transaction classes. This feature of the present embodiment provides more accurate results of a processing time analysis. That is, the analyst will be able to investigate the distribution of processing times of transactions (A, p) separately from that of (A, p, q).

The analysis result of the present embodiment may be used to detect an abnormal pattern of transaction processing, based on the ratio between definite transactions and estimated transactions. Specifically, the service process analyzing apparatus may be configured to measure the share of estimated transactions at regular intervals. If the estimated transactions exhibit an unusual increase during a particular period, then it means the possibility of some problem with that transaction class.

The above description has outlined the structure and operation of the present invention. The following sections will provide a more specific embodiment of the present invention, assuming an Internet banking application where a three-layer web system provides users with services such as account balance inquiry and money transfer.

Message and Transaction

The present embodiment handles messages and transactions as managed elements. Messages are the minimum unit of data exchanged between a plurality of stations on a Transmission Control Protocol (TCP) session. For example, HTTP requests and responses are regarded as messages. It should be noted that the present embodiment expands the concept of message such that a pair of request and response messages containing a specific request and its corresponding response, along with a process executed in relation to those messages, will form a single "message" in the expanded sense. We also use the terms "request message" and "response message" to refer to individual messages when it is necessary to make a distinction between them. Furthermore, as mentioned earlier, the term "start message" refers to a message that initiates a transaction, and the term "descendant messages" refers to messages derived from other message as part of a transaction.

A transaction is a set of object processing operations invoked by a request to the system. Some transactions can readily be identified because of their definite structure. Such transactions are referred to as "definite transactions." Other transactions are identified on the basis of their likelihood and therefore called "estimated transactions." Some of the estimated transactions may undergo changes (i.e., replacement of constituent messages) after they are produced. Such estimated transactions are referred to as "replacement transactions."

Server System and Analyzer

Figure 4:
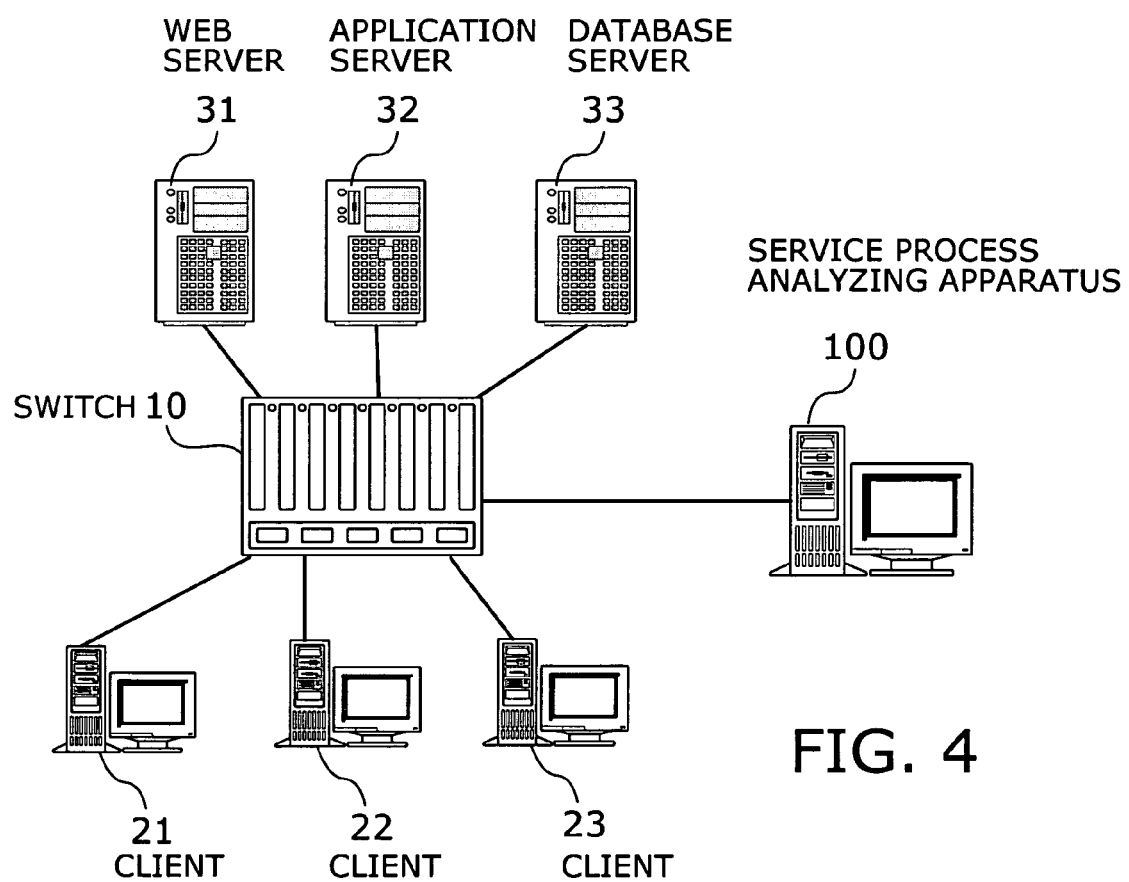
FIG. 4 shows a typical system including a service process analyzing apparatus according to the present embodiment.

FIG. 4 shows a typical system including a service process analyzing apparatus according to the present embodiment. In this system, a switch 10 interconnects includes clients 21, 22, and 23, a web server 31, an application server 32, a database server 33, and a service process analyzing apparatus 100. The web server 31, application server 32, and database server 33 provide the clients 21, 22, and 23 with services upon request from them.

Service transactions involve exchanging messages between the web server 31, application server 32, and database server 33 via the switch 10. The service process analyzing apparatus 100 analyzes the activities of the system by monitoring the traffic of messages through the switch 10.

Figure 5:
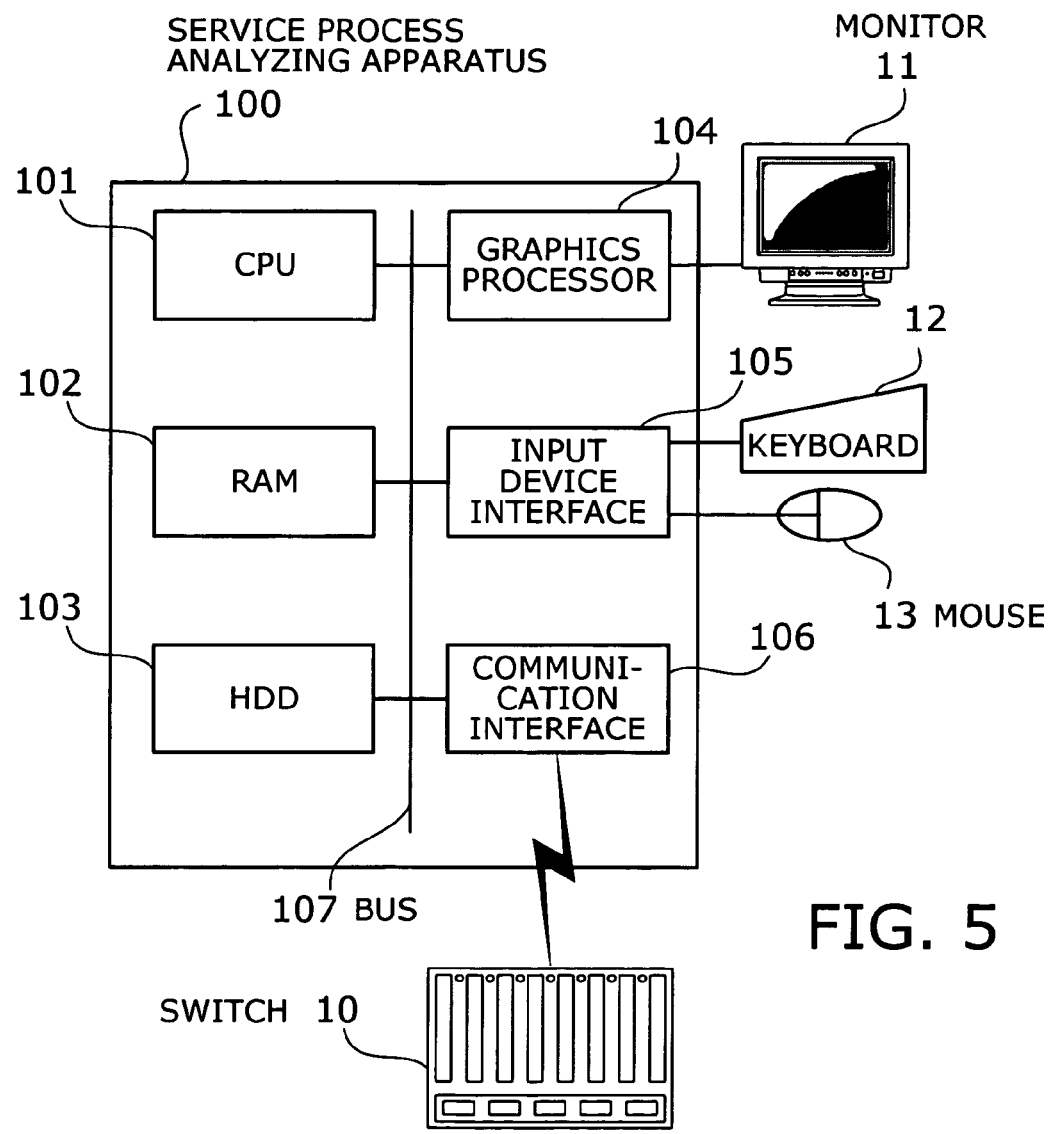
FIG. 5 shows a typical hardware platform for the service process analyzing apparatus of the present embodiment.

FIG. 5 shows a typical hardware platform for the service process analyzing apparatus 100 of the present embodiment. The illustrated service process analyzing apparatus 100 has the following functional elements: a central processing unit (CPU) 101, a random access memory (RAM) 102, a hard disk drive (HDD) 103, a graphics processor 104, an input device interface 105, and a communication interface 106. The CPU 101 controls the entire apparatus, interacting with other elements via a bus 107.

The RAM 102 serves as temporary storage for the whole or part of operating system (OS) programs and application programs that the CPU 101 executes, in addition to other various data objects manipulated at runtime. The HDD 103 stores program and data files of the operating system and various applications.

The graphics processor 104 produces video images in accordance with drawing commands from the CPU 101 and displays them on the screen of an external monitor 11 coupled thereto. The input device interface 105 is used to receive signals from external input devices, such as a keyboard 12 and a mouse 13. Those input signals are supplied to the CPU 101 via the bus 107. The communication interface 106 is connected to the switch 10, thus permitting the CPU 101 to exchange data with other computers (not shown) via the switch 10.

The computer described above serves as a hardware platform for realizing the processing functions of the present embodiment. While FIG. 5 illustrates a platform for the service process analyzing apparatus 100, the same hardware structure may also be applied to the clients 21, 22, and 23, web server 31, application server 32, and database server 33.

Functional Structure of Analyzer

Figure 6:
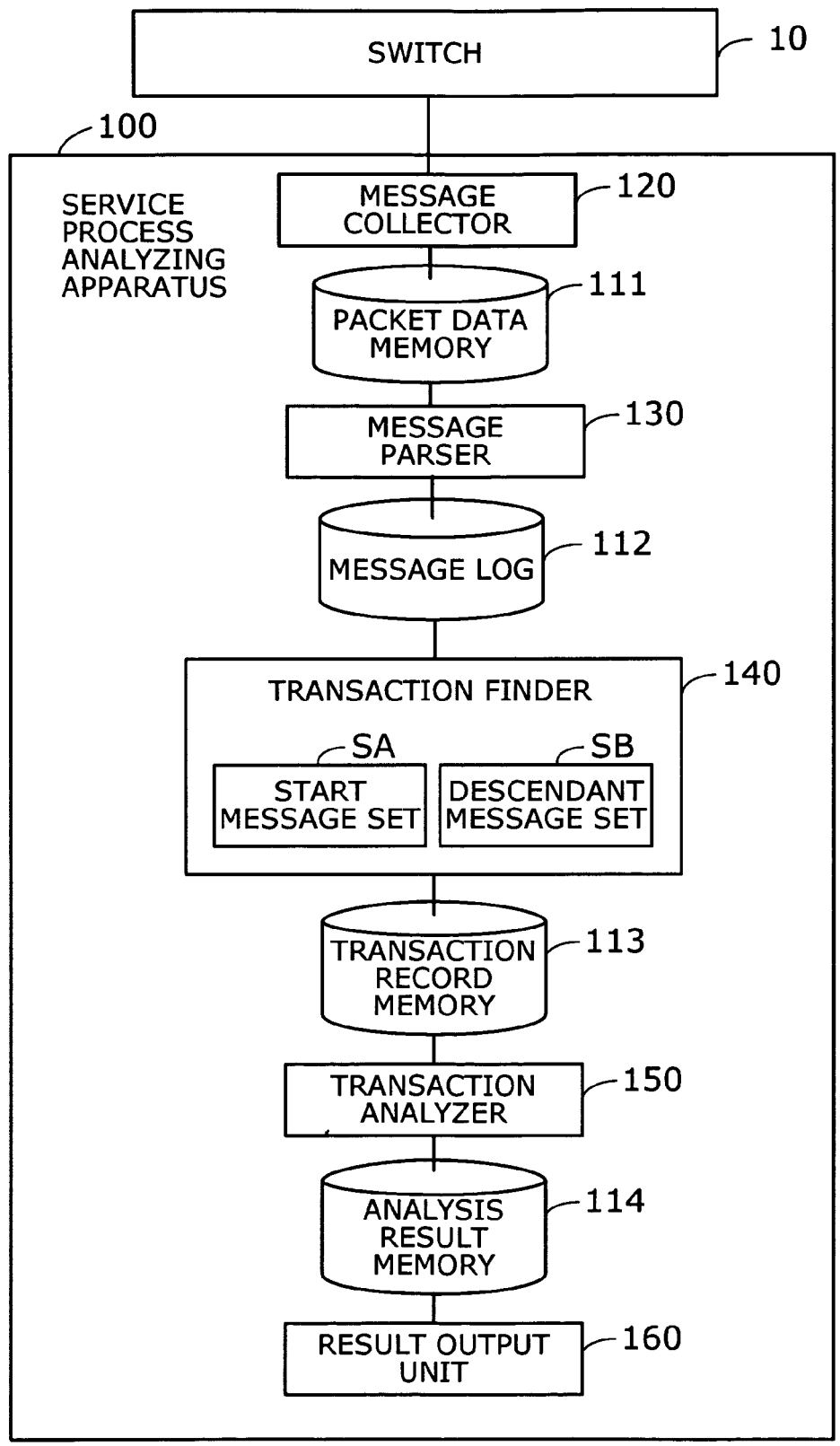
FIG. 6 shows functional blocks of the proposed service process analyzing apparatus.

FIG. 6 shows functional blocks of the proposed service process analyzing apparatus 100. As can be seen from FIG. 6, the service process analyzing apparatus 100 has the following blocks: a packet data memory 111, a message log 112, a transaction record memory 113, an analysis result memory 114, a message collector 120, a message parser 130, a transaction finder 140, a transaction analyzer 150, and a result output unit 160.

The packet data memory 111 is a storage device for storing raw data of message packets passing through the switch 10. The message log 112 is another storage device for storing message records obtained by parsing each packet. The transaction record memory 113 is yet another storage device for storing transaction records, each of which is a list of messages exchanged during a transaction session. The analysis result memory 114 is still another storage device for storing the result of message analysis. In the actual implementations, all or some of these storage devices may be combined as a single physical device.

The message collector 120 observes messages travelling through the switch 10 and sends their packet data to the packet data memory 111. The message parser 130 parses each packet in the packet data memory 111 and stores the result in the message log 112. Based on the data in the message log 112, the transaction finder 140 identifies and builds transactions and stores them in the transaction record memory 113. To this end, the transaction finder 140 first classifies messages read out of the message log 112 into two groups: start message set SA and descendant message set SB. The start message set SA is a set of messages issued at the outset of each transaction. The descendant message set SB is a set of messages issued by a process dealing with other messages in the course of a transaction.

Specifically, the transaction finder 140 discovers call dependency between messages listed in the start message set SA and those listed in the descendant message set SB, so as to build a transaction from interrelated messages. Then the transaction finder 140 sorts those transactions into groups and defines a transaction class as a set of messages belonging to such a group of transactions.

The transaction analyzer 150 analyzes the transactions in the transaction record memory 113 to produce a statistical report such as a distribution of transaction processing times. The analysis result is saved into the analysis result memory 114, allowing the result output unit 160 to visualize it on a screen of the monitor 11 in the form of graphs or the like.

Transaction Finder

Figure 7:
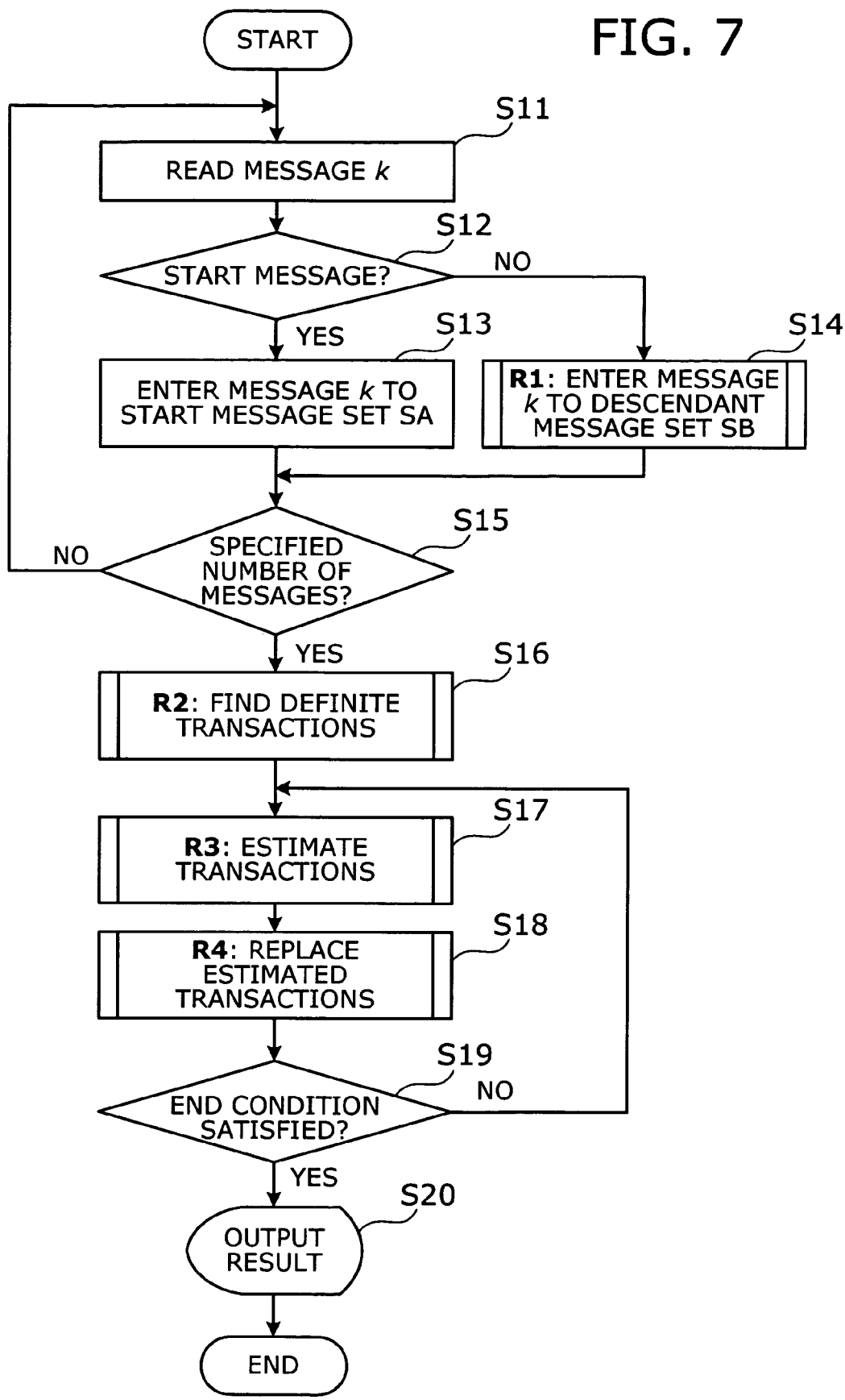
FIG. 7 is a flowchart of a process of identifying transactions.

The above-described service process analyzing apparatus 100 analyzes the behavior of the web server system of FIG. 4. Particularly, the transaction finder 140 plays a primary role in identifying transactions taking place in the system. FIG. 7 is a flowchart showing specifics of this transaction identification process, which includes the following steps:

(Step S11) The transaction finder 140 reads message records one at a time from the message log 112, according to the sequence number affixed to each stored message. Suppose now that the transaction finder 140 has selected a message k for subsequent processing. The record of message k is thus read out of the message log 112.

(Step S12) The transaction finder 140 determines whether the message k in question is a start message or not. Start messages are supposed to satisfy one or more criteria specified depending on the characteristics of a system being analyzed. For example, it is tested whether all or part of the following conditions are true:

(1) The message has a specified message type value. For example, message type "HTTP" is specified in the case where the clients 21 to 23 are supposed to use HTTP protocols when sending a request to a server.

(2) The message is to initiate a particular kind of processing (e.g., /root/program.cgi?x=*&y=*). Specifically, the program file name specified in the message indicates what kind of service processing it is requesting.

(3) The message contains a particular client IP address value (e.g., 210.98.76.54). IP addresses of clients are specified in the case where those clients are known as service users.

(4) The message contains a particular server IP address value (e.g., 12.34.56.78). For example, the IP address of the web server 31 will be included in the case the web server 31 is responsible for handling every start message.

If the currently selected message k turns out to be a start message, the process advances to step S13. If not, the process proceeds to step S14.

(Step S13) The transaction finder 140 enters the data of message k to the start message set SA as a new entry. More specifically, the transaction finder 140 produces three null lists associated with message k, which are: a definite descendant message list, an estimated descendant message list, and an unsettled descendant message list. The transaction finder 140 then enters data of message k to the start message set SA, together with a transaction identification status of "unsettled" ("U"). After that, the process advances to step S15.

(Step S14) The transaction finder 140 enters message k to the descendant message set SB, while creating a start message candidate list for message k. Details of this step S14 will be discussed later in FIG. 8.

(Step S15) The transaction finder 140 determines whether a specified number of messages have been read out of the message log 112 before starting identification of transactions. If the specified number is reached, the process advances to step S16. Otherwise, the transaction finder 140 goes back to step S11 to read more messages.

(Step S16) The transaction finder 140 executes a process of identifying definite transactions. Details will be discussed later in FIG. 9.

Figure 10:
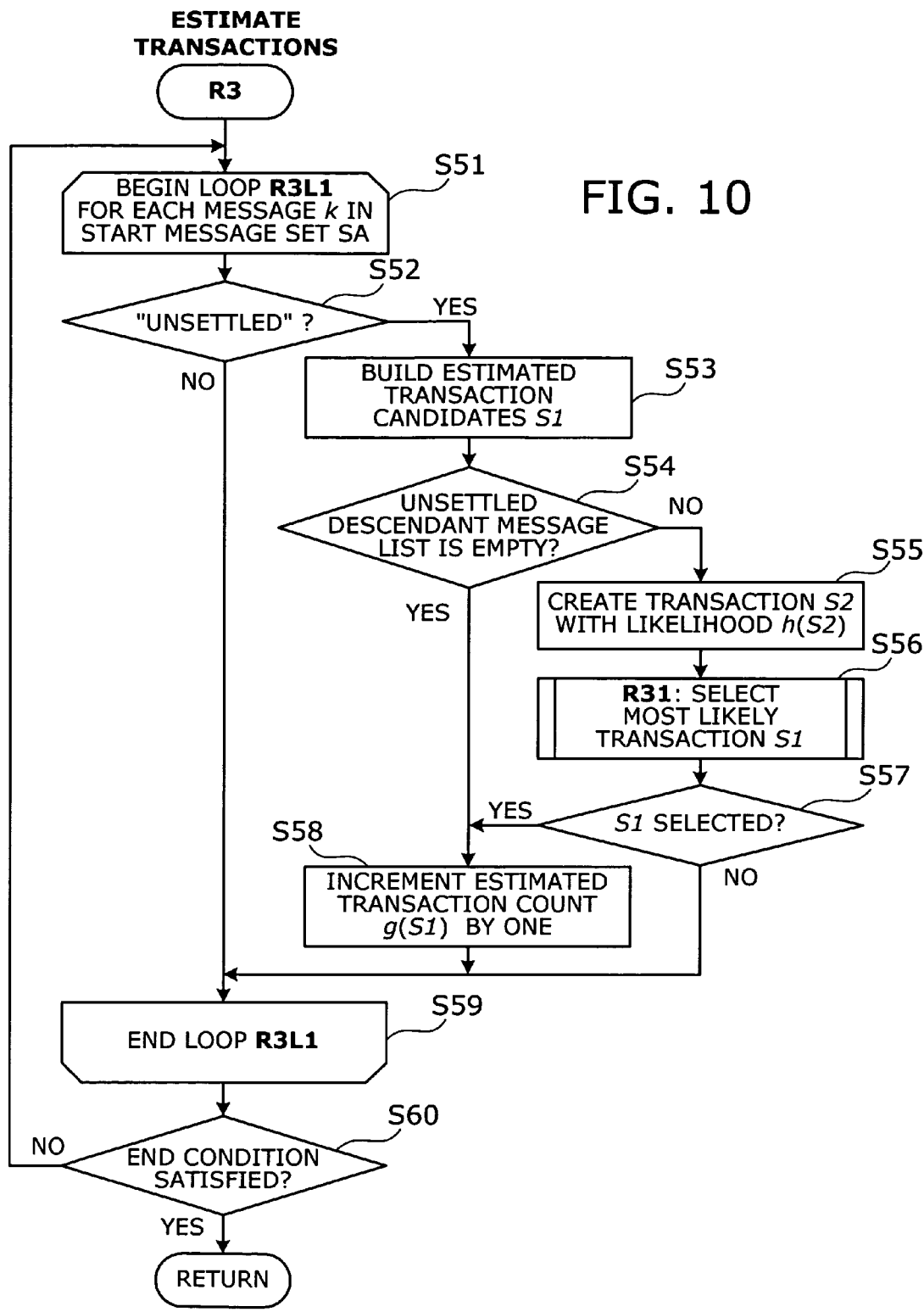
FIG. 10 is a flowchart of a process of estimating other transactions.

(Step S17) The transaction finder 140 executes a process of estimating other transactions. Details will be discussed later in FIG. 10.

(Step S18) The transaction finder 140 executes a process of replacing estimated transactions by using an unsettled descendant message. Details will be discussed later in FIG. 13.

(Step S19) The transaction finder 140 determines whether a specified end condition is satisfied. The analyst specifies at least one condition beforehand for terminating the transaction identification process, depending on what he/she intends to analyze. Specifically, the identification process is to be terminated:

(1) when all given massages are tested; or
(2) when the number of newly added transactions falls below a predetermined threshold; or
(3) when the loop has been repeated as many times as specified.

If the specified end condition(s) is met, the process advances to step S20. If not, the process returns to step S17 for further iterations.

(Step S20) The transaction finder 140 outputs the transaction identification result to the transaction record memory 113.

Figure 8:
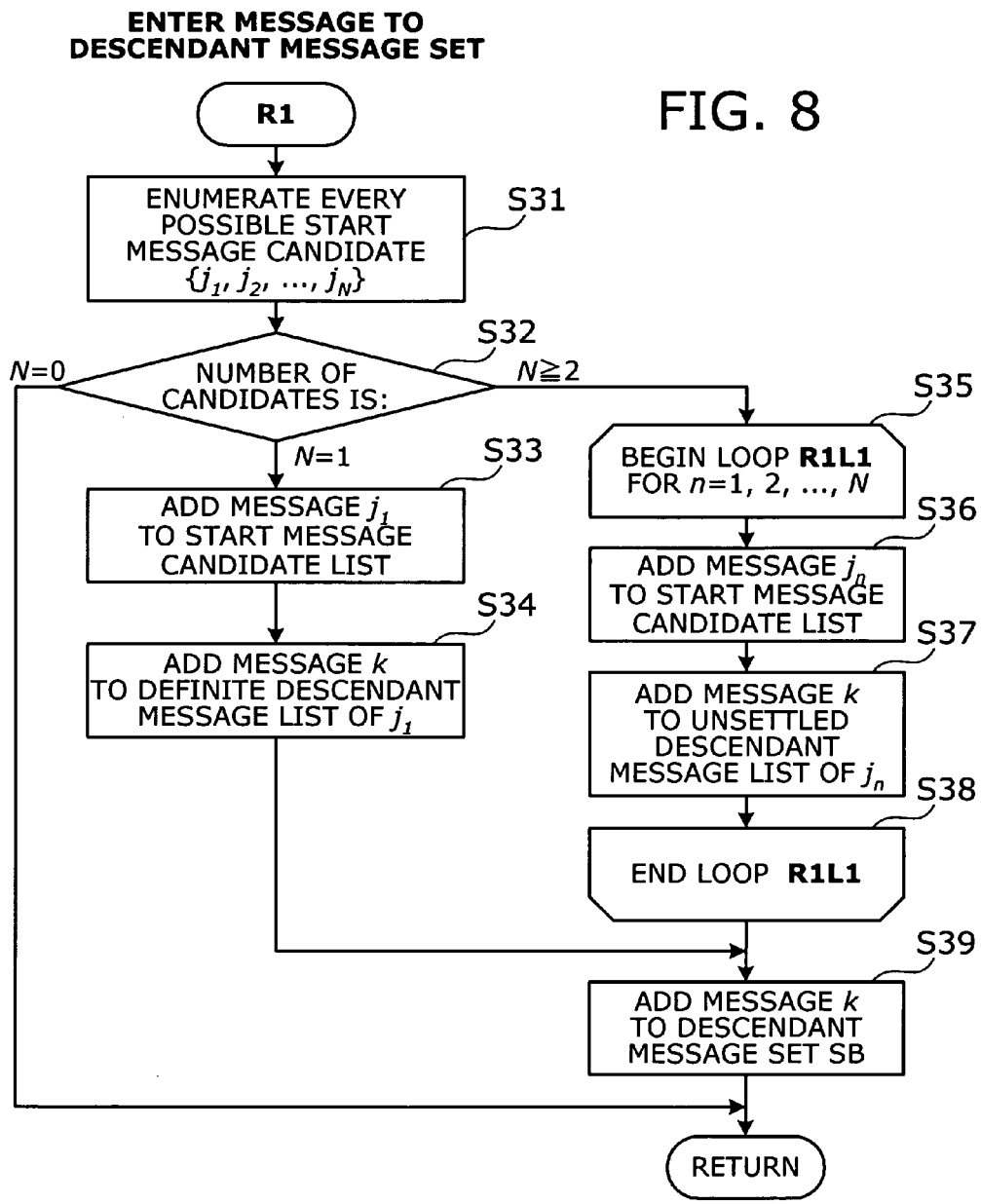
FIG. 8 is a flowchart of a process of entering records to a descendant message set.

Referring now to the flowchart of FIG. 8, the following will provide the details of step S14 of FIG. 7, in which a message record is entered to a descendant message set. This process includes the following steps:

(Step S31) For the message k given at step S11, the transaction finder 140 enumerates every possible start message candidate, based on their call dependency on that message k. Let $\{j_1, j_2, \ldots, j_N\}$ represent the resulting list of message IDs, where $j_n$ (n: integer, $1 \leq n \leq N$) refers to the nth start message candidate and N is the total number of those candidates. More specifically, the transaction finder 140 compares each start message candidate with the given message k. If the two messages satisfy a specified condition, they are determined to have a call dependency. The condition may require, for example, that the request-to-response period of a descendant message candidate (message k) be contained within the request-to-response period of a start message candidate. This containment relationship will be discussed in detail later, with reference to FIG. 15.

(Step S32) The transaction finder 140 checks N. That is, it checks how many start message candidates are found at step S31. Control is returned to the calling routine (step S14 of FIG. 7) if N is zero, since N=0 means that there are no candidates. If N is one, then the process advances to step S33. If N is two or more, the process proceeds to step S35.

(Step S33) N=1 means that $j_1$ is the only start message candidate for message k. The transaction finder 140 sets the start message identification status of message k to "definite" ("D"), thus adding $j_1$ to the start message candidate list as a new entry.

(Step S34) The transaction finder 140 enters the ID of message k to the definite descendant message list associated with message $j_1$, which is part of the start message set SA. The process then advances to step S39.

(Step S35) Now that there are two or more candidates, the transaction finder 140 executes the following steps S36 and S37 for each message while varying n from 1 to N.

(Step S36) The transaction finder 140 adds message $j_n$ to the start message candidate list, while setting the start message identification status of message k to "unsettled" ("U").

(Step S37) The transaction finder 140 enters the ID of message k to the unsettled descendant message list of message $j_n$ in the start message set SA.

(Step S38) If the above steps S36 and 37 are finished for every possible n, then the transaction finder 140 advances the process to step S39.

(Step S39) The transaction finder 140 enters message k to the descendant message set SB before exiting from the current process.

The above steps of FIG. 8 define the given message k as an entry of the descendant message set SB, as well as registering it with a relevant descendent message list in the start message set SA.

Finding Definite Transactions

Figure 9:
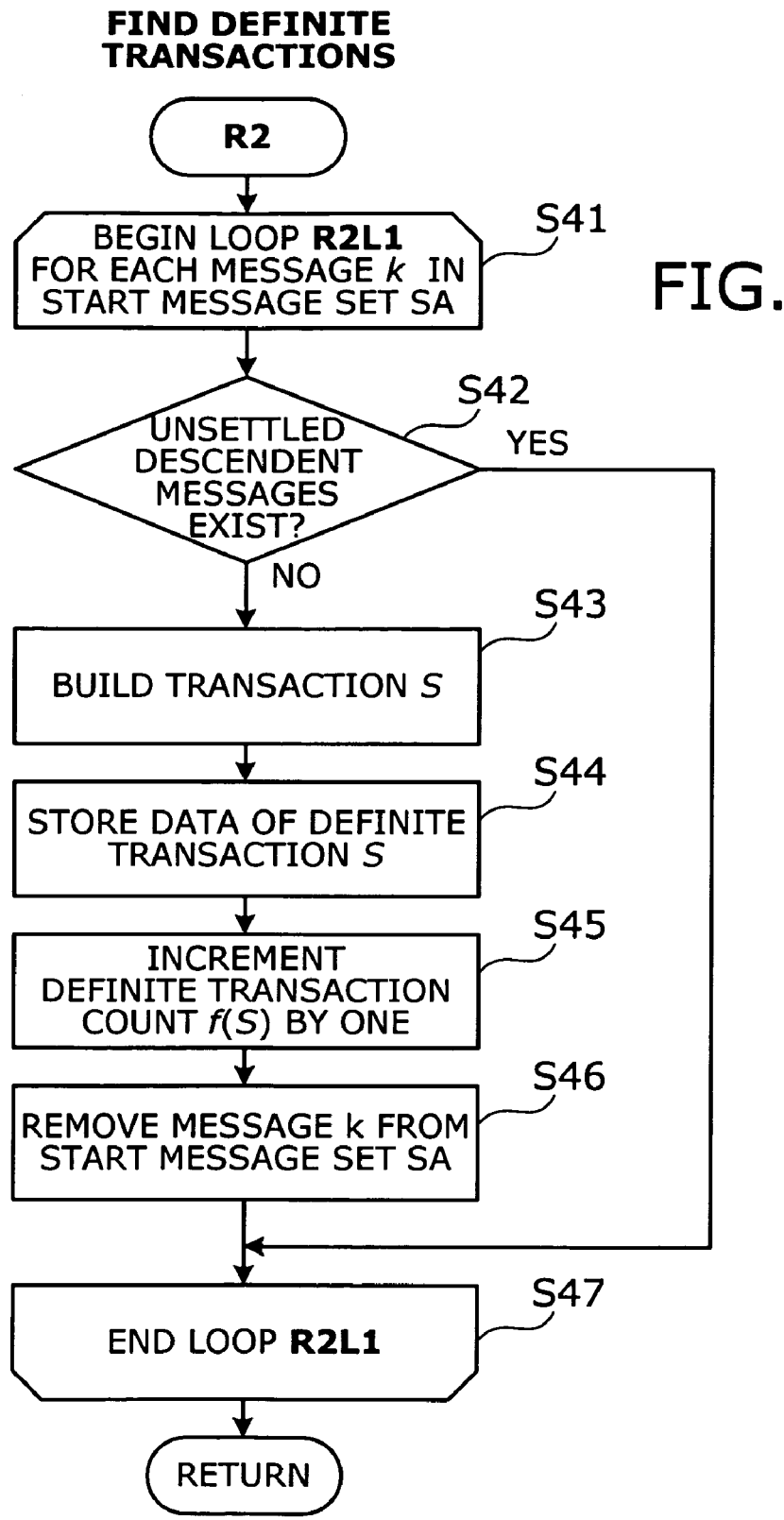
FIG. 9 is a flowchart of a process of identifying definite transactions.

Referring now to the flowchart of FIG. 9, the following will provide the details of step S16 of FIG. 7, which identifies definite transactions from message records. This process includes the following steps:

(Step S41) The transaction finder 140 executes the following steps S42 to S46 for each message k contained in the start message set SA.

(Step S42) The transaction finder 140 determines whether the unsettled descendant message list of message k is empty. If any message ID is found in the unsettled descendant message list, the process proceeds to step S47 since this start message k needs more investigation to definitize its true descendent messages. If the list is empty, it means that the start message k has no uncertainty as to its descendant messages, if any. The process advances to step S43 in this case.

(Step S43) The transaction finder 140 builds a transaction S from message k itself and other messages (if any) listed in the definite descendant message list of message k. The transaction identification status of message k is set to "definite" ("D") accordingly.

(Step S44) The transaction finder 140 stores data of the definitized transaction S in the HDD 103 or other storage. The stored transaction data will be retrieved later when the transaction identification result is sent to the transaction record memory 113 (step S20 of FIG. 7). Or alternatively, the identification result may be displayed on a monitor screen each time a new transaction S is made definite.

(Step S45) The transaction finder 140 increments the definite transaction count f(S) of the definite transaction S by one.

(Step S46) The transaction finder 140 removes message k from the start message set SA since it has undergone steps S43 to S45.

(Step S47) If the above steps S42 to 46 are finished for all messages in the start message set SA, then the transaction finder 140 exits from the current routine. If there is an unfinished message, steps S42 to 46 will be repeated for that message.

Estimating Other Transactions

Definite transactions are identified through the processing steps of FIG. 9 described in the preceding section. Referring now to the flowchart of FIG. 10, the following will provide the details of step S17 of FIG. 7, which estimates other transactions from unsettled messages. This process includes the following steps:

(Step S51) The transaction finder 140 executes the following steps S52 to S58 for each message k in the start message set SA.

(Step S52) The transaction finder 140 determines whether the transaction identification status of message k is marked as "unsettled" ("U"). If it is, then the process advances to step S53. Otherwise, the process skips to step S59.

(Step S53) The transaction finder 140 builds a transaction by combining the message k itself and other messages listed in its corresponding definite descendant message list and estimated descendant message list. The resulting transaction is referred to as an estimated transaction S1.

(Step S54) The transaction finder 140 determines whether the unsettled descendant message list of message k is empty. If it is empty, the process skips to step S58. If not, the process goes to step S55.

(Step S55) The transaction finder 140 creates a dummy transaction S2 with a predetermined likelihood score of h(S2).

(Step S56) The transaction finder 140 seeks a most likely estimated transaction S1 to which message k belongs. Details of this step will be discussed later with reference to FIG. 11.

(Step S57) The transaction finder 140 determines whether an estimated transaction S1 has been selected successfully at step S56. If so, the process advances to step S58. If not, the process skips to step S59.

(Step S58) The transaction finder 140 sets the transaction identification status of message k to "settled" ("S"), stores data of the estimated transaction S1 into the HDD 103 or the like, and increments g(S1) (i.e., estimated transaction count of S1) by one.

(Step S59) If all messages in the start message set SA have undergone the above steps S52 to S58, then the process advances to step S60.

(Step S60) The transaction finder 140 determines whether a specified end condition is satisfied. Depending on the purpose of analysis, the analyst specifies beforehand at least one condition for terminating the transaction estimation process. For example, the identification processing is to be terminated:

(1) when all start messages have a transaction identification status with a value of "settled" ("S"); or
(2) when the number of newly identified transactions falls below a predetermined threshold; or
(3) when the loop has been repeated as many times as specified.

If a specified end condition is satisfied, the transaction finder 140 exits from the present process of estimating transactions. If the condition is premature, the process returns to step S51.

Figure 11:
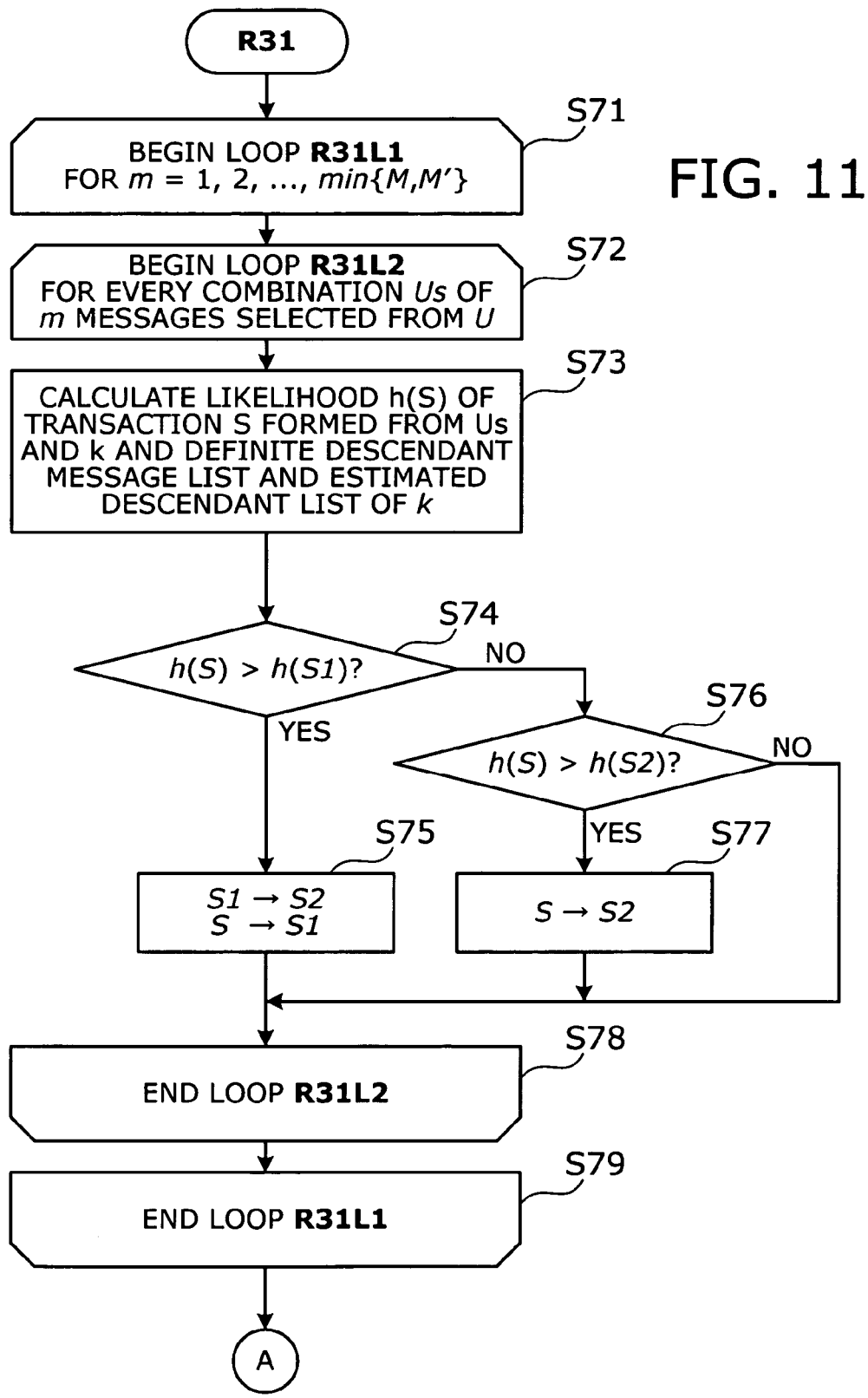
FIGS. 11 and 12 are the first and second halves of a flowchart showing a process of selecting likely transactions.
Figure 12:
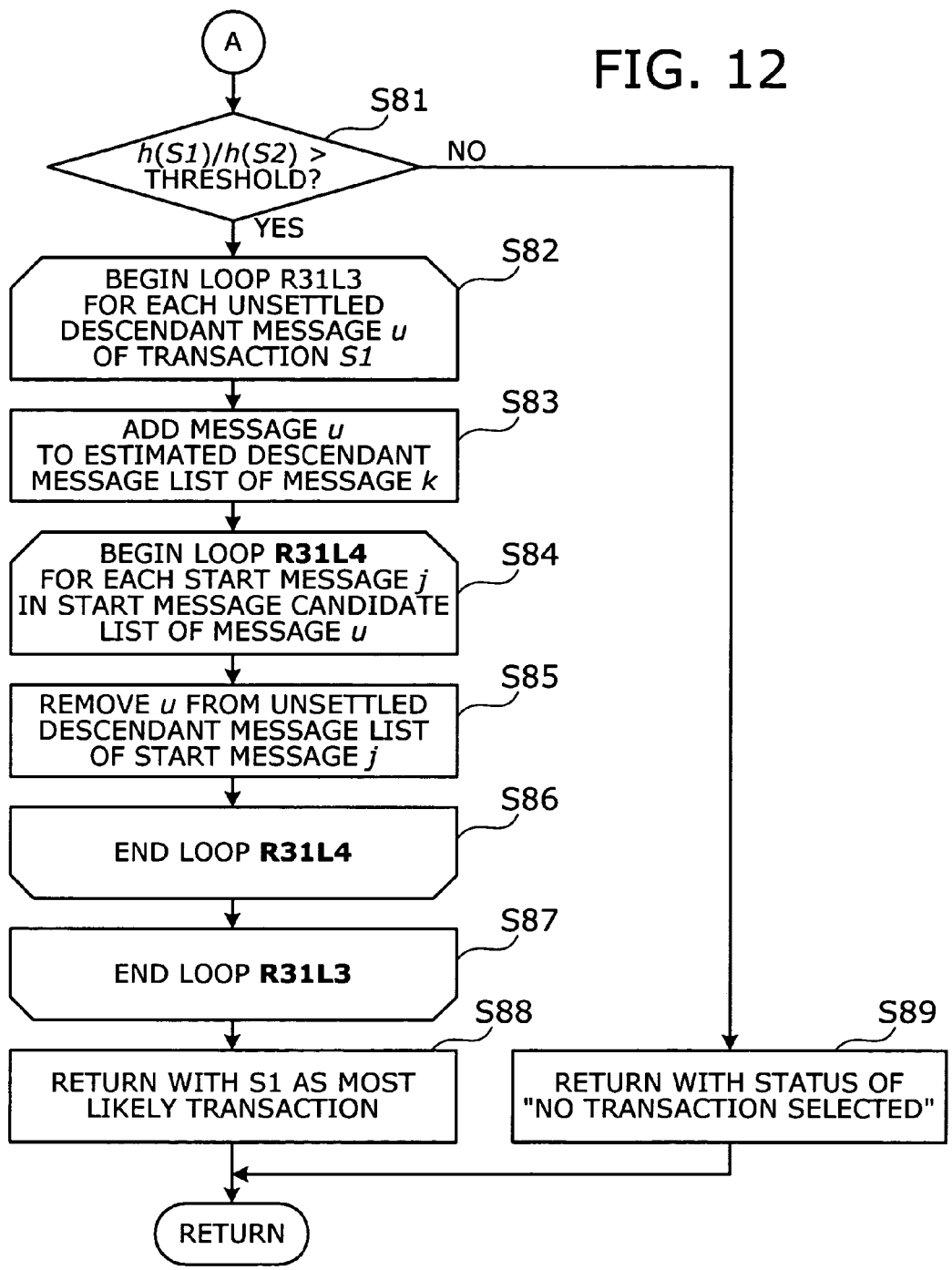

FIGS. 11 and 12 are the first and second halves of a flowchart showing a process of selecting a most likely transaction. This process includes the following steps:

(Step S71) The transaction finder 140 repetitively executes steps S72 to S78 while varying m from 1 to min{M,M'}, where M is the number of messages registered in the unsettled descendant message list of message k, M' is a predetermined number, and min{M,M'} represents the smaller of M and M'.

(Step S72) The transaction finder 140 executes the following steps S73 to S77 for every possible combination $U_s$ of m messages selected from the unsettled descendant message list U.

(Step S73) Assuming a transaction S formed from the present message combination $U_s$ and the message k and other messages listed in its corresponding definite descendant message list and estimated descendant message list, the transaction finder 140 calculates its likelihood score $h(S)=f(S)+\alpha \times g(S)$, where $\alpha$ is a predetermined weighting coefficient for g(S). The coefficient $\alpha$ is set to 0.2, for example.

(Step S74) The transaction finder 140 compares the likelihood score h(S) calculated at step S73 with the likelihood h(S1) of the most likely transaction S1 at present. If h(S) outscores h(S1), the process advances to step S75. If h(S) is smaller than h(S1), the process proceeds to step S76.

(Step S75) Since S has turned out to be more likely than S1, the transaction finder 140 now demotes the transaction S1 from the top position to the second position S2. Subsequently it places the transaction S produced at step S73 as a new most likely transaction S1. The process then proceeds to step S78.

(Step S76) The transaction finder 140 compares the likelihood score h(S) calculated at step S73 with the likelihood score h(S2) of the second most likely transaction S2 at present. If h(S) is greater than h(S2), the process advances to step S77. If h(S) is smaller than h(S2), the process skips to step S78.

(Step S77) Since S has turned out to be more likely than S2, but less likely than S1, the transaction finder 140 places the transaction S produced at step S73 as a new second most likely transaction S2.

(Step S78) The transaction finder 140 advances the process to step S79 when all the combinations of m messages have undergone the steps S73 to S77.

(Step S79) The transaction finder 140 advances the process to step S81 (see FIG. 12) when the above steps S72 to S78 have been finished with every possible value of m.

(Step S81) The transaction finder 140 divides the likelihood score h(S1) of the most likely transaction S1 by the likelihood score h(S2) of the second most likely transaction S2. If the quotient h(S1)/h(S2) is greater than a predetermined threshold, the process advances to step S82. If not, the process proceeds to S89.

(Step S82) The transaction finder 140 executes the following steps S83 to S86 for each unsettled descendant message u belonging to the most likely transaction S1.

(Step S83) The transaction finder 140 adds the unsettled descendant message u to the estimated descendant message list of message k, with its start message identification status set to "E" (estimated).

(Step S84) The transaction finder 140 executes the following step S85 for each start message j in the start message candidate list corresponding to the unsettled descendant message u of interest.

(Step S85) The transaction finder 140 removes the unsettled descendant message u from the unsettled descendant message list of the start message j.

(Step S86) The transaction finder 140 advances the process to step S87 after the above step S85 is finished with all start messages j in the start message candidate list corresponding to the unsettled descendant message u of interest.

(Step S87) The transaction finder 140 advances the process to step S88 after the above steps S83 to S86 are finished with all the then-unsettled descendant messages u belonging to the most likely transaction S1.

(Step S88) The transaction finder 140 returns to the calling routine, with the most likely transaction S1 finally selected as an estimated transaction.

(Step S89) The transaction finder 140 returns to the calling routine, with a result status of "no transaction selected."

The above processing steps of FIGS. 11 and 12 enable the most likely transaction candidate to be selected as an estimated transaction on the condition that its likelihood is sufficiently higher than that of the second most likely transaction candidate.

Figure 13:
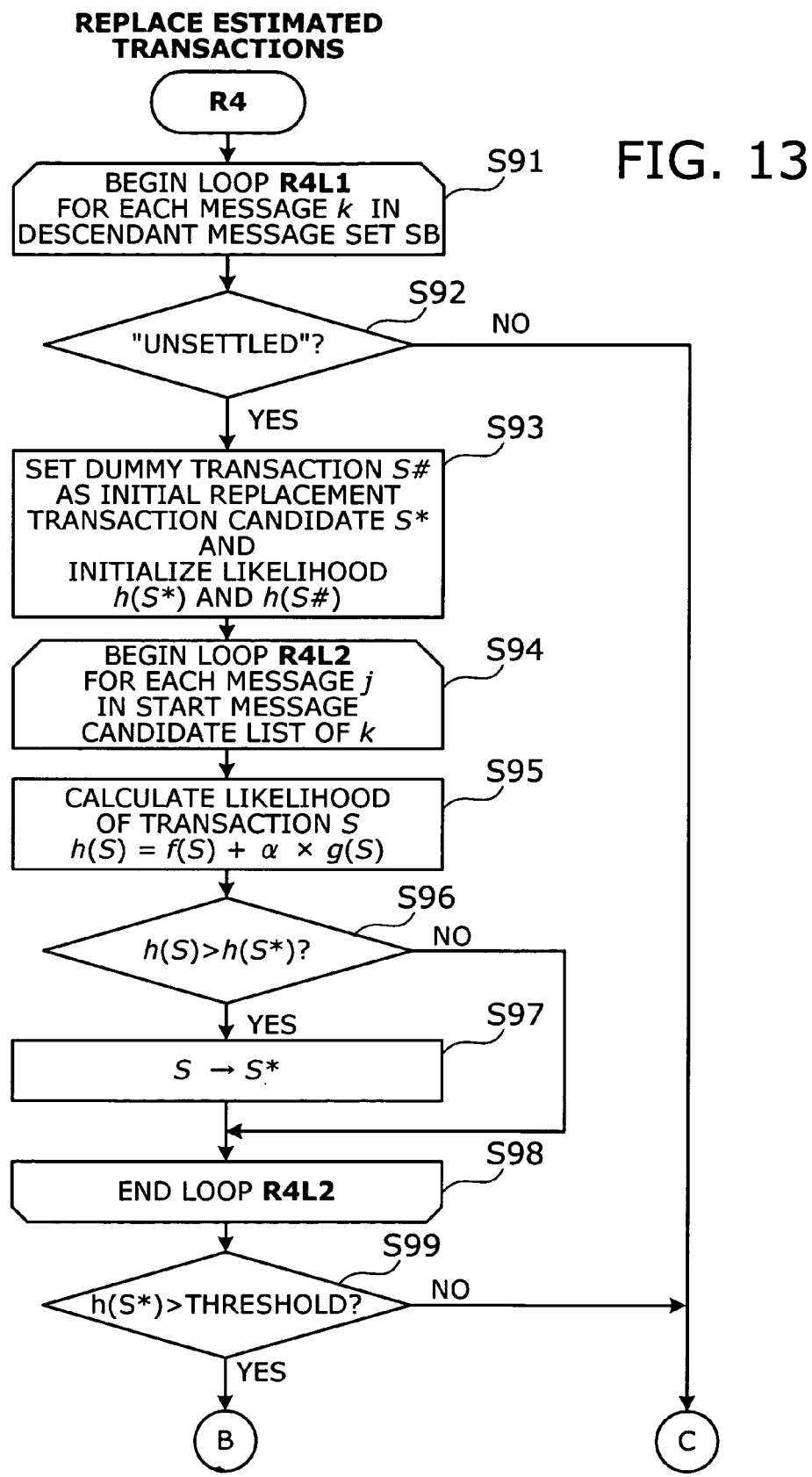
FIGS. 13 and 14 are the first and second halves of a flowchart showing a process of replacing estimated transactions.
Figure 14:
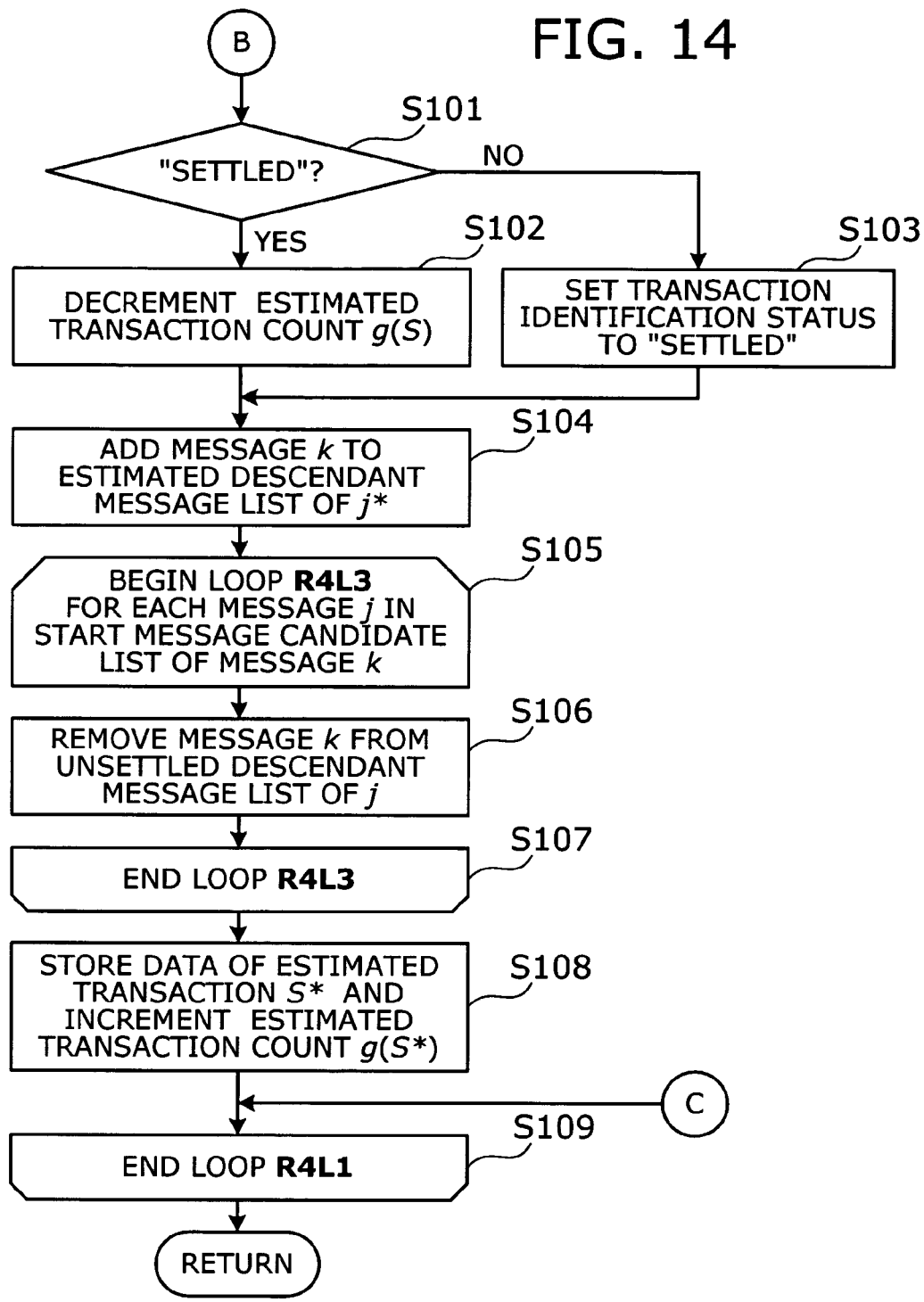

FIGS. 13 and 14 are the first and second halves of a flowchart showing a process of replacing estimated transactions, which provides the details of step S18 described earlier in FIG. 7. This process includes the following steps:

(Step S91) The transaction finder 140 executes the following steps S92 to S108 for each message k in the descendant message set SB.

(Step S92) The transaction finder 140 determines whether the start message identification status of message k is "unsettled" ("U") or "definite" ("D") or "estimated" ("E"). If it is "unsettled," then the process advances to step S93. If it is either "definite" or "estimated," the process branches to S109 (see FIG. 14).

(Step S93) The transaction finder 140 creates a dummy transaction S# for use as an initial state of a replacement transaction candidate S*. It also initializes the likelihood score of this replacement transaction candidate S* by assigning a predetermined value to h(S*) and h(S#).

(Step S94) The transaction finder 140 executes the following steps S95 to S97 for each message j in the start message candidate list of message k.

(Step S95) The transaction finder 140 assumes a transaction S formed from messages j and k and the definite descendant message list and estimated descendant message list of message j. It then calculates the likelihood score of this transaction S using the formula of h(S)=f(S)+α×g(S).

(Step S96) The transaction finder 140 determines whether the transaction S outscores the replacement transaction candidate S* in term of the likelihood. If h(S)>h(S*), the process advances to step S97. If h(S)≦h(S*), the process skips to step S98.

(Step S97) The transaction finder 140 substitutes the transaction S for the replacement transaction candidate S*.

(Step S98) The transaction finder 140 advances the process to step S99 when all messages j in the start message candidate list of message k have undergone the above steps S95 to S97.

(Step S99) The transaction finder 140 determines whether the likelihood score h(S*) of the replacement transaction candidate S* is greater than a predetermined threshold. If so, the process advances to step S101 (see FIG. 14). If not, the process proceeds to step S109 (see FIG. 14).

(Step S101) With reference to the start message j* of transaction S*, the transaction finder 140 determines whether the corresponding transaction identification status is "settled" or "unsettled." If it is "settled," the process advances to step S102. If it is "unsettled," the process branches to step S103.

(Step S102) The transaction finder 140 assumes a transaction S formed from the message j* and its corresponding definite descendant message list and estimated descendant message list. The transaction finder 140 decrements the estimated transaction count g(S) of this transaction S by one before proceeding to step S104.

(Step S103) The transaction finder 140 sets the transaction identification status of message j* to "settled."

(Step S104) The transaction finder 140 adds message k to the estimated descendant message list of message j*, while setting the start message identification status of message k to "replaced" ("R").

(Step S105) The transaction finder 140 executes the following step S106 for each message j in the start message candidate list of message k.

(Step S106) The transaction finder 140 removes message k from the unsettled descendant message list of message j.

(Step S107) The transaction finder 140 advances the process to step S108 after the above step S106 is finished with all messages j in the start message candidate list of message k.

(Step S108) The transaction finder 140 stores data of the estimated transaction S* and increments the estimated transaction count g(S*) by one.

(Step S109) The transaction finder 140 exits from the present process if all messages k in the descendant message set SB have undergone the above steps S92 to S108.

Call Dependency Criteria

The transaction finder 140 identifies transactions and stores them in the transaction record memory 113 through the process explained in FIGS. 7 to 14. We will now focus on several particular steps in the flowcharts. Let us begin with step S31 of FIG. 8, in which the transaction finder 140 examines call dependency between messages.

Figure 15:
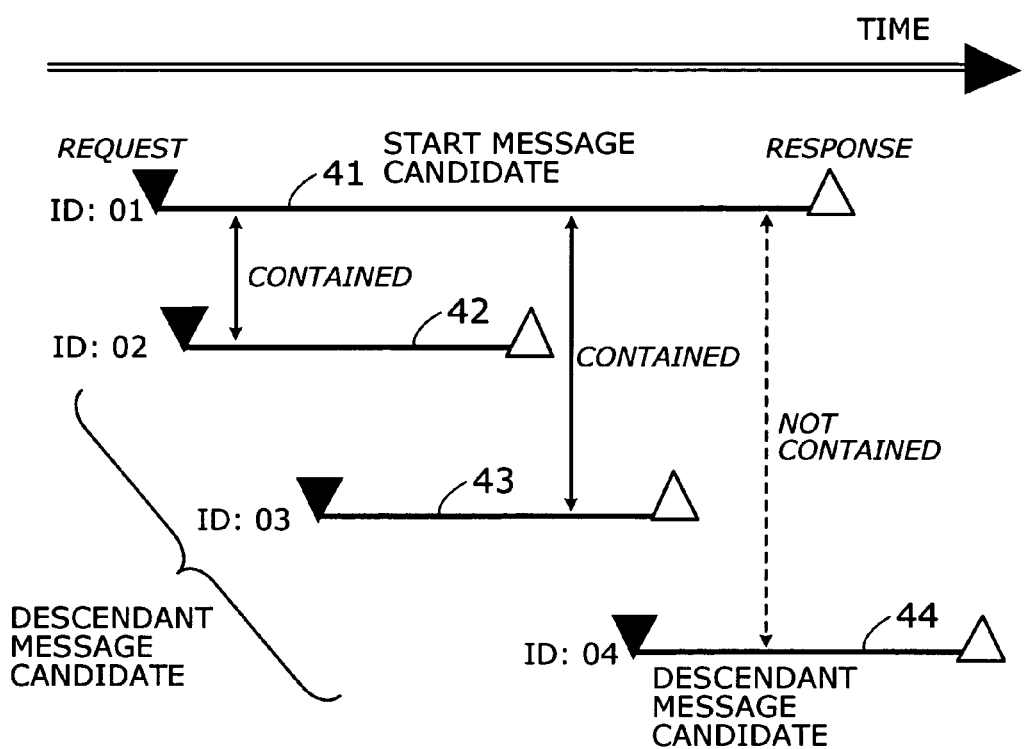
FIG. 15 shows a first example of a call dependency criterion.

As mentioned earlier in FIG. 8, a first example of a call dependency criterion is such that the request-to-response period of a descendant message candidate is contained within the request-to-response period of a start message candidate. FIG. 15 illustrates this call dependency criterion. The example of FIG. 15 involves four messages 41 to 44. The horizontal axis represents the time. The black triangle on each message 41 to 44 indicates the request time point, and the white triangle shows the response time point. Those messages 41, 42, 43, and 44 are distinguished by their respective IDs "01," "02," "03," and "04." It is assumed that each message 41 to 44 has already been identified either as a start message candidate or as a descendant message candidate at step S12 of FIG. 7. In the present example, the message 41 is a start message candidate and the others are descendant message candidates.

The above start message candidate 41 and descendant message candidates 42 to 44 are now tested under the first call dependency criterion stated above. As can be seen from FIG. 15, two descendant message candidates 42 and 43 begin and end within the request-to-response period of the start message candidate 41, whereas the other descendant message candidate 44 ends after the start message candidate 41 is finished. This means that only the first two descendant message candidates 42 and 43 are contained in the start message candidate 41 and therefore satisfy the specified call dependency criterion.

Figure 16:
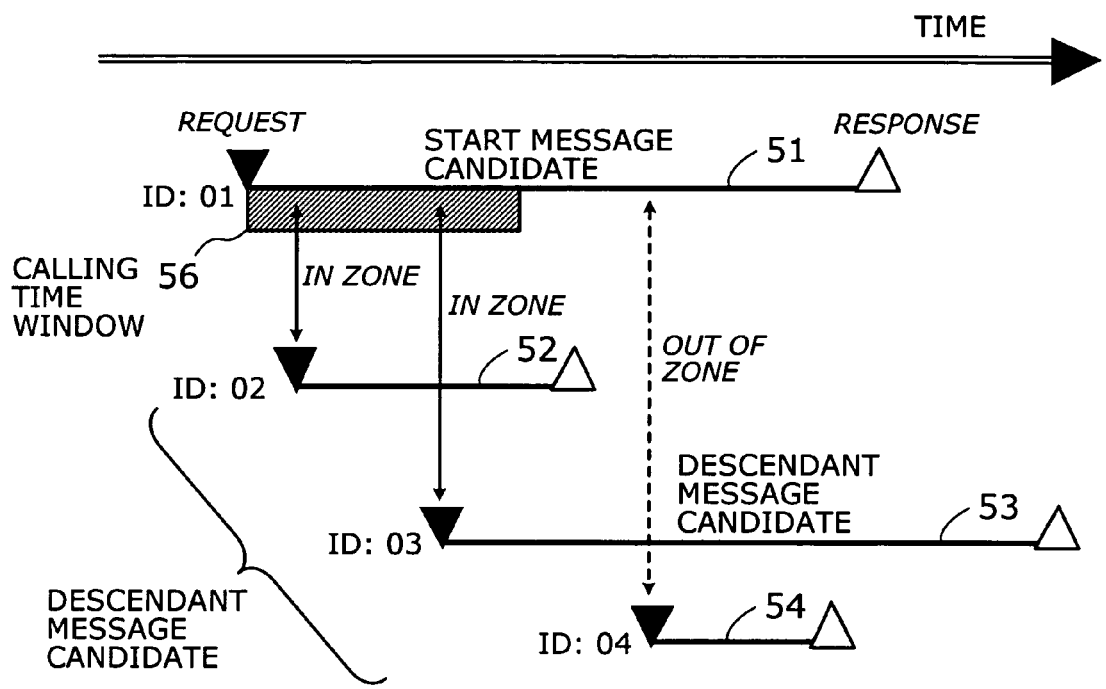
FIG. 16 shows a second example of the call dependency criterion.

A second example of a call dependency criterion is that the request of a descendant message candidate occurs within a predetermined time period after the request of a start message candidate. The critical time period in this condition is referred to as a "calling time window." FIG. 16 depicts this call dependency criterion, where four messages 51 to 54 are illustrated along the time on the horizontal axis. The black triangle on each message 51 to 54 indicates the request time point, and the white triangle shows the corresponding response time point. Those messages 51, 52, 53, and 54 are distinguished by their respective IDs "01," "02," "03," and "04." The message 51 is a start message candidate and the other messages 52 to 54 are descendant message candidates.

The above start message candidate 51 and descendant message candidates 52 to 54 are now tested under the above-stated second call dependency criterion. The hatched box in FIG. 16 represents a calling time window 56 in the present case. As can be seen from FIG. 16, the request time points of two descendent message candidates 52 and 53 are both within the calling time window 56 of the start message candidate 51, whereas the request of the other descendent message candidate 54 occurs after the calling time window 56 is passed. This means that the messages 52 and 53 qualify as descendants of the message 51, but the other message 54 does not.

A third example of a call dependency criterion is based on the IP addresses of clients and servers. That is, if the server IP address of a message coincides with the client IP address of another message, then it means that the latter message is called from the former message, hence the call dependency. It is therefore possible to find a descendant message candidate called directly or indirectly from a start message candidate by tracking such relationships between the calling and called messages in their IP address information.

Figure 17:
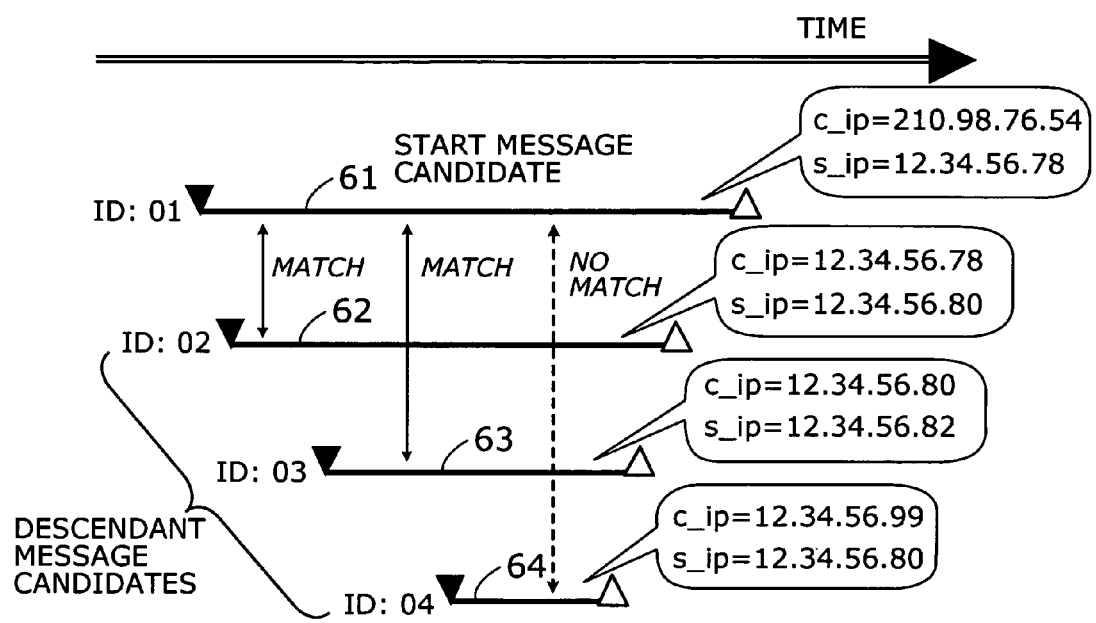
FIG. 17 shows a third example of the call dependency criterion.

FIG. 17 gives an example of the above-stated third call dependency criterion, where four messages 61 to 64 are illustrated along the time on the horizontal axis. The black triangle on each message 61 to 64 indicates the request time point, and the white triangle represents the response time point. Those messages 61, 62, 63, and 64 are distinguished by their respective IDs "01," "02," "03," and "04." The message 61 is a start message candidate and the other messages 62 to 64 are descendant message candidates. The symbols "s_IP" and "c_IP" represent the server IP address and the client IP address, respectively.

The above start message candidate 61 and descendant message candidates 62 to 64 are now tested under the above-stated call dependency criterion. In the present example of FIG. 17, s_IP of the first message 61 coincides c_IP of the second message 62. Also, s_IP of the second message 62 coincides with c_IP of the third message 63. However, none of these messages 61 to 63 have an s_IP that matches with c_IP of the fourth message 64. This means that the second and third messages 62 and 63 are qualified as a descendant of the first message 61, but the fourth message 54 does not.

Structure Description of Transaction

Before describing specific examples of transaction analysis, this section provides the notation for describing the layered structure of a transaction. Referring back to FIG. 4, the transaction analysis takes place in a system where a web server 31, an application server 32, and a database server 33 are providing service to clients 21 to 23. This system uses HTTP for message exchange between the clients 21 to 23 and web server 31, as well as IIOP for message exchange between the web server 31 and application server 32. The application server 32 and database server 33 use RDB2 in sending messages to each other.

Transactions in this system are actually formed from multiple layers of messages. That is, requests from the web server 31 are passed to the application server 32, and requests from the application server 32 are passed to the database server 33. The present embodiment expresses the structure of such multi-layer transactions in the following notation:

FIG. 18 shows a first example of a structure description of a three-layer transaction 71. A transaction class is defined as a group of transactions formed from messages of the same processing operations and having the same layer structure. Different transaction classes are designated by transaction class IDs (e.g., 0, 1, 2, . . . ). Actual algorithms used for numbering transaction IDs are up to the analyst. If he/she desires, a series of IDs may be affixed to new transaction classes in the order that they are identified. Another method is to give a tentative ID to each transaction class during the process of transaction identification and then renumber them after sorting the classes in the dictionary order of message character strings.

The layer structure of each transaction class is described in a predefined format. FIG. 18 shows a structure description 72 representing the illustrated transaction 71. Specifically, the structure description 72 is a combination of a transaction class ID and several pieces of information indicating which messages are called from which upper-layer messages in what order. For example, the transaction 71 shown in FIG. 18 has a transaction class ID of "0" and initiated by a start message "HTTP;A" (type: HTTP, process: A). This start message "HTTP;A" causes a message "IIOP;i" (type: IIOP, process: i), and that message "IIOP;i" further causes another message "RDB2;p" (type: RDB2, process: p). In other words, from the viewpoint of the start message "HTTP;A" at the zeroth layer, the message "IIOP;i" is its child message at the first layer, and the next message "RDB2;p" is a grandchild message at the second layer.

The structure of the grandchild message "RDB2;p" is expressed as "0-0-0;RDB2;p" in this case. The hyphenated figures "0-0-0" denote the transaction class ID, child message sequence number, and grandchild message sequence number in that order. That is, "0-0-0;RDB2;p" means that the message "RDB2;p" is the zeroth grandchild message of the zeroth child message of a start message of transaction class 0. With such notation of messages, the entire structure of the transaction 71 can now be written as follows:

0;HTTP;A,0-0;IIOP;i,0-0-0;RDB2;p

This is what is presented as the structure description 72 in FIG. 18.

FIG. 19 shows a second example of a structure description of a transaction. The illustrated transaction 73 of transaction class 1 has a three-layer structure. Specifically, the start message "HTTP;A" (type: HTTP, process: A) causes two messages "IIOP;i" (type: IIOP, process: i) and "IIOP;j" (type: IIOP, process: j) in that order. The message "IIOP;i" further causes two messages "RDB2;p" (type: RDB2, process: p) and "RDB2;q" (type: RDB2, process: q) in that order. Likewise, the message "IIOP;j" calls another message "RDB2;r" (type: RDB2, process: r). As can be seen from this, the transaction 73 is formed from a start message "HTTP;A" at the zeroth layer, two child messages "IIOP;i" and "IIOP;j" at the first layer, and three grandchild messages "RDB2;p," "RDB2;q," and "RDB2;r" at the second layer.

The structure of grandchild message "RDB2;r" is written as "1-1-0;RDB2;r" in the present example. The hyphenated figures "1-1-0" show the transaction class ID, child message sequence number, and grandchild message sequence number in that order. That is, "1-1-0;RDB2;r" means that the message "RDB2;r" is the zeroth grandchild message of the first child message of a start message of transaction class "1."

The structure description 74 gives the entire structure this transaction 73 in the following way:

1;HTTP;A, 1-0;IIOP;i,1-0-0;RDB2;p,1-0-1;RDB2;q, 1-1;IIOP;j,1-1-0;RDB2;r

Using such notation, the next section will discuss a specific example of transaction identification processing.

FIRST EXAMPLE OF TRANSACTION ANALYSIS

FIG. 20 shows an example of a message log. This message log 112 contains records of 41 messages with message IDs of "0," "1," . . . "40." Each message record is composed of a plurality of data fields delimited by commas (,). The leftmost field is "Message Id," which is followed by "Request Time Point," "Response Time Point," "Type," "Process," "Client IP Address," and "Server IP Address" in that order.

By examining each message listed in the message log 112, the transaction finder 140 determines whether it is a start message or a descendant message. The identified start messages and descendant messages are compiled into a start message list and a descendant message list, respectively.

More specifically, the transaction finder 140 is set up with the following criteria for identifying transactions:

(a) A messages with a type of "HTTP" plays a role of start message.

(b) Messages are deemed to have call dependency if the request-to-response period of a descendant message candidate is contained within the request-to-response period of a start message candidate.

With these criteria, the transaction finder 140 sorts the messages in the message log 112 into a start message list and a descendant message list.

For each start message, the transaction finder 140 creates a definite descendant message list, an unsettled descendant message list, and an estimated descendant message list (which is initially empty). Those lists are then registered as part of the corresponding message record of the start message set, together with a transaction identification status of "unsettled" ("U").

For each descendant message, the transaction finder 140 creates a start message candidate list. This list is then registered as part of the corresponding message record of the descendant message set, together with a start message identification status that is determined in the following way:

(a) If the corresponding start message candidate list has only one entry, the start message identification status will be automatically set to "definite" ("D") since there is no other possibility.

(b) If the corresponding start message candidate list has two or more entries, the parent of the descendant message in question cannot be determined immediately. The start message identification status is therefore set to "unsettled" ("U") in this case.

(c) If the corresponding start message candidate list has no entries, the descendant message in question is isolated and has no candidates for its parent. Since such a descendant message is out of the scope, it should be excluded from the descendant message set.

Figure 21:
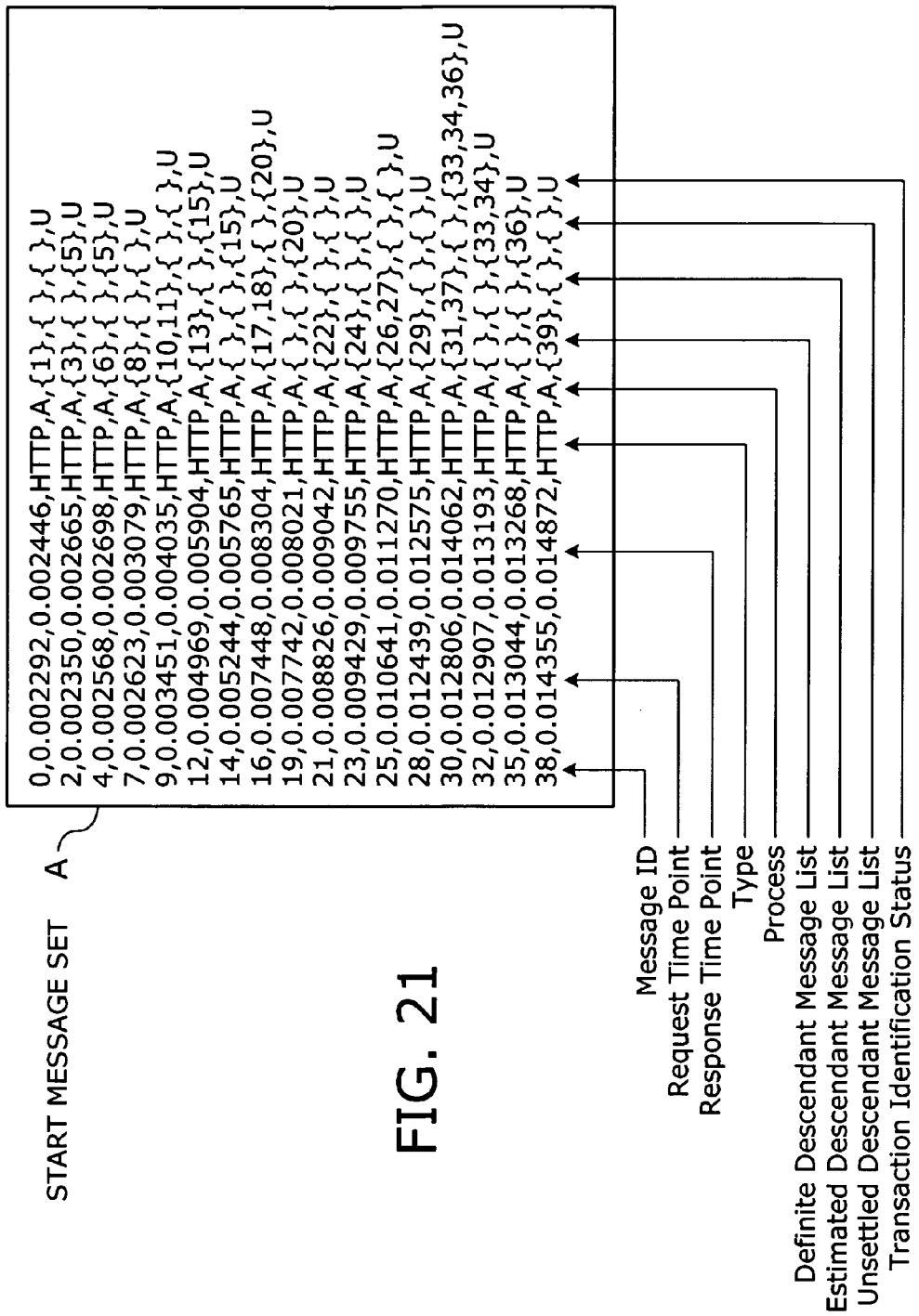
FIG. 21 shows an example of a start message set.

FIG. 21 shows an example of a start message set. The illustrated start message set SA contains records of the messages selected from among those shown in FIG. 20 as meeting the specified start message criteria. The data fields of each message, delimited by commas, are as follows: "Message Id," "Request Time Point," "Response Time Point," "Type," "Process," "{Definite Descendant Message List}," "{Estimated Descendant Message List}," "{Unsettled Descendant Message List}," and "Transaction Identification Status." Note that the braces { } are used to indicate a set of multiple elements, including a null set.

Figure 22:
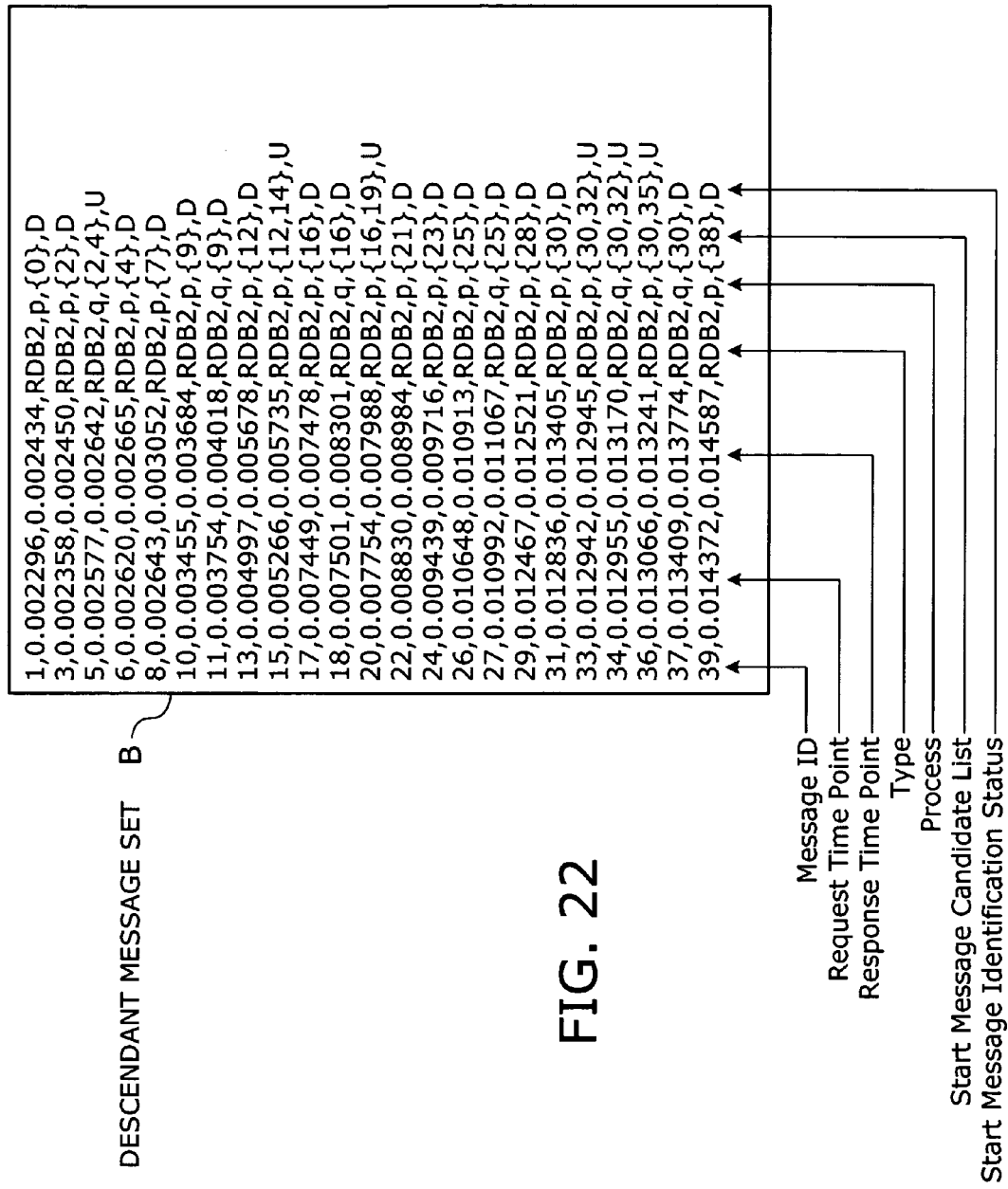
FIG. 22 shows an example of a descendant message set.

FIG. 22 shows an example of a descendant message set. The illustrated descendant message set SB contains records of the messages selected from among those shown in FIG. 20 as not meeting the specified start message criteria. The data fields of each message, delimited by commas, are as follows: "Message ID," "Request Time Point," "Response Time Point," "Type," "Process," "{Start Message Candidate List}," and "Start Message Identification Status." Note here that the descendant message set SB of FIG. 22 does not include a descendant message "40" in spite of the fact that its record does exist in the message log 112 of FIG. 20. This is because no relevant start message candidate is found for the message "40."

The transaction finder 140 now selects messages in the start message set SA in a sequential manner. The currently selected message for processing is referred to as "message k." If the unsettled descendant message list of message k is empty, the transaction is made definite immediately. That is, the transaction finder 140 forms a definite transaction by combining the message k and other message(s) named in the corresponding definite descendant message list.

FIG. 23 gives an example of start messages whose unsettled descendant message list is empty. The illustrated start message set SA selectively shows start messages with an empty unsettled descendant message list, while omitting other irrelevant messages. By consulting the field of {Definite Descendant Message List} of such a start message, the transaction finder 140 extracts its associated descendant messages from the descendant message set SB.

FIG. 24 gives an example of descendant messages associated with start messages having an empty unsettled descendant message list. Of all messages in the descendant message set SB of FIG. 22, FIG. 24 selectively shows those relevant to the start messages having an empty unsettled descendant message list.

FIG. 25 shows definite transactions 71 to 78 that are identified on the basis of the messages listed in FIGS. 23 and 24. Each transaction 71 to 78 is organized as a combination of records representing requests and responses. Each request record has the following data fields: "Transaction ID," "Request Time Point," "Type," "Req," "Message ID," "Transaction Structure Description," "Process," "Client IP Address," "Server IP Address," and "Start Message Identification Status." Each response record has the following data fields: "Transaction ID," "Response Time Point," "Type," "Res," "Message ID," "Transaction Structure Description."

The transaction finder 140 then counts the number of definite transactions. In the present case, there are two groups of definite transactions. Transactions in a first group are each formed from an HTTP message of process "A" and an RDB2 message of process "p." The resulting definite transaction count f(S) of the first group of definite transactions is calculates as f(HTTP;A, RDB2;p)=6 since this group includes six member transactions 71, 72, 74, 75, 77, and 78.

Transactions in a second group, on the other hand, are each formed from an HTTP message of process "A" and two RDB2 messages of processes "p" and "q." The definite transaction count f(S) for the second transaction group is calculates as f(HTTP;A, RDB2;p, RDB2;q)=2 since this group includes two member transactions 73 and 76.

Figure 26:
FIG. 26 shows a start message set after deletion of messages belonging to definite transactions.
Figure 27:
FIG. 27 shows a descendant message set after deletion of messages belonging to definite transactions.

Upon forming the transactions 71 to 78, the transaction finder 140 removes their constituent messages from the start message set SA and descendant message set SB. FIG. 26 shows a state of the start message set SA after messages belonging to definite transactions are deleted. The start message set SA only contains messages with a transaction identification status of "unsettled" ("U"). FIG. 27 shows the descendant message set SB after deletion of messages belonging to definite transactions. The descendant message set SB still contains many messages with a start message identification status of "unsettled" ("U").

The transaction finder 140 then proceeds to a process of estimating transactions. Specifically, the transaction finder 140 selects each of the messages remaining the reduced start message set SA. For each selected start message (referred to as message k), the transaction finder 140 builds a transaction by combining the following elements:

message k itself;
a message listed in the definite descendant message list of message k
a message listed in the estimated descendant message list
at most two messages selected from among the unsettled descendant message list of message k This operation results in as many transaction candidates as the number of messages selected from among the unsettled descendant message list. Out of those transaction candidates, the transaction finder 140 chooses a most likely transaction.

The likelihood of a transaction S is defined in the present example as $h(S)=f(S)+0.2*g(S)$, where f(S) is a definite transaction count and g(S) is an estimated transaction count. The transaction finder 140 here attempts to extract the most likely transaction S1 and the second most likely transaction S2. As the initial selection of S1 and S2, the transaction finder 140 chooses a combination of message k and its definite descendant message for S1, and a dummy transaction S# with a likelihood score of h(S#)=0.9 for S2. It is assumed that the most likely transaction has to meet the condition of h(S1)/h(S2)>2.

The transaction finder 140 begins with selection of a most likely transaction for a start message "2" (i.e., start message with an ID of "2"). The definite descendant message list of this message "2" gives a message "3," and the unsettled descendant message of same gives a message "5." Accordingly, there are two possible message combinations: (HTTP; A, RDB2;p) and (HTTP;A, RDB2;p, RDB2;q). The likelihood scores of transactions formed from these message combinations are calculated as follows:

h(HTTP;A, RDB2;p)=6 h(HTTP;A, RDB2;p, RDB2;q)=2

The former transaction takes the place of the initial S1, and the latter the initial S2. Therefore, the ratio of likelihood of S1 to likelihood of S2 will be h(S1)/h(S2)=6/2=3. Since the ratio h(S1)/h(S2) exceeds the threshold of 2, the transaction finder 140 selects (HTTP;A, RDB2;p) as an estimated transaction. The transaction finder 140 thus increments the estimated transaction count g(HTTP;A, RDB2;p) by one and changes the transaction identification status of message "2" to "settled" ("S").

FIG. 28 shows a state of the start message set SA after updating of transaction identification status. As indicated by the broken-line box, the field of transaction identification status is updated to "S" each time a new transaction is identified. This makes it easy to distinguish each message in the start message set SA as to whether it is processed or unprocessed.

The transaction finder 140 then processes another start message "4" in the same way to estimate a transaction. Specifically, the record of start message "4" has a definite descendant message "6" and an unsettled descendant message "5." Accordingly, there are two possible message combinations: (HTTP;A, RDB2;p) and (HTTP;A, RDB2;q, RDB2;p). The likelihood scores of these transaction candidates are calculated as follows:

h(HTTP;A, RDB2;p)=6.2 h(HTTP;A, RDB2;q, RDB2;p)=0

Since S1=(HTTP;A, RDB2;p) and S2=S# in this case, the likelihood ratio is calculated as h(S1)/h(S2)=6.2/0.9>2, thus permitting (HTTP;A, RDB2;p) to be selected as an estimated transaction. The transaction finder 140 increments the estimated transaction count g(HTTP;A, RDB2;p) by one and changes the transaction identification status of message "4" to "settled" ("S").

Likewise, the transaction finder 140 processes yet another start message "12" to estimate a transaction. Specifically, the record of start message "12" has a definite descendant message "13" and an unsettled descendant message "15." Accordingly, there are two possible message combinations: (HTTP; A, RDB2;p) and (HTTP;A, RDB2;p, RDB2;p). The likelihood scores of these transaction candidates are calculated as follows:

h(HTTP;A, RDB2;p)=6.4 h(HTTP;A, RDB2;p, RDB2;p)=0

Since S1=(HTTP;A, RDB2;p) and S2=S#, the likelihood ratio is calculated as h(S1)/h(S2)=6.4/0.9>2, thus permitting (HTTP;A, RDB2;p) to be selected as an estimated transaction. The transaction finder 140 increments the estimated transaction count g(HTTP;A, RDB2;p) by one and changes the transaction identification status of message "12" to "settled" ("S").

The transaction finder 140 then processes still another start message "14" to estimate a transaction. Specifically, the record of start message "14" has an unsettled descendant message "15," while it has no definite descendant message. Accordingly, there are two possible message combinations: (HTTP;A) and (HTTP;A, RDB2;p). The likelihood scores of these transaction candidates are calculated as follows:

h(HTTP;A)=0 h(HTTP;A, RDB2;p)=6.6

Since S1=(HTTP;A, RDB2;p) and S2=S# in this case, the likelihood ratio is calculated as h(S1)/h(S2)=6.6/0.9>2, thus permitting (HTTP;A, RDB2;p) to be selected as an estimated transaction. The transaction finder 140 increments the estimated transaction count g(HTTP;A, RDB2;p) by one and changes the transaction identification status of message "14"

to "settled" ("S"). In addition, the transaction finder 140 changes the start message identification status of message "15" to "estimated" ("E").

FIG. 29 shows the descendant message set SB after the start message identification status is modified. As indicated by the broken-line box, the start message identification status of a descendant message is changed to "E" when its corresponding start message is estimated. The descendant message is thus distinguished from those that have a definite start message.

The descendant message "15" is no longer "unsettled" since it is now associated with the start message "14" as described above. The transaction finder 140 thus updates the record of message "14" in the start message set SA by moving ID "15" from the unsettled descendant message list field to the estimated descendant message list field.

The transaction finder 140 further looks into the start message candidate list of the descendant message "15" in its corresponding entry of the descendant message set SB. The transaction finder 140 then finds two start message candidates "12" and "14" there. To update the record of the unselected candidate "12," the transaction finder 140 goes back to the start message set SA, locates the record of that message "12," and deletes ID "15" from the unsettled descendant message list field.

FIG. 30 shows a state of the start message set SA after descendant messages are estimated. Since the unsettled descendant message "15" is presumed to be a descendant of the start message "14," the transaction finder 140 has updated relevant records of the start message set SA. With the record of message "14," ID "15" has been moved from the unsettled descendant message list to the estimated descendant message list. With the record of message "12," ID "15" has been removed from the unsettled descendant message list.

Subsequently, the transaction finder 140 processes yet another start message "16" to estimate a transaction. Specifically, this start message "16" has two definite descendant messages "17" and "18," and an unsettled descendant message "20" in its corresponding record. Accordingly, there are two possible message combinations: (HTTP;A, RDB2;p, RDB2;q) and (HTTP;A, RDB2;p, RDB2;q, RDB2;p). The likelihood scores of these transaction candidates are calculated as follows:

h(HTTP;A, RDB2;p, RDB2;q)=2 h(HTTP;A, RDB2;p, RDB2;q, RDB2;p)=0

Since S1=(HTTP;A, RDB2;p, RDB2;q) and S2=S# in this case, the likelihood ratio is calculated as h(S1)/h(S2)=2/0.9>2, thus permitting the first candidate (HTTP;A, RDB2;p, RDB2;q) to be selected as an estimated transaction. The transaction finder 140 increments the estimated transaction count g(HTTP;A, RDB2;p, RDB2;q) by one and changes the transaction identification status of message "16" to "settled" ("S").

Furthermore, the transaction finder 140 processes another start message "19" to estimate a transaction. Specifically, the record of start message "19" has an unsettled descendant message "20," while it has no definite descendant message. Accordingly, there are two possible message combinations: (HTTP;A) and (HTTP;A, RDB2;p). The likelihood scores of these transaction candidates are calculated as follows:

h(HTTP;A)=0 h(HTTP;A, RDB2;p)=6.8

Since S1=(HTTP;A, RDB2;p) and S2=S# in this case, the likelihood ratio is calculated as h(S1)/h(S2)=6.8/0.9>2, thus permitting (HTTP;A, RDB2;p) to be selected as an estimated transaction. The transaction finder 140 increments the estimated transaction count g(HTTP;A, RDB2;p) by one and changes the transaction identification status of message "19" to "settled" ("S"). In addition, the transaction finder 140 changes the start message identification status of message "20" to "estimated" ("E")

The descendant message "20" is no longer "unsettled" since it was selected as being associated with the start message "19" as described above. The transaction finder 140 thus updates the record of message "19" in the start message set SA by moving ID "20" from the unsettled descendant message list field to the estimated descendant message list field. Then turning to the descendant message set SB, the transaction finder 140 looks into the start message candidate list of the descendant message "20" and finds two start message candidates "16" and "19" listed there. To update the record of the unselected candidate "16," the transaction finder 140 goes back to the start message set SA, locates the record of that message "16," and removes ID "20" from the unsettled descendant message list field.

The transaction finder 140 then processes yet another message "30" to find a most likely transaction. Specifically, the record of start message "30" has two definite descendant messages "31" and "37," and three unsettled descendant messages "33," "34," and "36." By combining the start message of interest, both definite descendant messages, and at most two unsettled descendant messages, the transaction finder 140 can produce the following six transaction candidates from possible message combinations:

(1) (HTTP;A, RDB2;p, RDB2;q) from (30, 31, 37)

(2) (HTTP;A, RDB2;p, RDB2;p, RDB2;q) from (30, 31, 33, 37) or (30, 31, 36, 37)

(3) (HTTP;A, RDB2;p, RDB2;q, RDB2;q) from (30, 31, 34, 37)

(4) (HTTP;A, RDB2;p, RDB2;p, RDB2;q, RDB2;q) from (30, 31, 33, 34, 37)

(5) (HTTP;A, RDB2;p, RDB2;p, RDB2;p, RDB2;q) from (30, 31, 33, 36, 37)

(6) (HTTP;A, RDB2;p, RDB2;q, RDB2;p, RDB2;q) from (30, 31, 34, 36, 37)

While the first candidate has likelihood of h(HTTP;A, RDB2;p, RDB2;q)=2.2, the other six candidates have zero likelihood. Since S1=(HTTP;A, RDB2;p) and S2=S# in this case, the likelihood ratio is calculated as h(S1)/h(S2)=2.2/0.9>2, permitting (HTTP;A, RDB2;p, RDB2;q) to be selected as an estimated transaction. The transaction finder 140 thus increments the estimated transaction count g(HTTP;A, RDB2;p, RDB2;q) by one and changes the transaction identification status of message "30" to "settled" ("S").

Likewise, the transaction finder 140 processes still another start message "32" to find a most likely transaction. Specifically, the record of start message "32" has two unsettled descendant messages "33" and "34" while it has no definite descendant message. Accordingly, there are four possible message combinations: (HTTP;A), (HTTP;A, RDB2;p), (HTTP;A, RDB2;q), (HTTP;A, RDB2;p, RDB2;q). While the fourth candidate has likelihood of h(HTTP;A, RDB2;p, RDB2;q)=2.4, the other three candidates have zero likelihood. This means S1=(HTTP;A, RDB2;p, RDB2;q) and S2=S#, and the likelihood ratio is calculates as h(S1)/h(S2)=2.4/0.9>2. The candidate (HTTP;A, RDB2;p, RDB2;q) is therefore selected as an estimated transaction. The transaction finder 140 thus increments the estimated transaction count g(HTTP;A, RDB2;p, RDB2;q) by one and changes the transaction identification status of message "32" to "settled" ("S"). In addition, the transaction finder 140 changes the start message identification status of messages "33" and "34" to "estimated" ("E").

Here, the transaction finder 140 updates the start message set SA to reflect the fact that the unsettled descendant messages "33" and "34" were selected and combined with the start message "32." Specifically, the message IDs "33" and "34" are moved from the unsettled descendant message list to the estimated descendant message list in the record of message "32." Then turning to the descendant message set SB, the transaction finder 140 looks into each start message candidate list of descendant messages "33" and "34" and finds two start message candidates "30" and "32" listed there. To update the record of the unselected candidate "30," the transaction finder 140 goes back to the start message set SA, locates the record of that message "30," and deletes IDs "33" and "34" from the unsettled descendant message list field.

Furthermore, the transaction finder 140 processes yet another start message "35" to find a most likely transaction. This start message "35" has an unsettled descendant message "36," but no definite descendant message, in its record of the start message set SA. Accordingly, there are two possible message combinations, (HTTP;A) and (HTTP;A, RDB2;p), and the likelihood scores of these transaction candidates are calculated as follows:

$$h(HTTP;A)=0$$

$$h(HTTP;A, RDB2;p)=7.0$$

Since S1=(HTTP;A, RDB2;p) and S2=S# in this case, the likelihood ratio is calculated as h(S1)/h(S2)=7.0/0.9>2, thus permitting the latter candidate (HTTP;A, RDB2;p) to be selected as an estimated transaction. The transaction finder 140 increments the estimated transaction count g(HTTP;A, RDB2;p) by one and changes the transaction identification status of message "35" to "settled" ("S"). In addition, the transaction finder 140 changes the start message identification status of message "36" to "estimated" ("E").

The series of operations described above have selected most likely transactions corresponding to the messages in the start message set SA. FIG. 31 shows specifics of the resulting nine transactions 81 to 89.

More specifically, the transaction 81 is an estimated transaction composed of a start message "2" and a descendant message "3." The transaction 82 is an estimated transaction formed from a start message "4" and a descendant message "6." The transaction 83 is an estimated transaction formed from a start message "12" and a descendant message "13." The transaction 84 is an estimated transaction formed from a start message "14" and a descendant message "15." The transaction 85 is an estimated transaction formed from a start message "16" and descendant messages "17" and "18." The transaction 86 is an estimated transaction formed from a start message "19" and a descendant message "20." The transaction 87 is an estimated transaction formed from a start message "30" and descendant messages "31" and "37." The transaction 88 is an estimated transaction formed from a start message "32" and descendant messages "33" and "34." The transaction 89 is an estimated transaction formed from a start message "35" and a descendant message "36."

FIG. 32 shows a state of the start message set SA after the selection of most likely transactions has finished. As can be seen from FIG. 32, all message entries in the start message set SA have gained a transaction identification status of "settled" ("S").

Figure 33:
FIG. 33 shows a descendant message set after selection of most likely transactions.

FIG. 33 shows a state of the descendant message set SB after the selection of most likely transactions has finished. As can be seen from FIG. 33, in comparison with FIG. 27, some messages originally with a start message identification status of "unsettled" ("U") now have an "estimated" ("E") status, since they belong to estimated transactions that are produced.

The transaction finder 140 now attempts to resolve the remaining unsettled descendant messages by making a replacement of estimated transactions. That is, the descendant message set SB still has some descendant messages with a start message identification status of "unsettled" ("U"). The replacement process is applied to such messages. In the replacement algorithm, a replacement transaction candidate S* is eligible for replacement if h(S*)>0. The threshold is assumed to be zero in the present example, but the present invention is not limited to that specific condition. The process begins with an initial setup of S*=S# and h(S*)=h(S#)=0, where S# is a dummy transaction.

Referring to FIG. 33, the descendant message set SB at this stage contains a descendant message "5" flagged as unidentified. Since two IDs "2" and "4" are listed in the corresponding start message candidate list of message "5," the transaction finder 140 builds a replacement transaction candidate for each start message in the following way:

(a) Start message "2" belongs to an estimated transaction S1=(HTTP;A, RDB2;p). By combining the unsettled descendant message "5" with this estimated transaction S1, a replacement transaction candidate S1* is created as (HTTP;A, RDB2;p, RDB2;q).

(b) Start message "4" belongs to an estimated transaction S2=(HTTP;A, RDB2;p). By combining the unidentified descendent message "5" with this estimated transaction S2, a replacement transaction candidate S2* is created as (HTTP;A, RDB2;q, RDB2;p)

The likelihood scores of these replacement transaction candidates are calculated as follows:

$$h(S1*)=2.6$$

$$h(S2*)=0$$

Besides having a greater likelihood, the first candidate S1* satisfies the given replacement condition, h(S1*)>0. The transaction finder 140 therefore replaces S1 with S1*. The transaction finder 140 decrements the estimated transaction count g(HTTP;A, RDB2;p) of the former S1 by one, while incrementing the estimated transaction count g(HTTP;A, RDB2;p;RDB2;q) of S1* by one. The transaction finder 140 further changes the start message identification status of message "5" to "replaced" ("R").

FIG. 34 shows a state of the descendant message set SB after the replacement of estimated transactions. As can be seen, the start message identification status of message "5" has been changed from "U" to "R" since that message "5" now belongs to an estimated transaction as a result of the above-described replacement process.

Figure 35:
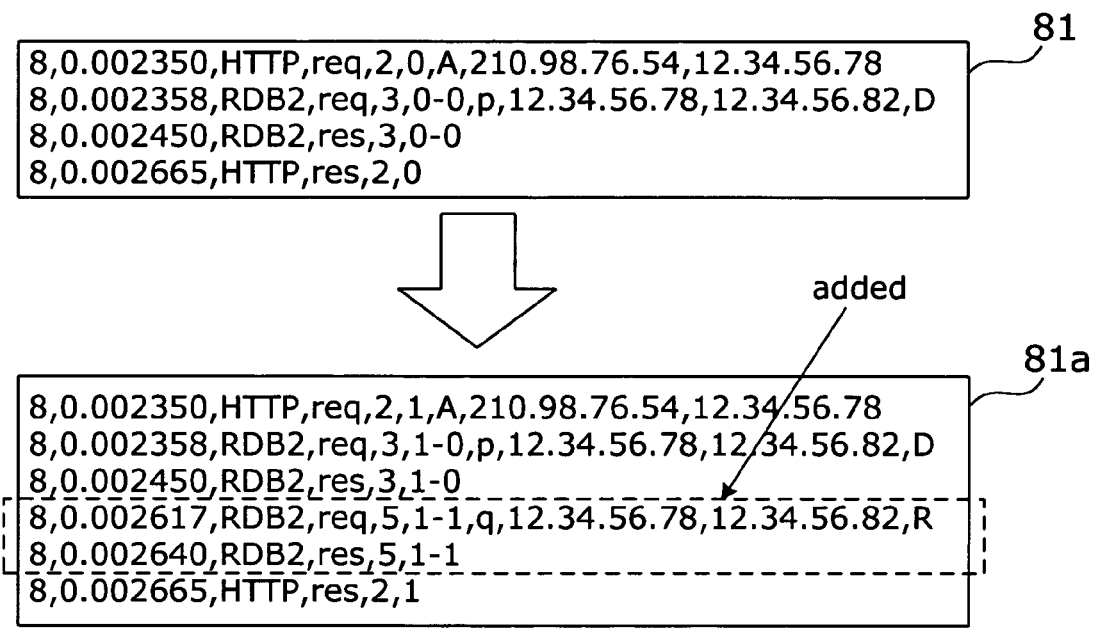
FIG. 35 shows a transaction replaced as a result of replacement of an estimated transaction.

FIG. 35 shows how the replacement process has modified the estimated transaction of interest. The upper box represents the original estimated transaction 81. The addition of message "5" to this transaction 81 results in a replacement transaction 81a, where the fourth and fifth lines are of the added message "5."

The descendant message "5" is no longer "unsettled" since it has been selected in connection with a start message "2" as a result of transaction replacement. The transaction finder 140 thus updates the record of message "2" in the start message set SA by moving ID "5" from the unsettled descendant message list to the estimated descendant message list. Then turning to the descendant message set SB, the transaction finder 140 looks into the start message candidate list of message "5" and finds two start message candidates "2" and "4" listed there. To update the record of the unselected candidate "4," the transaction finder 140 goes back to the start message set SA, locates the record of that message "4," and deletes ID "5" from the unsettled descendant message list field.

FIG. 36 shows a state of the start message set SA after the replacement of estimated transactions. As can be seen, the unsettled descendant message list field is empty in every record of the start message set SA, meaning that none of the start messages has unsettled descendant messages.

Now that all messages have resolved, the transaction finder 140 ends its tasks, passing the identification result to the subsequent stage for output. FIGS. 37 and 38 show the first and second halves of this transaction identification result 90. The transaction identification result 90 includes definite transactions, estimated transactions, and replacement transactions in the order that they are identified. As an alternative form of output, the transaction identification result may be arranged in the order of transaction start times.

Yet another option is to output a summary report describing each different class of transactions succinctly. FIG. 39 shows a transaction identification result 91 summarizing the identified transactions by transaction class. The first line "0;HTTP; A, 0-0;RDB2;p [11/6/5/7.0]" describes a transaction categorized in transaction class 0 (i.e., transaction class with an ID of "0"). The second line "1;HTTP;A, 1-0;RDB2;p, 1-1; RDB2;q [6/2/4/2.8]" describes a transaction categorized in transaction class 1.

Figure 40:
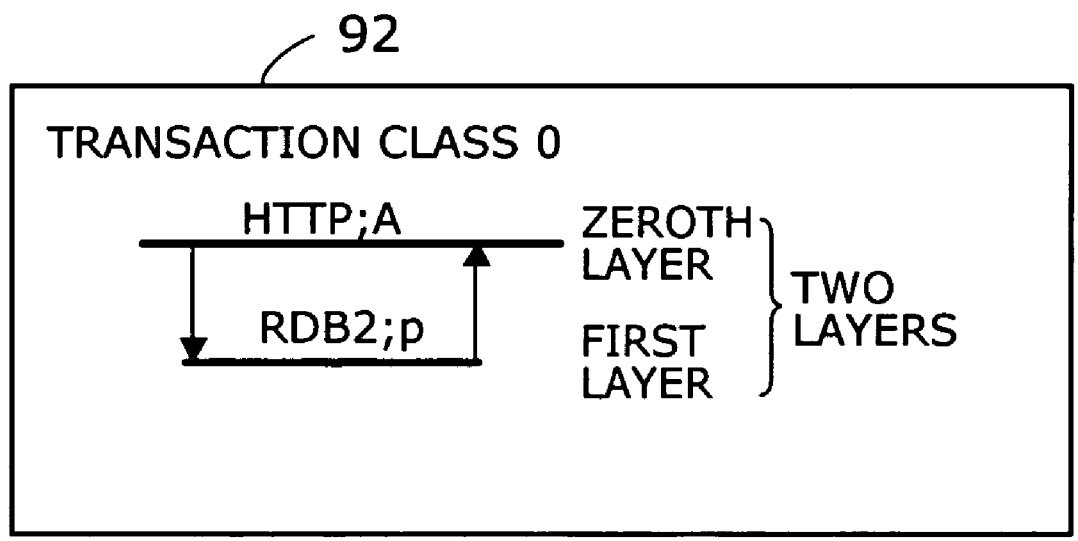
FIG. 40 depicts the structure of transactions categorized in transaction class 0.

FIG. 40 depicts a transaction of transaction class 0. This transaction 92 is a two-layer transaction corresponding to the first line "0;HTTP;A, 0-0;RDB2;p [11/6/5/7.0]" of FIG. 39. The bracketed text, [11/6/5/7.0], indicates that the given message log contains eleven instances of transaction class 0, including six definite transactions and five estimated transactions, with a likelihood score of 7.0 (=6+0.2*5).

Figure 41:
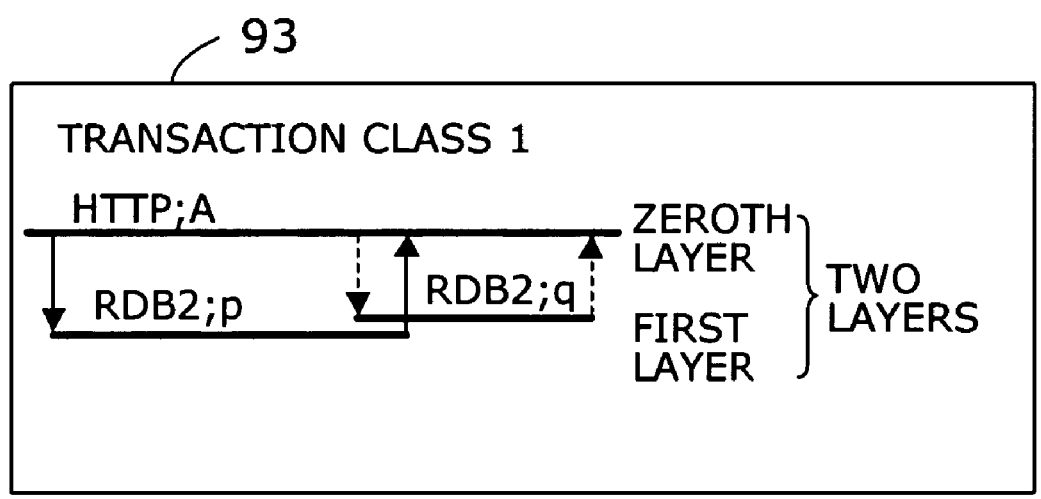
FIG. 41 depicts the structure of transactions categorized in transaction class 1.

FIG. 41 depicts a transaction of transaction class 1. This transaction 93 is a two-layer transaction corresponding to the second line "1;HTTP;A, 1-0;RDB2;p, 1-1;RDB2;q[6/2/4/ 2.8]" of FIG. 39. The bracketed text, [6/2/4/2.8], indicates that the given message log contains six instances of transaction class 1, including two definite transactions and four estimated transactions, with a likelihood score of 2.8 (=2+0.2*4).

SECOND EXAMPLE OF TRANSACTION ANALYSIS

This section describes a second example of transaction analysis, in which message records may contain some pieces of response information. More particularly, the following example assumes that message records have an HTTP status code or the like to indicate a result status.

FIG. 42 shows a message log including such response codes. The illustrated message log 112 contains the records of observed messages, each having the following data fields: "Message ID," "Request Time Point," "Response Time Point," "Type," "Process," "Response Code," "Client IP Address," and "Server IP Address." The response code field indicates the result of a process that has been executed according to a specific request. For example, an HTTP message will include a code "OK" when the requested process is completed successfully, and "FAIL" when the process has failed. In the case of RDB2 messages, the response code field will have a value of "ok" only when the process is completed successfully.

The transaction identification process begins with extracting definite transactions from such message records. More specifically, the transaction finder 140 examines the unsettled descendant message list of each message k in the start message set SA. If the unsettled descendant message list of message k is empty, a definite transaction can be formed by combining that start message k and other messages, if any, in its definite descendant list.

FIG. 43 shows the resulting definite transactions in the present case. Transactions 211 to 218 shown in FIG. 43 have been made definite on the basis of message records listed in FIG. 42. Those transactions 211 to 218 include both request records and response records. Elements of each request record are arranged in the same data format as discussed in FIG. 25. The response records have the following data fields: "Transaction ID," "Response Time Point," "Type," "Request/ Response" (always "res" for response records), "Message ID," "Transaction Structure Description," and "Response Code." Note that "Response Code" is a new field added in the present embodiment.

Each time a new definite transaction is found, the transaction finder 140 increments the definite transaction count f(S). In counting transactions, the transaction finder 140 regards separate transactions as falling in a single class if they share the same message type, process ID, and response code. The resulting definite transaction counts in the present example are as follows:

$f(HTTP;A;OK, RDB2;p;ok)=5$ $f(HTTP;A;OK, RDB2;p;ok, RDB2;q;ok)=1$ $f(HTTP;A;FAIL, RDB2;p;ok)=1$ $f(HTTP;A;FAIL, RDB2;p;ok, RDB2;q;ok)=1$

Subsequently the transaction finder 140 proceeds to a process of estimating transactions. First, the transaction finder 140 seeks every start message and descendant message involved in each definite transaction and removes their corresponding records from both the start message set SA and descendant message set SB.

FIG. 44 shows a state of the start message set SA after removal of definitized start messages. All remaining entries of the start message set SA are flagged as "unsettled" ("U") in their transaction identification status field.

FIG. 45 shows a state of the descendant message set SB after removal of definitized descendant messages. As can be seen, the descendant message set SB still contains many messages with a start message identification status of "unsettled" ("U").

The transaction finder 140 now proceeds to a process of selecting most likely transactions. Basically, this process is similar to the process explained in the section of "First Example of Transaction Identification."

The transaction finder 140 begins with a start message "2" (i.e., start message with an ID of "2") to find a most likely transaction. Specifically, this start message "2" has a definite descendant message "3" and an unsettled descendant message "5" in its corresponding record. Accordingly, there are two possible message combinations: (HTTP;A;OK, RDB2; p;ok) and (HTTP;A;OK, RDB2;p;ok, RDB2;q;ok). The likelihood scores of these transaction candidates are calculated as follows:

$h(HTTP;A;OK, RDB2;p;ok)=5$ $h(HTTP;A;OK, RDB2;p;ok, RDB2;q;ok)=1$

The likelihood ratio is h(S1)/h(S2)=5/1>2, thus permitting the first candidate (HTTP;A;OK, RDB2;p;ok) to be selected as an estimated transaction. The transaction finder 140 then increments the estimated transaction count g(HTTP;A;OK, RDB2;p;ok) by one and changes the transaction identification status of message "2" to "settled" ("S").

The transaction finder 140 now moves the focus to another start message "4" to find a most likely transaction. Specifically, this start message "4" has a definite descendant message "6" and an unsettled descendant message "5" in its corresponding record. Accordingly, there are two possible message combinations: (HTTP;A;FAIL, RDB2;p;ok) and (HTTP;A;FAIL, RDB2;q;ok, RDB2;p;ok). The likelihood scores of these transaction candidates are calculated as follows:

h(HTTP;A;FAIL, RDB2;p;ok)=1 h(HTTP;A;FAIL, RDB2;q;ok, RDB2;p;ok)=0

Since S1=(HTTP;A;OK, RDB2;p;ok) and S2=S# in this case, the likelihood ratio h(S1)/h(S2) will be 1.11 (=1/0.9). The transaction finder 140 selects no estimated transaction for message "4" because h(S1)/h(S2) is smaller than the threshold of 2.

The transaction finder 140 then moves the focus to yet another start message "12" to find a most likely transaction. Specifically, this start message "12" has a definite descendant message "13" and an unsettled descendant message "15" in its corresponding record. Accordingly, there are two possible message combinations: (HTTP;A;OK, RDB2;p;ok) and (HTTP;A;OK, RDB2;p;ok, RDB2;p;ok). The likelihood scores of these transaction candidates are calculated as follows:

h(HTTP;A;OK, RDB2;p;ok)=5.2 h(HTTP;A;OK, RDB2;p;ok, RDB2;p;ok)=0

Since S1=(HTTP;A;OK, RDB2;p;ok) and S2=S# in this case, the likelihood ratio is calculated as h(S1)/h(S2)=5.2/0.9>2, thus permitting the first candidate (HTTP;A;OK, RDB2;p; ok) to be selected as an estimated transaction. The transaction finder 140 then increments the estimated transaction count g(HTTP;A;OK, RDB2;p;ok) by one and changes the transaction identification status of message "12" to "settled" ("S").

The transaction finder 140 then moves the focus to still another start message "14" to find a most likely transaction. This start message "14" has an unsettled descendant message "15," but no definite descendant message, in its corresponding record. Accordingly, there are two possible message combinations: (HTTP;A;OK) and (HTTP;A;OK, RDB2;p;ok). The likelihood scores of these transaction candidates are calculated as follows:

h(HTTP;A;OK)=0 h(HTTP;A;OK, RDB2;p;ok)=5.4

Since S1=(HTTP;A;OK, RDB2;p;ok) and S2=S# in this case, the likelihood ratio is calculated as h(S1)/h(S2)=5.4/0.9>2, thus permitting the first candidate (HTTP;A;OK, RDB2;p; ok) to be selected as an estimated transaction. The transaction finder 140 then increments the estimated transaction count g(HTTP;A;OK, RDB2;p;ok) by one and changes the transaction identification status of message "14" to "settled" ("S"). In addition, the transaction finder 140 changes the start message identification status of message "15" to "estimated" ("E").

The descendant message "15" is no longer "unsettled" since it has been selected in connection with a start message "14" as a result of the selection process described above. The transaction finder 140 thus updates the record of message "14" in the start message set SA by moving ID "15" from the unsettled descendant message list to the estimated descendant message list. Then turning to the descendant message set SB, the transaction finder 140 looks into the start message candidate list of message "15" and finds two IDs "12" and "14" listed there. To update the record of the unselected candidate "12," the transaction finder 140 goes back to the start message set SA, locates the record of that message "12," and deletes ID "15" from the unsettled descendant message list field.

The transaction finder 140 then moves the focus to still another start message "16" to find a most likely transaction. Specifically, this start message "16" has two definite descendant messages "17" and "18" and an unsettled descendant message "20" in its corresponding record. Accordingly, there are two possible message combinations: (HTTP;A;OK, RDB2;p;ok, RDB2;q;ok) and (HTTP;A;OK, RDB2;p;ok, RDB2;q;ok, RDB2;p;ok). The likelihood scores of these transaction candidates are calculated as follows:

h(HTTP;A;OK, RDB2;p;ok, RDB2;q;ok)=1 h(HTTP;A;OK, RDB2;p;ok, RDB2;q;ok, RDB2;p;ok)=0

Since S1=(HTTP;A, RDB2;p, RDB2;q) and S2=S# in this case, the likelihood ratio h(S1)/h(S2) will be 1.11 (=1/0.9). The transaction finder 140 selects no estimated transaction for message "16" because h(S1)/h(S2) is smaller than the threshold of 2.

The transaction finder 140 then moves the focus to yet another start message "19" to find a most likely transaction. Specifically, the record of start message "19" has an unsettled descendant message "20," while it has no definite descendant message. Accordingly, there are two possible message combinations: (HTTP;A;OK) and (HTTP;A;OK, RDB2;p;ok). The likelihood scores of these transaction candidates are calculated as follows:

h(HTTP;A;OK)=0 h(HTTP;A;OK, RDB2;p;ok)=5.6

Since S1=(HTTP;A;OK, RDB2;p;ok) and S2=S# in this case, the likelihood ratio is calculated as h(S1)/h(S2)=5.6/0.9>2, thus permitting the first candidate (HTTP;A;OK, RDB2;p; ok) to be selected as an estimated transaction. The transaction finder 140 then increments the estimated transaction count g(HTTP;A;OK, RDB2;p;ok) by one and changes the transaction identification status of message "19" to "settled" ("S"). In addition, the transaction finder 140 changes the start message identification status of message "20" to "estimated" ("E").

The descendant message "20" is no longer "unsettled" since it has been selected in connection with a start message "19" as a result of the selection process described above. The transaction finder 140 thus updates the record of message "19" in the start message set SA by moving ID "20" from the unsettled descendant message list to the estimated descendant message list. Then turning to the descendant message set SB, the transaction finder 140 looks into the start message candidate list of the descendant message "20" and finds two start message candidates "16" and "19" listed there. To update the record of the unselected candidate "16," the transaction finder 140 goes back to the start message set SA, locates the record of that message "16," and removes ID "20" from the unsettled descendant message list field.

The transaction finder 140 then moves the focus to yet another start message "30" to find a most likely transaction. Specifically, this start message "30" has two definite descendant messages "31" and "37" and three unsettled descendant messages "33," "34," and "36" in its corresponding record. By combining the start message of interest, both definite descendant messages, and at most two unsettled descendant messages, the transaction finder 140 can produce the following six transaction candidates from possible message combinations:

(1) (HTTP;A;OK, RDB2;p;ok, RDB2;q, ok) from (30, 31, 37)
(2) (HTTP;A;OK, RDB2;p;ok, RDB2;p;ok, RDB2;q;ok) from (30, 31, 33, 37) or (30, 31, 36, 37)
(3) (HTTP;A;OK, RDB2;p;ok, RDB2;q;ok, RDB2;q;ok) from (30, 31, 34, 37)
(4) (HTTP;A;OK, RDB2;p;ok, RDB2;p;ok, RDB2;q;ok, RDB2;q;ok) from (30, 31, 33, 34, 37)
(5) (HTTP;A;OK, RDB2;p;ok, RDB2;p;ok, RDB2;p;ok, RDB2;q;ok) from (30, 31, 33, 36, 37)
(6) (HTTP;A;OK, RDB2;p;ok, RDB2;q;ok, RDB2;p;ok, RDB2;q;ok) from (30, 31, 34, 36, 37)

While the first candidate has a likelihood score of h(HTTP;A;OK, RDB2;p;ok, RDB2;q;ok)=2.2, the other five candidates have zero likelihood. Since S1=(HTTP;A;OK, RDB2;p;ok, RDB2;q;ok) and S2=S# in this case, the likelihood ratio is calculated as h(S1)/h(S2)=1.11 (=1/0.9). Since h(S1)/h(S2) is smaller than the threshold of 2, the transaction finder 140 selects no estimated transactions for message "30."

The transaction finder 140 then moves the focus to still another start message "32" to find a most likely transaction. Specifically, the record of this start message "32" has two unsettled descendant messages "33" and "34" while it has no definite descendant message. Accordingly, there are four possible message combinations: (HTTP;A;FAIL), (HTTP;A;FAIL, RDB2;p;ok), (HTTP;A;FAIL, RDB2;q;ok), and (HTTP;A;FAIL, RDB2;p;ok, RDB2;q;ok). While the first candidate has a likelihood score of h(HTTP;A;FAIL, RDB2;p;ok, RDB2;q;ok)=1, the other three candidates have zero likelihood. Since S1=(HTTP;A, RDB2;p, RDB2;q) and S2=S# in this case, the likelihood ratio h(S1)/h(S2) will be 1.11 (=1/0.9). The transaction finder 140 selects no estimated transaction for message "32" because h(S1)/h(S2) is smaller than the threshold of 2.

The transaction finder 140 then moves the focus to yet another start message "35" to find a most likely transaction. This start message "35" has an unsettled descendant message "36," but no definite descendant message, in its record of the start message set SA. Accordingly, there are two possible message combinations: (HTTP;A;OK) and (HTTP;A;OK, RDB2;p;ok). The likelihood scores of these transaction candidates are calculated as follows:

h(HTTP;A;OK)=0 h(HTTP;A;OK, RDB2;p;ok)=5.8

Since S1=(HTTP;A;OK, RDB2;p;ok) and S2=S# in this case, the likelihood score is calculates as h(S1)/h(S2)=5.8/0.9>2, thus permitting the first candidate (HTTP;A;OK, RDB2;p;ok) to be selected as an estimated transaction. The transaction finder 140 then increments the estimated transaction count g(HTTP;A;OK, RDB2;p;ok) by one and changes the transaction identification status of message "35" to "settled" ("S"). In addition, the transaction finder 140 changes the start message identification status of message "36" to "estimated" ("E").

The descendant message "36" is no longer "unsettled" since it has been selected in connection with a start message "35" as a result of the selection process described above. The transaction finder 140 thus updates the record of message "35" in the start message set SA by moving ID "36" from the unsettled descendant message list to the estimated descendant message list. Then turning to the descendant message set SB, the transaction finder 140 looks into the start message candidate list of the descendant message "36" and finds two start message candidates "30" and "35" listed there. To update the record of the unselected candidate "30," the transaction finder 140 goes back to the start message set SA, locates the record of that message "30," and removes ID "36" from the unsettled descendant message list field.

The above process has allowed every start message to be subjected to a single cycle of a transaction estimation process. FIGS. 46 and 47 show the resulting start message set SA and descendant message set SB, respectively. As can be seen from FIG. 46, the start message set SA contains a plurality of start messages with a transaction identification status of "unsettled" ("U"). The descendant message set SB of FIG. 47 includes several messages with a start message identification status of "Estimated" ("E"), indicating that they belong to some estimated transactions.

Since the terminating condition of the transaction identification process is not satisfied, the transaction finder 140 execute another cycle of the transaction estimation process to deal with the remaining start messages flagged as "unsettled" ("U"). Specifically, four start messages "4," "16," "30," and "32" will be subjected to the re-execution.

The identification process begins with a start message "4." Transaction candidates, or possible message combinations, for this start message "4" are (HTTP;A;FAIL, RDB2;q;ok) and (HTTP;A;FAIL, RDB2;q;ok, RDB2;p;ok). However, their likelihood scores fall short of the specified threshold level. For this reason, the transaction finder 140 selects no estimated transactions.

The transaction finder 140 now turns to another start message "16" in an attempt to estimate a transaction. Recall here that the unsettled descendant message list of message "16" originally had an entry of ID "20" (see FIG. 44). This ID "20" was removed when a new estimated transaction with a start message "19" was identified. As a result, the unsettled descendant message list of message "16" is now empty. The lack of unsettled descendant messages causes the transaction finder 140 to select an estimated transaction (HTTP;A;OK, RDB2;p;ok, RDB2;q;ok) by only combining definite descendant messages "17" and "18" to the start message "16" of interest. The transaction finder 140 then increments the estimated transaction count g(HTTP;A;OK, RDB2;p;ok, RDB2;q;ok) by one and changes the transaction identification status of message "16" to "settled" ("S").

The transaction finder 140 processes the other two start messages "30" and "32" in the same way as above. The former start message "30" fails to provide transaction candidates with sufficient likelihood levels, thus yielding no estimated transactions. This is also the case with the latter start message "32."

The above-described iteration of the present process, however, can see no more messages incorporated into estimated transactions. The transaction finder 140 stops estimating transactions. FIG. 48 shows all estimated transactions 221 to 226 that the transaction finder 140 has produced so far.

The transaction finder 140 now attempts to resolve the remaining unsettled descendant messages by making a replacement of estimated transactions. Specifically, the descendant message set SB of FIG. 47 indicates that there exist three descendant messages "5," "33," and "34" flagged as "unsettled" ("U"). The transaction finder 140 therefore subjects these descendant messages to a replacement process of estimated transactions.

The transaction finder 140 begins with an unsettled descendant message "5." This message "5" has two start message candidates "2" and "4" in its corresponding record of the descendant message set SB. Thus the transaction finder 140 creates replacement transaction candidates in the following way:

(a) Start message "2" belongs to an estimated transaction S1=(HTTP;A;OK, RDB2;p;ok). Adding the message "5" to this estimated transaction S1 yields a first replacement transaction candidate S1*=(HTTP;A;OK, RDB2;p;ok, RDB2;q;ok).

(b) Start message "4" is flagged as "unsettled," meaning that no transaction invoked by that message has been identified. The combination of this start message "4," its definite descendant message "6," and the message "5" of interest yields a second replacement transaction candidate S2*=(HTTP;A;FAIL, RDB2;q;ok, RDB2;p;ok).

The likelihood scores of these replacement transaction candidates are calculated as follows:

$$h(S1^*)=1$$

$$h(S2^*)=0$$

Besides having a greater likelihood, the first candidate S1* satisfies the given replacement condition, h(S1*)>0. The transaction finder 140 therefore replaces S1 with S1*. The transaction finder 140 decrements the estimated transaction count g(HTTP;A;OK, RDB2;p;ok) of the former S1 by one, while incrementing the estimated transaction count g(HTTP;A;OK, RDB2;p;ok, RDB2;q;ok) of S1* by one. Additionally, the transaction finder 140 changes the start message identification status of message "5" to "replaced" ("R").

Figure 49:
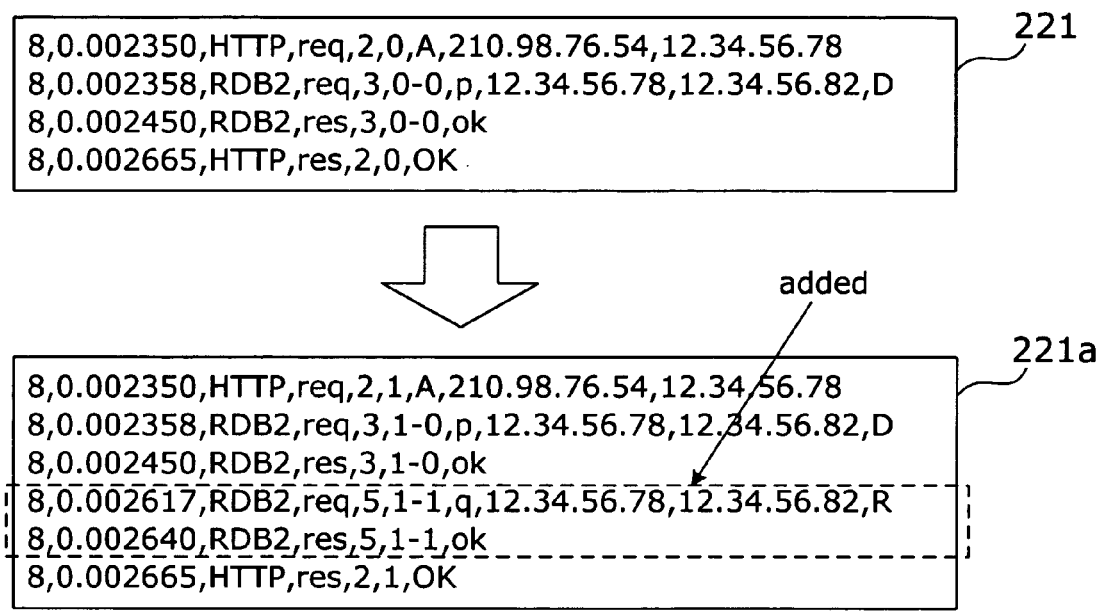
FIG. 49 shows replacement transactions obtained by an estimated transaction replacement process.

FIG. 49 shows the estimated transactions replaced by the replacement process described above. The upper box represents the original estimated transaction 221. The addition of message "5" to this transaction 221 results in a replacement transaction 221a, where the fourth and fifth lines are of the added message "5."

The descendant message "5" is no longer "unsettled" since it has been selected in connection with a start message "2" as a result of transaction replacement. The transaction finder 140 thus updates the record of message "2" in the start message set SA by moving ID "5" from the unsettled descendant message list to the estimated descendant message list. Then turning to the descendant message set SB, the transaction finder 140 looks into the start message candidate list of message "5" and finds two start message candidates "2" and "4" listed there. To update the record of the unselected candidate "4," the transaction finder 140 goes back to the start message set SA, locates the record of that message "4," and deletes ID "5" from the unsettled descendant message list field.

The transaction finder 140 proceeds to another unsettled descendant message "33." This message "33" has two start message candidates "30" and "32" in its corresponding record of the descendant message set SB. Thus the transaction finder 140 creates replacement transaction candidates in the following way:

(a) Start message "30" is flagged as "unsettled," meaning that no transaction invoked by that message has been identified. The combination of this start message "30," its definite descendant messages "31" and "37," and the unidentified descendent message "33" of interest yields a first replacement transaction candidate S1*=(HTTP;A;OK, RDB2;p;ok, RDB2;p;ok;RDB2;q;ok).

(b) Start message "32" is flagged as "unsettled," meaning that no transaction invoked by that message has been identified. The combination of this start message "32" and the message "33" of interest yields a second replacement transaction candidate S2*=(HTTP;A;FAIL, RDB2;p;ok).

The likelihood scores of these replacement transaction candidates are calculated as follows:

$$h(S1^*)=0$$

$$h(S2^*)=1$$

Besides having a greater likelihood, the second candidate S2* satisfies the given replacement condition, h(S2*)>0. The transaction finder 140 therefore selects this S2* as a new transaction. The transaction finder 140 increments the estimated transaction count g(HTTP;A;FAIL, RDB2;p;ok) of S2* by one and changes the transaction identification status of message "32" to "settled" ("S"). In addition, the transaction finder 140 changes the start message identification status of message "33" to "replaced" ("R").

FIG. 50 shows a replacement transaction 227 newly produced by the replacement process described above. Since the start message "32" has no corresponding estimated transaction in the present example, the replacement transaction 227 actually replaces nothing. Rather, it is a new transaction.

The descendant message "33" is no longer "unsettled" since it has been selected in connection with a start message "32" as a result of transaction replacement. The transaction finder 140 thus updates the record of message "32" in the start message set SA by moving ID "33" from the unsettled descendant message list to the estimated descendant message list. Then turning to the descendant message set SB, the transaction finder 140 looks into the start message candidate list of message "33" and finds two start message candidates "30" and "32" listed there. To update the record of the unselected candidate "30," the transaction finder 140 goes back to the start message set SA, locates the record of that message "30," and deletes ID "33" from the unsettled descendant message list field.

The transaction finder 140 proceeds to yet another unsettled descendant message "34." Since two IDs "30" and "32" are found in the start message candidate list of message "34," the transaction finder 140 builds a replacement transaction candidate for each start message candidate in the following way:

(a) Start message "30" is flagged as "unsettled," meaning that no transaction invoked by that message has been identified. The combination of this start message "30," its definite descendant messages "31" and "37," and the message "34" of interest yields a first replacement transaction candidate S1*=(HTTP;A;OK, RDB2;p;ok, RDB2;q;ok;RDB2;q;ok).

(b) Start message "32" belongs to an estimated transaction S2=(HTTP;A;FAIL, RDB2;p;ok). Adding the message "34" to this estimated transaction S2 yields a second replacement transaction candidate S2*=(HTTP;A;FAIL, RDB2;p;ok, RDB2;q;ok).

The likelihood scores of these replacement transaction candidates are calculated as follows:

$$h(S1^*)=0$$

$$h(S2^*)=1$$

Besides having a greater likelihood, the second candidate S2* satisfies the given replacement condition, h(S2*)>0. The transaction finder 140 therefore replaces S2 with S2*. The transaction finder 140 then decrements the estimated transaction count g(HTTP;A;FAIL, RDB2;p;ok) of the former S2 by one, while incrementing the estimated transaction count g(HTTP;A;FAIL, RDB2;p;ok, RDB2;q;ok) of S2* by one. Additionally, the transaction finder 140 changes the start message identification status of message "34" to "replaced" ("R").

Figure 51:
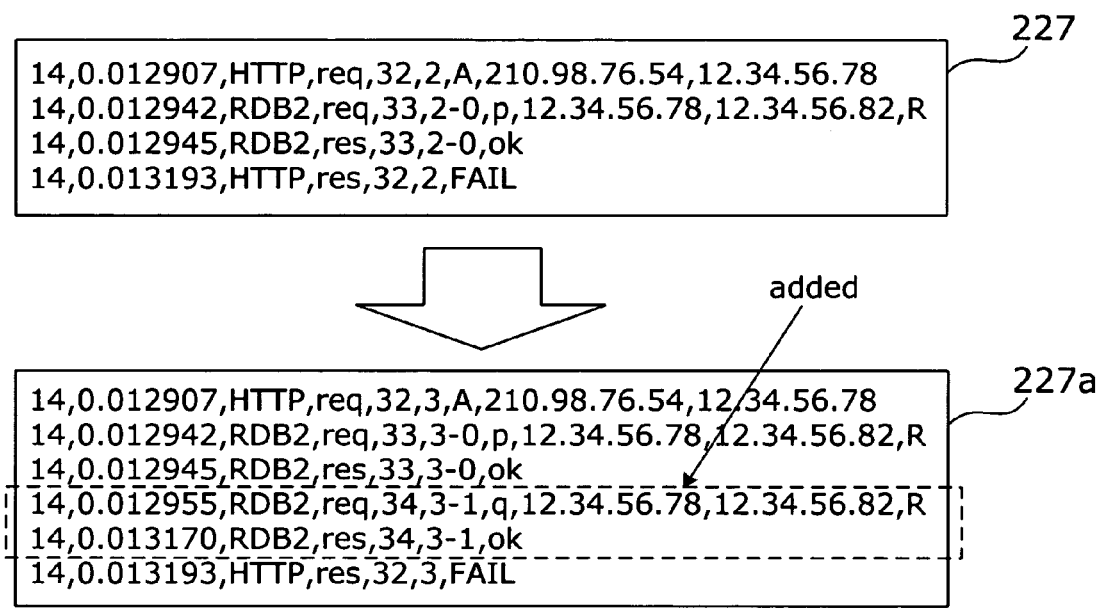
FIG. 51 shows a replacement transaction obtained by an estimated transaction replacement process.

FIG. 51 shows estimated transactions replaced by the process described above. The upper box represents the original estimated transaction 227. The addition of message "34" to this transaction 227 results in a replacement transaction 227a, where the fourth and fifth lines are of the added message "34."

The descendant message "34" is no longer "unsettled" since it has been selected in connection with a start message "32" as a result of transaction replacement. The transaction finder 140 thus updates the record of message "32" in the start message set SA by moving ID "34" from the unsettled descendant message list to the estimated descendant message list. Then turning to the descendant message set SB, the transaction finder 140 looks into the start message candidate list of message "34" and finds two start message candidates "30" and "32" listed there. To update the record of the unselected candidate "30," the transaction finder 140 goes back to the start message set SA, locates the record of that message "30," and removes ID "34" from the unsettled descendant message list field.

Now that all descendant messages are settled, the transaction finder 140 exits from the process of replacing estimated transactions. After that, the transaction finder 140 returns to the step of estimating transactions because two start messages "4" and "30" still remain with a transaction identification status of "unsettled" ("U").

In the second cycle of transaction estimation, the transaction finder 140 first checks the unsettled descendant message list of the start message "4" of interest and finds it empty. The transaction finder 140 therefore combines the start message "4" with its definite descendant message "6" to produce an estimated transaction (HTTP;A;FAIL, RDB2;p;ok). After that, the transaction finder 140 increments the estimated transaction count g(HTTP;A;FAIL, RDB2;p;ok) by one and changes the transaction identification status of message "4" to "settled" ("S").

FIG. 52 shows an estimated transaction newly produced as a result of the above processing. This transaction 228 is composed of a start message "4" and a descendant message "6."

The transaction finder 140 then moves the focus to another unidentified start message "30." Since the unsettled descendant message list of this message "30" is empty, the transaction finder 140 combines the message "30" itself and its definite descendant messages "31" and "37" to build an estimated transaction (HTTP;A;OK, RDB2;p;ok, RDB2;q;ok). The transaction finder 140 then increments the estimated transaction count g(HTTP;A;OK, RDB2;p;ok, RDB2;q;ok) by one and changes the transaction identification status of message "30" to "settled" ("S").

FIG. 53 shows an estimated transaction newly produced as a result of the above processing. This transaction 229 is composed of a start message "30" and two descendant messages "31" and "37."

Now that all messages are settled, the transaction finder 140 exits from the transaction identification process and outputs the identification result in a predetermined format. The outcomes include definite transactions, estimated transactions, and replacement transactions. The resultant transactions may be output in the order that they are identified (e.g., definite transactions first, and then estimated and replacement transactions). As an alternative form of output, the transactions may be sorted in the order of their transaction start times.

FIGS. 54 and 55 show the first and second halves of a transaction identification result 240. This transaction identification result 240 presents the three kinds of transactions in the order that they are identified.

Alternatively, the transactions may be rearranged according to their start times. Yet another option is to output a summary report describing each different class of transactions succinctly. FIG. 56 shows an example of a summarized transaction identification result. In this transaction identification result 241, the first line "0;HTTP;A;OK, 0-0;RDB2;p;ok [9/5/4/5.8]" describes transactions categorized in transaction class 0. The second line "1;HTTP;A;OK, 1-0;RDB2;p;ok, 1-1;RDB2;q;ok [4/1/3/1.6]" describes transactions categorized in transaction class 1. The third line "2;HTTP;A;FAIL, 2-0;RDB2;p;ok [2/1/1/1.2]" describes transactions categorized in transaction class 2. The fourth line "3;HTTP;A;FAIL, 3-0;RDB2;p;ok, 3-1;RDB2;q;ok [2/1/1/1.2]" describes transactions categorized in transaction class 3.

Figure 57:
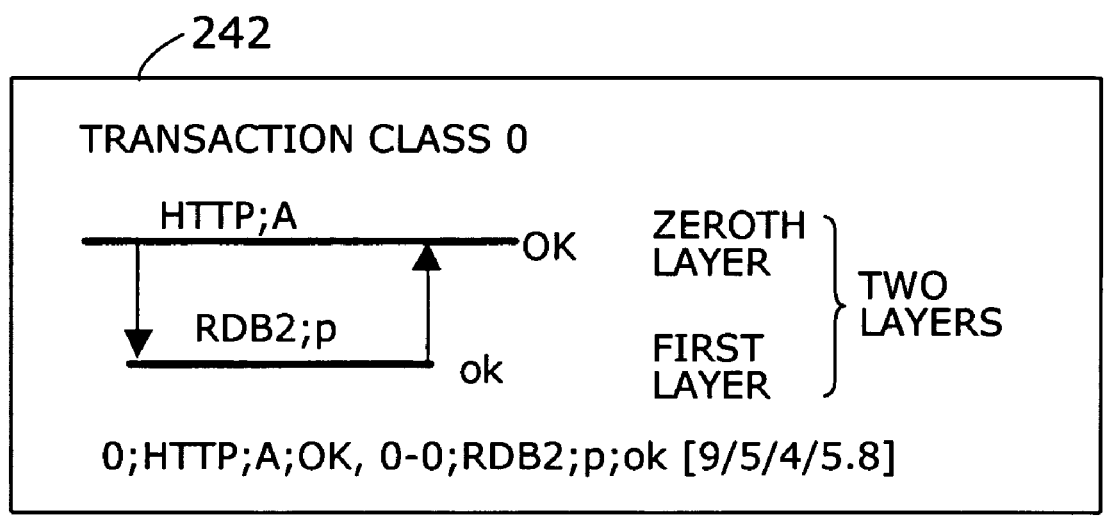
FIG. 57 depicts the structure of transactions categorized in transaction class 0.

FIG. 57 depicts the structure of transaction class 0. This transaction 242 is a two-layer transaction corresponding to the first line of FIG. 56, which reads: "0;HTTP;A;OK, 0-0;RDB2;p;ok [9/5/4/5.8]." The bracketed text, [9/5/4/5.8], indicates that the given message log contains nine instances of this transaction class 0, including five definite transactions and four estimated transactions, with a likelihood score of 5.8.

Figure 58:
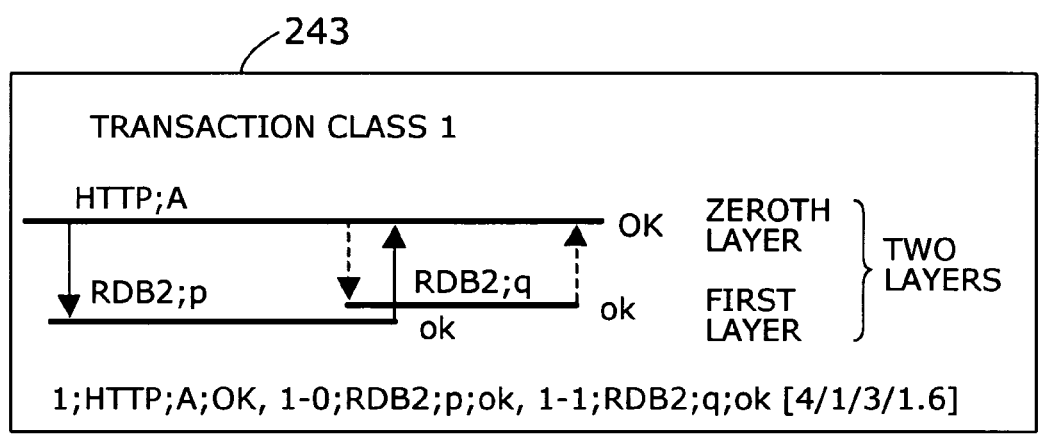
FIG. 58 depicts the structure of transactions categorized in transaction class 1.

FIG. 58 depicts the structure of transaction class 1. This transaction 243 is a two-layer transaction corresponding to the second line of FIG. 56, which reads: "1;HTTP;A;OK, 1-0;RDB2;p;ok, 1-1;RDB2;q;ok [4/1/3/1.6]." The bracketed text, [4/1/3/1.6], indicates that the given message log contains four instances of this transaction class 1, including one definite transaction and three estimated transactions, with a likelihood score of 1.6.

Figure 59:
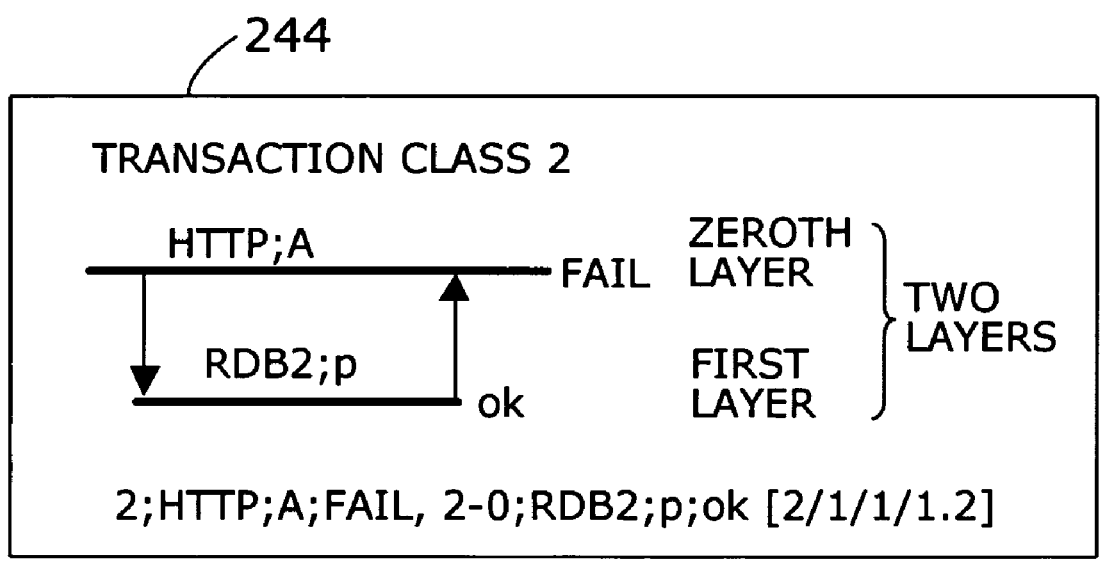
FIG. 59 depicts the structure of transactions categorized in transaction class 2.

FIG. 59 depicts the structure of transaction class 2. This transaction 244 is a two-layer transaction corresponding to the third line of FIG. 56, which reads: "2;HTTP;A;FAIL, 2-0;RDB2;p;ok [2/1/1/1.2]." The bracketed text, [2/1/1/1.2], indicates that the given message log contains two instances of this transaction class 2, including one definite transaction and one estimated transaction, with a likelihood score of 1.2.

Figure 60:
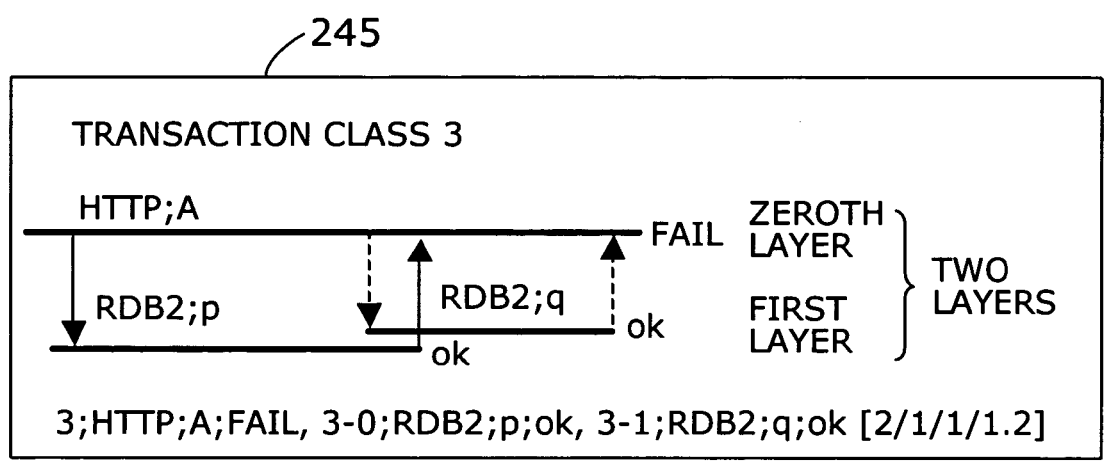
FIG. 60 depicts the structure of transactions categorized in transaction class 3.

FIG. 60 depicts the structure of transaction class 3. This transaction 245 is a two-layer transaction corresponding to the fourth line of FIG. 56, which reads: "3;HTTP;A;FAIL, 3-0;RDB2;p;ok, 3-1;RDB2;q;ok[2/1/1/1.2]." The bracketed text, [2/1/1/1.2], indicates that the given message log contains two instances of this transaction class 3, including one definite transaction and one estimated transaction, with a likelihood score of 1.2.

Transaction Analyzer

As can be seen from FIGS. 56 to 60, messages with different status codes are classified into different classes of transactions. This means that the transaction processing times can be analyzed for each different status code. In the case of HTTP, for example, the status code "500" is defined to be "Internal Server Error," while the status code "200" means "OK" (normal end). The transaction analyzer 150 is thus allowed to analyze the processing times of successful transactions in comparison with those of failed transactions. The transaction analyzer 150 outputs such analysis results on a monitor screen, in the form of graphs or the like.

Figure 61:
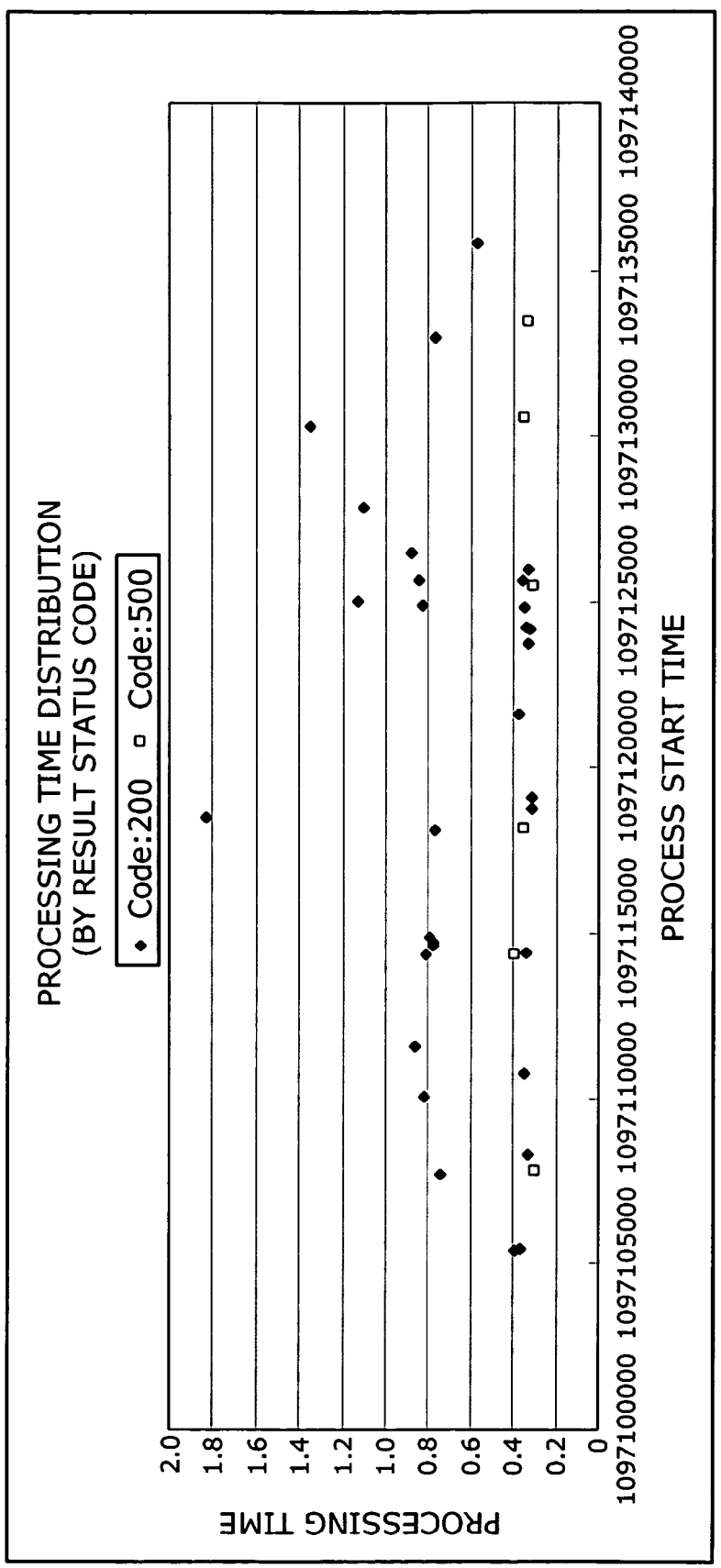
FIG. 61 shows a result of service process analysis for different response codes.

FIG. 61 shows a result of service process analysis for different result status codes. The horizontal axis represents the process start time, and the vertical axis represents the processing time of transactions. The graph of FIG. 61 depicts the distribution of transaction processing times, using different symbols to show different response status codes. Specifically, the small black rhombuses indicate successful transactions with a status code of "200." The small white boxes indicate unsuccessful transactions that ended up with a status code of "500." Note that all the plotted transactions have the same message content, except for the status codes.

As can be seen from FIG. 61, the processing times of successful transactions (code: 200) tend to be long and scatter in a wide range between 0.3 and 1.8 seconds, In contrast, the processing times of unsuccessful transactions (code: 500) concentrate in a narrow range around 0.34 seconds.

Such tendencies of transaction processing times suggests the use of an analysis result for determining whether the system is serving well. For example, transactions will be deemed successful if they are finished in a normal range of processing times. Or, some problem may be present if some transactions exhibit an unusually long or short processing time. The transaction analyzer 150 will be able to determine such normal or abnormal range of processing times in the way described below.

FIG. 62 shows a result of transaction analysis, with some statistical parameters obtained therefrom. This analysis result 251 is of a class of transactions identified by the transaction finder 140. The bracketed text ([31;30;1]) indicates that 31 transactions are identified, including 30 definite transactions and one estimated transaction. Assuming that the processing times follow a logarithmic normal distribution, the transaction analyzer 150 calculates the mean processing time m and standard deviation σ as follows:

m=0.579

σ=1.66

According to the analysis, transactions are deemed to be normal if their processing times fall within a range of m±σ (i.e., 0.348 to 0.963). Transactions outside the range of m±2σ (i.e., 0.209 to 1.60) are marked as abnormal because they are likely to have a problem. Other transactions falling in a mid range between the normal range and the abnormal range would require some caution.

Figure 63:
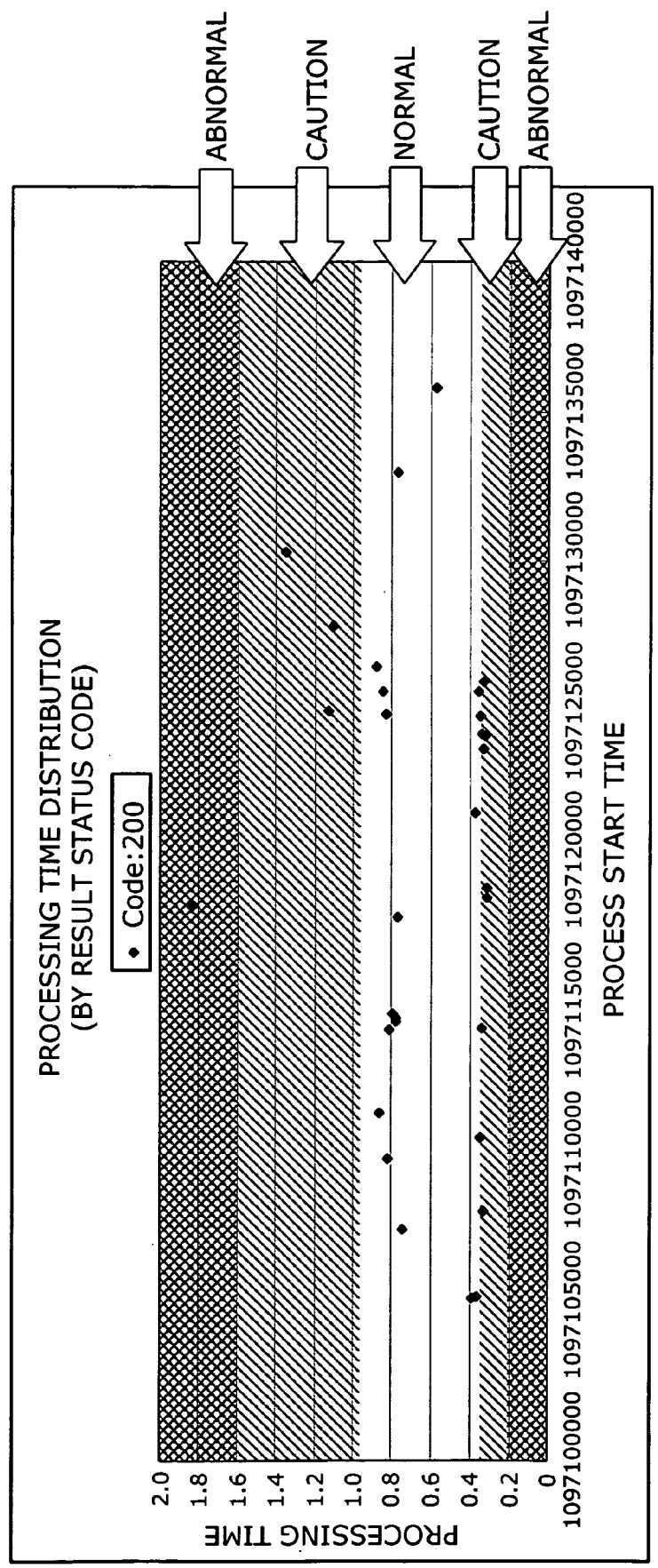
FIG. 63 shows a distribution of transactions classified into groups according to their processing times.

FIG. 63 shows a distribution of transactions classified into three groups according to their processing times. The graph of FIG. 63 follows the same notation as FIG. 61, except that the vertical axis is divided into ranges named "normal," "caution," and "abnormal." In this way the distribution of transaction processing times can be visualized in a classified form.

Computer Program Product

The above-described processing functions of the present invention are actually implemented on a computer system, the instructions being encoded and provided in the form of computer programs. A computer system executes such programs to provide the intended functions of the present invention. For the purpose of storage and distribution, the programs may be stored in a computer-readable storage medium, which include: magnetic storage devices, optical discs, magneto-optical storage media, and solid state memory devices. Magnetic storage media include hard disk drives (HDD), flexible disks (FD), and magnetic tapes. Optical discs include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of software programs is also possible, in which case several master program files are made available in a server computer for downloading to other computers via a network.

A user computer stores necessary programs in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

According to the present invention, transaction candidates each including an unsettled message are produced successively, and their likelihood scores are calculated on the basis of the absolute numbers of identified definite transactions and estimated transactions of the same class. A new estimated transaction is then identified by choosing a most likely candidate. This feature of the present invention enables even an infrequent transaction class to be identified as estimated transactions if a preceding instance of that class has been identified as a definite transaction.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable storage medium storing a service process analysis program for analyzing service process status in a network system including a plurality of servers, the service process analysis program causing a computer to function as an apparatus comprising:
   (a) a message collector that collects messages exchanged in the network system;
   (b) a message parser that parses the collected messages to determine whether each of the collected messages is a request message or a response message, and occurrence time, source, and destination of the each of the collected messages, and stores records of the parsed messages in a message record memory, each of the records including results of the parsing;
   (c) a definite transaction finder that identifies definite transactions by extracting, from the records stored in the message record memory, a combination of messages having unique and definite call dependency;
   (d) a transaction candidate builder that selects each of the messages included in neither the definite transactions nor previously estimated transactions, extracts a plurality of combinations of messages including the selected message and the message satisfying a predetermined requirement concerning the call dependency to produce one or more transaction candidates from the plurality of combinations of messages;
   (e) a candidate evaluator that evaluates likelihood of each of the transaction candidates, based on how many transactions of the same class have been identified as the definite transactions or estimated transactions;

(f) a transaction estimator that produces another estimated transaction by selecting one of the transaction candidates based on the likelihood thereof; and (g) a result output unit that outputs the definite transactions and estimated transactions as an analysis result.

2. The computer-readable storage medium according to claim 1, wherein the candidate evaluator calculates a likelihood score of each transaction candidate as $f(S)+\alpha \times g(S)$, wherein:

f(S) represents the number of identified definite transactions of the same class S;

g(S) represents the number of estimated transactions of the same class S; and $\alpha$ is a weighting coefficient not greater than 1.

3. The computer-readable storage medium according to claim 1, wherein:

the candidate evaluator calculates a likelihood score of each transaction candidate; and the transaction estimator chooses one transaction candidate if the likelihood score thereof is the highest of all and not smaller than a predetermined threshold.

4. The computer-readable storage medium according to claim 1, wherein the transaction candidate builder repeats building a transaction candidate until a predetermined end condition for transaction estimation is satisfied.

5. The computer-readable storage medium according to claim 4, wherein:

the transaction candidate builder builds a replacement transaction candidate, for use as an additional member of the transaction candidates, by adding a selected message to one of the estimated transactions, if the selected message still remains even after the end condition for transaction estimation is satisfied; and the transaction estimator substitutes the replacement transaction candidate for the original estimated transaction when the replacement transaction candidate is more likely than the original estimated transaction.

6. A method for analyzing service process status in a network system including a plurality of servers, the method comprising the steps of:

(a) collecting messages exchanged in the network system;

(b) parsing the collected messages to determine whether each of the collected messages is a request message or a response message, and occurrence time, source, and destination of the each of the collected messages;

(c) storing records of the parsed messages in a message record memory, each of the records including results of the parsing;

(d) identifying definite transactions by extracting, from the stored records of the parsed messages in the message record memory, a combination of messages that have unique and definite call dependency;

(e) selecting each of the messages included in neither the definite transactions nor previously estimated transactions, extracting a plurality of combinations of messages that include the selected message and the message satisfying a predetermined requirement concerning the call dependency to produce one or more transaction candidates from the plurality of combinations of messages;

(f) evaluating likelihood of each of the transaction candidates, based on how many transactions of the same class have been identified as the definite transactions or estimated transactions;

(g) producing another estimated transaction by selecting one of the transaction candidates based on the likelihood thereof; and (h) outputting the definite transactions and estimated transactions as an analysis result.

7. An apparatus for analyzing service process status in a network system including a plurality of servers, the apparatus comprising:

(a) a message collector that collects messages exchanged in the network system;

(b) a message parser that parses the collected messages to determine whether each of the collected messages is a request message or a response message, and occurrence time, source, and destination of the each of the collected messages, and stores records of the parsed messages in a message record memory, each of the records including results of the parsing;

(c) a definite transaction finder that identifies definite transactions by extracting, from the records stored in the message record memory, a combination of messages having unique and definite call dependency;

(d) a transaction candidate builder that selects each of the message included in neither the definite transactions nor previously estimated transactions, extracts a plurality of combinations of messages including the selected message and the message satisfying a predetermined requirement concerning the call dependency to produce one or more transaction candidates from the plurality of combinations of messages;

(e) a candidate evaluator that evaluates likelihood of each of the transaction candidates, based on how many transactions of the same class have been identified as the definite transactions or estimated transactions;

(f) a transaction estimator that produces another estimated transaction by selecting one of the transaction candidates based on the likelihood thereof; and (g) a result output unit that outputs the definite transactions and estimated transactions as an analysis result.

* * * * *